(12) United States Patent
Riggert et al.

(10) Patent No.: US 8,880,716 B2
(45) Date of Patent: Nov. 4, 2014

(54) NETWORK STREAMING OF A SINGLE DATA STREAM SIMULTANEOUSLY OVER MULTIPLE PHYSICAL INTERFACES

(75) Inventors: Eric Riggert, Lake Forest, CA (US); Martin Martinez, Ladera Ranch, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 909 days.

(21) Appl. No.: 12/463,367

(22) Filed: May 8, 2009

(65) Prior Publication Data

US 2010/0287296 A1 Nov. 11, 2010

(51) Int. Cl.
G06F 15/16 (2006.01)
H04L 29/06 (2006.01)

(52) U.S. Cl.
CPC .............. H04L 65/608 (2013.01); H04L 69/14 (2013.01); *H04L 65/4069* (2013.01); *H04L 65/80* (2013.01)
USPC ........... 709/231; 709/224; 370/537; 370/428; 370/232; 370/254; 455/465.1

(58) Field of Classification Search
CPC ... H04L 47/34; H04L 12/2697; H04L 1/1621; H04L 1/187; H04L 1/188; H04L 2012/5679; H04L 41/5009; H04L 41/4711; H04W 28/065; H04W 84/12
USPC .......... 709/231, 224; 370/537, 428, 232, 254; 455/456.1
See application file for complete search history.

(56) References Cited

U.S. PATENT DOCUMENTS

| | | |
|---|---|---|
| 5,544,161 A | 8/1996 | Bigham et al. |
| 5,583,859 A | 12/1996 | Feldmeier |
| 5,640,605 A | 6/1997 | Johnson et al. |
| 5,642,155 A | 6/1997 | Cheng |
| 5,666,514 A | 9/1997 | Cheriton |
| 5,812,708 A | 9/1998 | Rao |
| 5,841,771 A | 11/1998 | Irwin et al. |
| 5,862,136 A | 1/1999 | Irwin |
| 5,864,677 A | 1/1999 | Van Loo |
| 5,889,903 A | 3/1999 | Rao |
| 5,893,155 A | 4/1999 | Cheriton |
| 5,905,502 A | 5/1999 | Deering |

(Continued)

OTHER PUBLICATIONS

Newmarch, J., Introduction to Stream Control Transmission Protocol, Sep. 1, 2007, available at www.linuxjournal.com/article/9748.

(Continued)

*Primary Examiner* — Thuong Nguyen
(74) *Attorney, Agent, or Firm* — Fitzpatrick, Cella, Harper & Scinto

(57) ABSTRACT

Sending a data stream from a sending endpoint to a receiving endpoint, wherein both of the sending endpoint and the receiving endpoint each have multiple physical interfaces connecting the sending endpoint and the receiving endpoint to multiple networks, respectively, is provided. The data stream is split into a series of data packets and sent over the multiple physical interfaces. A next available data packet of the series is sent over a fastest one of the multiple physical interfaces. A data packet from further back in the series is extracted in accordance with a determined expected difference in arrival time, and sent on a corresponding slower one of the multiple physical interfaces. The next available data packet is sent from the sending endpoint nearly simultaneously as the extracted data packet is sent from the sending endpoint.

28 Claims, 39 Drawing Sheets

(56) References Cited

U.S. PATENT DOCUMENTS

| | | | |
|---|---|---|---|
| 5,956,332 A | 9/1999 | Rasanen et al. | |
| 6,006,106 A | 12/1999 | Cook et al. | |
| 6,064,192 A | 5/2000 | Redmyer | |
| 6,064,672 A | 5/2000 | Van Loo et al. | |
| 6,065,052 A | 5/2000 | Van Loo | |
| 6,233,615 B1 | 5/2001 | Van Loo | |
| 6,247,060 B1 | 6/2001 | Boucher et al. | |
| 6,295,598 B1 | 9/2001 | Bertoni et al. | |
| 6,334,153 B2 | 12/2001 | Boucher et al. | |
| 6,393,487 B2 | 5/2002 | Boucher et al. | |
| 6,434,620 B1 | 8/2002 | Boucher et al. | |
| 6,463,472 B1 | 10/2002 | Van Loo | |
| 6,477,169 B1 | 11/2002 | Angle et al. | |
| 6,512,610 B1 | 1/2003 | Minami et al. | |
| 6,543,053 B1 | 4/2003 | Li et al. | |
| 6,564,262 B1 | 5/2003 | Chaddha | |
| 6,597,665 B1 | 7/2003 | Van Loo et al. | |
| 6,665,283 B2 | 12/2003 | Harris et al. | |
| 6,728,775 B1 | 4/2004 | Chaddha | |
| 6,744,986 B1 | 6/2004 | Vohra | |
| 6,751,665 B2 | 6/2004 | Philbrick et al. | |
| 6,788,679 B1 | 9/2004 | Yi | |
| 6,879,590 B2 | 4/2005 | Pedersen et al. | |
| 6,895,185 B1 | 5/2005 | Chung et al. | |
| 6,959,300 B1 | 10/2005 | Caldwell et al. | |
| 6,975,647 B2 | 12/2005 | Neale et al. | |
| 7,047,309 B2 | 5/2006 | Baumann et al. | |
| 7,062,171 B2 | 6/2006 | Ota et al. | |
| 7,069,235 B1 | 6/2006 | Postelnik et al. | |
| 7,133,922 B1 | 11/2006 | She et al. | |
| 7,159,036 B2 | 1/2007 | Hinchliffe et al. | |
| 7,167,926 B1 | 1/2007 | Boucher et al. | |
| 7,174,393 B2 | 2/2007 | Boucher et al. | |
| 7,191,241 B2 | 3/2007 | Boucher et al. | |
| 7,215,679 B2 | 5/2007 | Pugel | |
| 7,230,921 B2 | 6/2007 | Eriksson et al. | |
| 7,237,036 B2 | 6/2007 | Boucher et al. | |
| 7,240,358 B2 | 7/2007 | Horn et al. | |
| 7,242,686 B1 | 7/2007 | Dougherty et al. | |
| 7,254,344 B2 | 8/2007 | Kim et al. | |
| 7,269,171 B2 | 9/2007 | Poon et al. | |
| 7,269,663 B2 * | 9/2007 | Beier et al. | 709/238 |
| 7,284,070 B2 | 10/2007 | Boucher et al. | |
| 7,310,310 B1 | 12/2007 | Shenoi et al. | |
| 7,310,316 B2 | 12/2007 | Auerbach | |
| 7,337,241 B2 | 2/2008 | Boucher et al. | |
| 7,346,701 B2 | 3/2008 | Elzur et al. | |
| 7,426,181 B1 * | 9/2008 | Feroz et al. | 370/232 |
| 2001/0007570 A1 * | 7/2001 | Mangin | 370/537 |
| 2004/0042456 A1 * | 3/2004 | Dittmann et al. | 370/392 |
| 2004/0062198 A1 | 4/2004 | Pedersen et al. | |
| 2004/0190540 A1 * | 9/2004 | Miyake et al. | 370/428 |
| 2004/0192342 A1 * | 9/2004 | Ranganathan | 455/456.1 |
| 2006/0062242 A1 | 3/2006 | Dacosta | |
| 2006/0184664 A1 * | 8/2006 | Jung | 709/224 |
| 2007/0110035 A1 | 5/2007 | Bennett | |
| 2008/0002678 A1 * | 1/2008 | Klessig et al. | 370/389 |
| 2008/0107053 A1 * | 5/2008 | Kim et al. | 370/310 |
| 2008/0231687 A1 * | 9/2008 | Baird et al. | 348/14.09 |
| 2009/0201948 A1 * | 8/2009 | Patwardhan et al. | 370/474 |
| 2009/0316605 A1 * | 12/2009 | Li et al. | 370/254 |
| 2010/0195492 A1 * | 8/2010 | Harmatos et al. | 370/230 |

OTHER PUBLICATIONS

Stream Control Transmission Protocol, White Papers, International Engineering Consortium, 2007, available at www.iec.org/online/tutorials/sctp/.

Stewart, et al., Stream Control Transmission Protocol, Standards Track, Oct. 2000, pp. 1 to 134, available at www.ietf.org/rfc/rfc2960.txt.

* cited by examiner

| FIG. 6A | FIG. 6B | | |
|---|---|---|---|
| FIG. 6C | FIG. 6D | FIG. 6E | FIG. 6F |
| FIG. 6G | FIG. 6H | FIG. 6I | FIG. 6J |
| FIG. 6K | FIG. 6L | FIG. 6M | FIG. 6N |

FIG. 6

NETWORK STREAMING OF A SINGLE DATA STREAM SIMULTANEOUSLY OVER MULTIPLE PHYSICAL INTERFACES

BACKGROUND

1. Field

The present disclosure generally relates to streaming of data, and more specifically relates to network streaming of data from a sending endpoint to a receiving endpoint.

2. Description of the Related Art

In the field of data streaming in a network, there is a problem in that data streaming from a sending endpoint to a recipient endpoint may be detrimentally affected by limited network bandwidth, collisions in data transmission, and latency, which in turn affect the delivery quality of the streamed data. In the future, network bandwidth will invariably increase; however, recent history has shown that the quantity of data information that needs to be sent over networks grows much faster than the then-current delivery infrastructure. As the quantity of data information continues to increase (e.g., High Definition video streaming), an already overburdened system may provide less than adequate data delivery and/or playback quality, or may fail outright.

SUMMARY OF THE INVENTION

One solution to this problem is available in a situation where the architecture of the network is such that the sender and the recipient both have multiple physical connections to the network, and/or in situations where there are multiple networks that connect the sender and recipient, and both the sender and recipient each have one or more physical connections to each network. For example, the sender and recipient might be connected over four separate networks including, such as, an Ethernet network, a MoCA (Multimedia over Coax Alliance) network, an Ethernet over powerline network, a HomePNA (Home Phoneline Networking Alliance) network, and/or a wireless network. For each network, both sender and recipient each have one or more physical connections to each network, such as twisted pair cable connecting to the Ethernet network, coaxial cable connecting to the MoCA network, power lines/wires connecting to the Ethernet over powerline network, and one or more radio antennas connecting to the wireless network.

With such an architecture, the single data stream is split into sub-streams and sent over multiple physical interfaces which connect the endpoints of the network, instead of streaming data over only one of the possible physical interfaces. This solution is more flexible and resilient to network load or impairments because multiple physical interfaces are used simultaneously.

However, using dissimilar physical interfaces raises a new set of problems. One of such problems is that different physical interfaces have basic differences in delay and throughput which are characteristic of the different physical interface types (e.g., wired Ethernet versus wireless). Due to the differences in delay and throughput, additional buffering and re-ordering of the differently delayed data at the receiving endpoint is necessary in order to accurately reassemble the original data stream. This additional buffering may require more resources (such as memory and/or processing power) than the receiving endpoint can provide.

As an example, the receiving endpoint might be an embedded device such as a set top box or other device with limited resources such as limited memory capacity. If packets of the data stream are received out of order, then they must be stored in memory (buffered) until such time as enough packets have been received as to allow reconstruction of the original stream. If too many packets are received out of order, then the set top box might not have enough memory capacity to store all the packets, resulting in data loss.

As an extreme example, assume the data packets are sent over two TCP type network connections. One of the two TCP connections conveys a packet of data in a fraction of a second, while the other TCP connection conveys a packet of data in 10 minutes. After sending a packet on each network, the faster network is free to send another 10 minutes worth of data packets before the slower network can send a second data packet. On the receiving side, after receiving the first packet, the second packet is received out of order, i.e., 10 minutes late. In this regard, the receiving endpoint must buffer 10 minutes of data sent over the faster network until the second data packet is finally received, at which point the reassembly can then occur.

In the present disclosure, the foregoing problem is addressed by sending a data stream from a sending endpoint to a receiving endpoint, wherein both of the sending endpoint and the receiving endpoint each have multiple physical interfaces connecting the sending endpoint and the receiving endpoint to multiple networks, respectively. The data stream is split into a series of data packets and sent over the multiple physical interfaces. When sending the series of data packets over the multiple physical interfaces, a next available data packet of the series is sent over a fastest one of the multiple physical interfaces. In addition, a data packet is extracted out of order from further back in the series of data packets, and is sent on a corresponding slower one of the multiple physical interfaces, so that the next available data packet and the extracted data packet, sent nearly simultaneously from the sending endpoint, are received at the receiving endpoint in an approximate order of appearance of the original data stream.

According to one aspect of the disclosure, an expected difference in arrival time is determined between data packets sent concurrently over different ones of the multiple physical interfaces and received at the receiving endpoint. A next available data packet of the series is then sent over a fastest one of the multiple physical interfaces, where the fastest one of the multiple physical interfaces is determined based on the determined expected difference in arrival time. In addition, a data packet from further back in the series of data packets is extracted in accordance with the determined expected difference in arrival time, and the extracted data packet is sent on a corresponding slower one of the multiple physical interfaces. The next available data packet is sent from the sending endpoint nearly simultaneously as the extracted data packet is sent from the sending endpoint, so that the data packets are received at the receiving endpoint in an approximate order of appearance in the original data stream.

By virtue of the foregoing arrangement, it is ordinarily possible to ensure that data packets of a data stream are received at a receiving endpoint on time and in approximate order, which in turn minimizes any unnecessary processing requirements at the receiving endpoint of a network. In this regard, the receiving endpoint may be, for example, a typical set top box, digital video recorder (DVR), or other consumer device such as a consumer device intended for use with a TV. When compared with a typical desktop computer, laptop computer, or home server, the typical devices for a receiving endpoint are resource constrained having drastically less processing power, reduced memory, and smaller mass storage. However, the typical devices for the receiving endpoint will be tasked with, for example, receiving one or more streams of multimedia content, viewing and/or recording content from a cable or satellite TV provider, acting as an input/aggregation device for collecting pictures or uploading personal video content, purchasing and/or playing music, etc. In addition, in the above described arrangement of sending a single stream of data over multiple physical interfaces, the receiving endpoint carries the additional burden of temporarily storing an unknown amount of data, and then reassembling the resulting data stream. Therefore, because data packets are extracted out of order from further back in the series, and these extra data packets are sent over slower ones of the multiple physical interfaces so as to arrive in an approximate order of the original data stream, any unnecessary buffering and/or processing being performed by the receiving endpoint is minimized, which greatly reduces the load on an already overburdened receiving endpoint.

In another aspect of the disclosure, the sending endpoint and the receiving endpoint each have a single physical interface connected to each of the multiple networks. When sending the next available data packet of the series over a fastest one of the multiple physical interfaces, a send-side physical interface is selected from one of the single physical interfaces connected to one of the multiple networks. The selected send-side physical interface being the fastest single physical interface of the sending endpoint in accordance with the determined expected difference in arrival time. In addition, a receive-side physical interface is selected, the selected receive-side physical interface being the physical interface of the receiving endpoint connected to a same network as the selected send-side physical interface. When sending the extracted data packet of the series over a corresponding slower one of the multiple physical interfaces, a send-side physical interface is selected from one of the single physical interfaces connected to one of the multiple networks. The selected send-side physical interface is a slower corresponding single physical interface of the sending endpoint in accordance with the determined expected difference in arrival time. In addition, a receive-side physical interface is selected, the selected receive-side physical interface being the physical interface of the receiving endpoint connected to a same network as the selected send-side physical interface. Because the sending endpoint and the receiving endpoint each have a single physical interface connected to each of the multiple networks, the processing power, necessary for designating a send-side physical interface and a receive-side physical interface for each data packet, is reduced.

According to another aspect, the sending endpoint and the receiving endpoint each have multiple physical interfaces connected to each of the multiple networks. When sending the next available data packet of the series over a fastest one of the multiple physical interfaces, a fastest send-side physical interface is selected from the multiple physical interfaces of the sending endpoint in accordance with the determined expected difference in arrival time. In addition, a receive-side physical interface is selected from the multiple physical interfaces of the receiving endpoint connected to a same network as the selected send-side physical interface. More specifically, a receive-side physical interface corresponding to the fastest send-side physical interface when determining the expected difference in arrival time is the selected receive-side physical interface for the next available data packet. Because the sending endpoint and the receiving endpoint each have multiple physical interfaces connected to each of the multiple networks, a greater number of possible paths are provided on which data packets may be sent.

Moreover, when sending the extracted data packet of the series over a corresponding slower one of the multiple physical interfaces, a corresponding slower send-side physical interface is selected from the multiple physical interfaces of the sending endpoint in accordance with the determined expected difference in arrival time. In addition, a receive-side physical interface is selected from the multiple physical interfaces of the receiving endpoint connected to a same network as the selected send-side physical interface. More specifically, a receive-side physical interface corresponding to a slower send-side physical interface when determining the expected difference in arrival time is the selected receive-side physical interface for the extracted data packet. Because the sending endpoint and the receiving endpoint each have multiple physical interfaces connected to each of the multiple networks, a greater number of possible paths are provided on which data packets may be sent.

In another aspect, when determining the expected difference in arrival time, the expected difference is initially assumed to be zero. Then, to determine the expected difference in arrival time, the receiving endpoint starts a timer when a first one of the sent data packets is received at the receiving endpoint, and the receiving endpoint stops the timer when a second one of the sent data packets is received at the receiving endpoint. The receiving endpoint then communicates the timed difference in arrival time to the sending endpoint. Thus, the sending endpoint can use the elapsed time on the timer to determine an expected difference in arrival time for data packets sent over corresponding multiple physical interfaces.

In yet another aspect, when determining the expected difference in arrival time, the expected difference is initially assumed to be zero. Then, to determine the expected difference in arrival time, the receiving endpoint notes a first time when a first one of the sent data packets is received at the receiving endpoint. In addition, the receiving endpoint notes a second time when a second one of the sent data packets is received at the receiving endpoint. The receiving endpoint then calculates a difference between the first time and the second time to determine the difference in arrival time, and communicates the calculated difference in arrival time to the sending endpoint. Thus, the sending endpoint can use the calculated difference in arrival time to determine an expected difference in arrival time for data packets sent over corresponding multiple physical interfaces.

In an additional aspect, when determining the expected difference in arrival time, the expected difference is assumed to be a same difference in arrival time as observed in a previous sending of data packets.

According to another aspect, when determining the expected difference in arrival time, the expected difference is looked up in a table which stores various constant values to be used as an initial expected difference in arrival time for specific ones of the multiple physical interfaces.

According to yet another aspect, the receiving endpoint communicates the timed or calculated difference in arrival time to the sending endpoint via a custom feedback message.

In another aspect, the receiving endpoint communicates the calculated or timed difference in arrival time to the sending endpoint by incorporating the communication into an existing receiver message. For example, an existing receiver message may largely comply with receiver reports, such as Real Time Control Protocol (RTCP).

In yet another aspect, when extracting a data packet from further back in the series of data packets in accordance with the determined difference in arrival time, the extracted data packet represents a unit of time in the future equal to the expected difference in arrival time. Furthermore, the extracted data packet can be identified by its protocol header timestamp.

In another aspect, the data stream is a multimedia data stream. In this aspect, when extracting a data packet from further back in the series of data packets in accordance with the determined difference in arrival time, the extracted data packet represents a unit of time in the future equal to the determined expected difference in arrival time. Furthermore, the extracted data packet is identified using a known average bit rate of the multimedia. In addition, a format of the data stream is based upon a transport protocol (e.g., RTP).

In an additional aspect, the data stream is a non-media data stream. In this aspect, when extracting a data packet further back in the series of data packets in accordance with the difference in arrival time, the extracted data packet represents a unit of time in the future equal to the determined expected difference in arrival time. Furthermore, the extracted data packet can be identified using a known aggregate available bandwidth of the multiple physical interfaces. On the other hand, the extracted data packet can be identified using transport protocol header timestamps. In addition, a format of the data stream is known based upon the transport protocol.

In yet another aspect, if ones of the extracted data packets sent over corresponding slower ones of the multiple physical interfaces continue to be delayed, then the receiving endpoint communicates an added expected difference in arrival time to the sending endpoint for the delayed ones of the extracted data packets. Furthermore, if ones of the extracted data packets sent over corresponding slower ones of the multiple physical interfaces are received at the receiving endpoint earlier than the next available data packets sent over the fastest one of the multiple physical interfaces, then the receiving endpoint communicates a reduced expected difference in arrival time to the sending endpoint for the early ones of the extracted data packets.

In an additional aspect, the receiving endpoint maintains a history of the multiple physical interfaces on which ones of the extracted data packets continue to be delayed, and ones of the extracted data packets which arrive early. Based on this maintained history, the receiving endpoint creates a predictability model to more accurately predict future expected differences in arrival times. Because the receiving point can accurately predict future expected differences in arrival time using the predictability model, any unnecessary oscillation of communications from the receiving endpoint can be prevented. More precisely, a scenario can be prevented in which the receiving endpoint communicates an addition to the expected difference in arrival time, communicates a reduction in the expected difference in arrival time, and then again communicates an addition to the expected arrival time.

This brief summary has been provided so that the nature of the disclosure may be understood quickly. A more complete understanding can be obtained by reference to the following detailed description and to the attached drawings.

DETAILED DESCRIPTION

Figure 1:
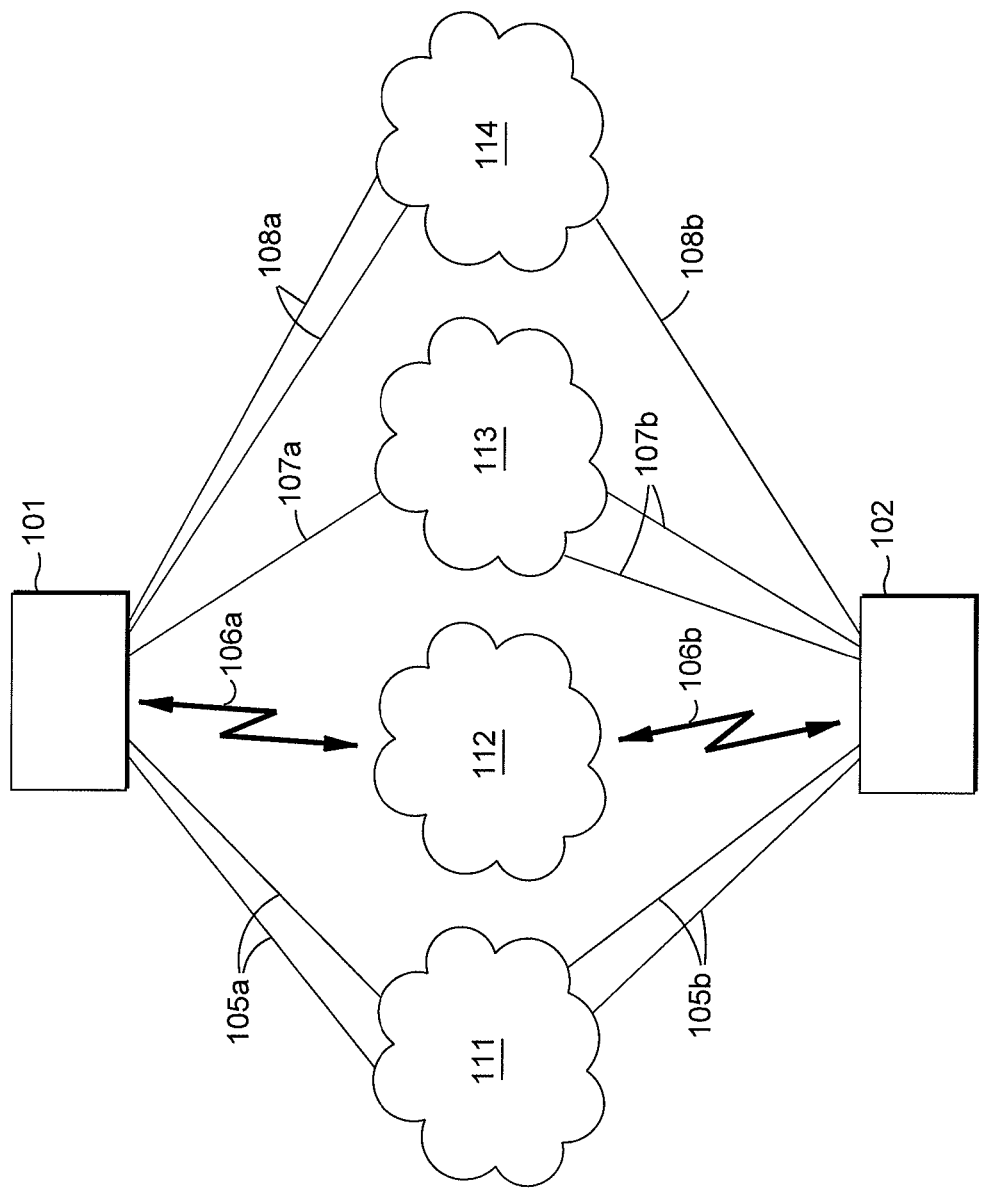
FIG. 1 is a representative view of a sending endpoint and a receiving endpoint, connected via networks, on which an architecture of an example embodiment may be implemented.

FIG. 1 is a representative view of a sending endpoint and a receiving endpoint, connected via multiple networks, on which an architecture of an example embodiment may be implemented. As shown in FIG. 1, sending endpoint 101 is connected to receiving endpoint 102 through networks 111, 112, 113 and 114. The networks may include similar or dissimilar networks, mixed in any combination, as described below. Sending endpoint 101 includes multiple physical interfaces, including at least one or more physical interface for each different network. As shown in the example of FIG. 1, sending endpoint 101 includes physical interfaces 105a, 106a, 107a and 108a. More specifically, sending endpoint 101 has physical interfaces 105a which connect sending endpoint 101 to network 111. In FIG. 1, sending endpoint 101 is shown to have two physical interfaces 105a connecting to network 111; however, in other embodiments, sending endpoint 101 may have a single physical interface connecting to network 111, or may have more than two physical interfaces connecting to network 111.

Receiving endpoint 102 also has multiple physical interfaces 105b connecting to network 111. Similar to sending endpoint 101, receiving endpoint 102 may also have a single or multiple physical interfaces connecting to network 111. As a result of the physical interface connections, sending endpoint 101 is connected to receiving endpoint 102 through network 111, using physical interfaces 105b.

Similar to the above-described connection between sending endpoint 101 and receiving endpoint 102, sending endpoint 101 and receiving endpoint 102 are connected through networks 112, 113 and 114 via physical interfaces 106a and 106b, 107a and 107b and 108a and 108b. Accordingly, sending endpoint 101 is connected to network 112 through one or more physical interfaces 106a; and, receiving endpoint 102 is connected to network 112 through one or more physical interfaces 106b. Sending endpoint 101 is connected to network 113 through one or more physical interfaces 107a; and, receiving endpoint 102 is connected to network 113 through one or more physical interfaces 107b. Lastly, sending endpoint 101 is connected to network 114 through one or more physical interfaces 108a; and, receiving endpoint 102 is connected to network 114 through one or more physical interfaces 108b. In FIG. 1, sending endpoint 101 and receiving endpoint 102 are shown to be connected through four networks; however, sending endpoint 101 and receiving endpoint 102 may be connected through more or less networks. In this regard, the number of networks is established by a user's demands, or is established by an already existing infrastructure connecting the two endpoints.

Networks 111, 112, 113 and 114 can be many different types of networks, such as, for example, an Ethernet network, a Multimedia over Coax Alliance (MoCA) network, a HomePNA (Home Phoneline Networking Alliance) network, an Ethernet over powerline network (HomePlug), a wireless network, or any other type of network. In addition, the networks connecting the two endpoints can all be a different type of network (e.g., network 111 can be an Ethernet network, while network 112 is a wireless network, network 113 is an Ethernet over powerline network, and network 114 is a MoCA network). On the other hand, the networks connecting the two endpoints can include any variety of combinations of different networks (e.g., network 111 can be a MoCA network, while network 112 is a wireless network, and networks 113 and 114 are Ethernet networks). The type of physical interfaces connecting the endpoints to the networks depends upon the type of network. For example, an endpoint may be connected to an Ethernet network through twisted pair cable, an endpoint may be connected to a MoCA network through coaxial cable, an endpoint may be connected to an Ethernet over powerline network over power lines/wires, and an endpoint may be connected to a wireless network over one or more radio antennas.

The sending endpoint 101 serves as an application sender, which may include, for example, a media server, a conference server, or a storage sender application. A media server is an endpoint that will transfer audio and video data (or other types of large data) to a client. Although the media server is specific to transferring video streams, other types of media servers can be substituted (e.g., an audio-only stream or a large archival stream). The media server may also be a modified third party application accessing the sending endpoint 101. A conference server is an endpoint that sends data (via Unicast or Multicast) to conference players, and is used in providing interactive conference content to participants. A storage sender application is an endpoint that sends data from a device to a receiver, and is used in transferring data between two endpoints (e.g., File Transfer Protocol (FTP)). The storage sender application is primarily used in a PC collaboration as a means to send device data to be stored at an external storage medium.

The receiving endpoint 102 serves as an application receiver, which may include, for example, a media client or media player, a conference player, or a storage receiver application. A media client or media player is an endpoint that receives data from a media server, and is used primarily for video and audio stream playing. A conference player is an endpoint that receives data from the conference server, and is used in playing and interacting within a conference. A storage receiver application is an endpoint that receives data from a storage sender application, and is used in transferring data between two endpoints (e.g., FTP). The storage application receiver is primarily used in a PC collaboration as a means to receive device data to be stored at an external storage medium.

In some instances, a sending endpoint may also simultaneously act as a receiving endpoint. For example, when a sending endpoint serves as a video conferencing application, video would stream from the sending endpoint to the receiving endpoint, and video would stream simultaneously from the receiving endpoint to the sending endpoint. In this example, the sending endpoint would also be acting as a receiving endpoint, and the receiving endpoint would also be acting as a sending endpoint. In other instances, a sending endpoint may become a receiving endpoint after some period of time. For example, a sending endpoint and a receiving endpoint might transfer data back and forth to each other in a ping-pong fashion, rather than simultaneously. In other words, the sending endpoint might complete a transfer of data to the receiving endpoint, and then a second transfer may begin in the opposite direction from the receiving endpoint to the sending endpoint.

Figure 2:
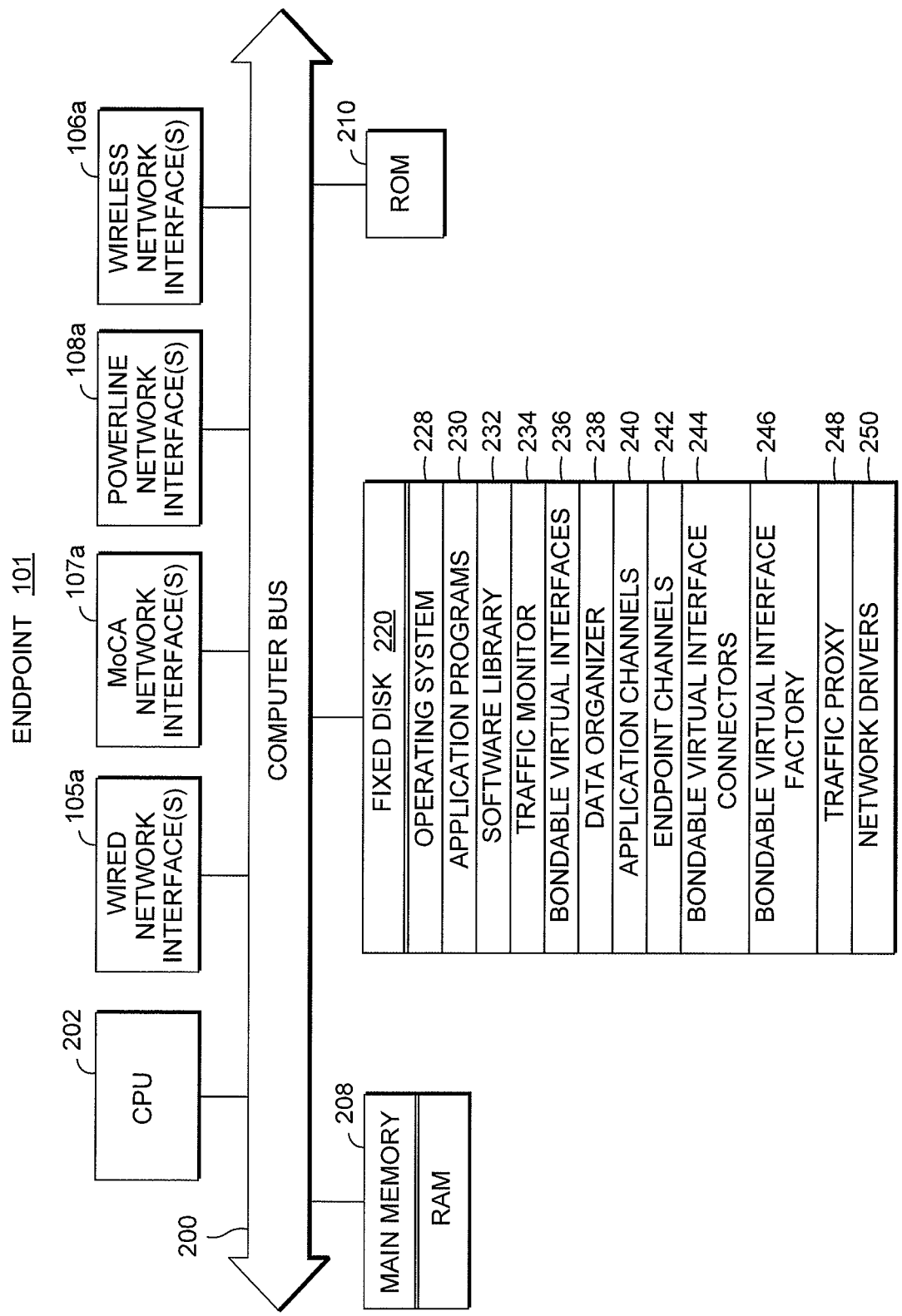
FIG. 2 is a detailed block diagram for explaining the internal architecture of the sending endpoint of FIG. 1.

FIG. 2 is a detailed block diagram for explaining the internal architecture of the sending endpoint 101 of FIG. 1. As shown in FIG. 2, sending endpoint 101 includes central processing unit (CPU) 202 which interfaces with computer bus 200. Also interfacing with computer bus 200 are hard (or fixed) disk 220, wired network interface(s) 105a, wireless network interface(s) 106a, MoCA network interface(s) 107a, powerline network interface(s) 108a, random access memory (RAM) 208 for use as a main run-time transient memory, and read only memory (ROM) 210.

RAM 208 interfaces with computer bus 200 so as to provide information stored in RAM 208 to CPU 202 during execution of the instructions in software programs such as an operating system, application programs, and interface drivers. More specifically, CPU 202 first loads computer-executable process steps from fixed disk 220, or another storage device into a region of RAM 208. CPU 202 can then execute the stored process steps from RAM 208 in order to execute the loaded computer-executable process steps. In addition, data such as gathered network performance statistics or other information can be stored in RAM 208, so that the data can be accessed by CPU 202 during the execution of computer-executable software programs, to the extent that such software programs have a need to access and/or modify the data.

As also shown in FIG. 2, hard disk 220 contains operating system 228, application programs 230 such as programs for starting up and shutting down the sending endpoint 101 or other programs. Hard disk 220 further contains software library 232 for controlling the sending of data from sending endpoint 101. Hard disk 220 also contains traffic monitor 234 for gathering performance statistics for each of the multiple physical interfaces 105a, 106a, 107a and 108a. In addition, hard disk 220 contains bondable virtual interfaces 236, data organizer 238, application channels 240, endpoint channels 242, bondable virtual interface connectors 244, bondable virtual interface factory 246, and traffic proxy 248, each of which is instantiated by the software library 232 and will be described in more detail below with reference to FIGS. 4 and 5. Traffic proxy 248 may be used as a communication interface between the software library 232 and the traffic monitor 234. Lastly, hard disk 220 contains network drivers 250 for software interface to networks such as networks 111, 112, 113 and 114.

In an example embodiment, software library 232 and traffic monitor 234 are loaded by CPU 202 into a region of RAM 208. CPU 202 then executes the stored software library 232 and the traffic monitor 234 from RAM 208 in order to execute the loaded computer-executable steps. In addition, application programs 230 are loaded by CPU 202 into a region of RAM 208. CPU 202 then executes the stored process steps as described in detail below in connection with FIGS. 16, 18, 20 and 21, in order to execute the loaded computer-executable steps.

Figure 3:
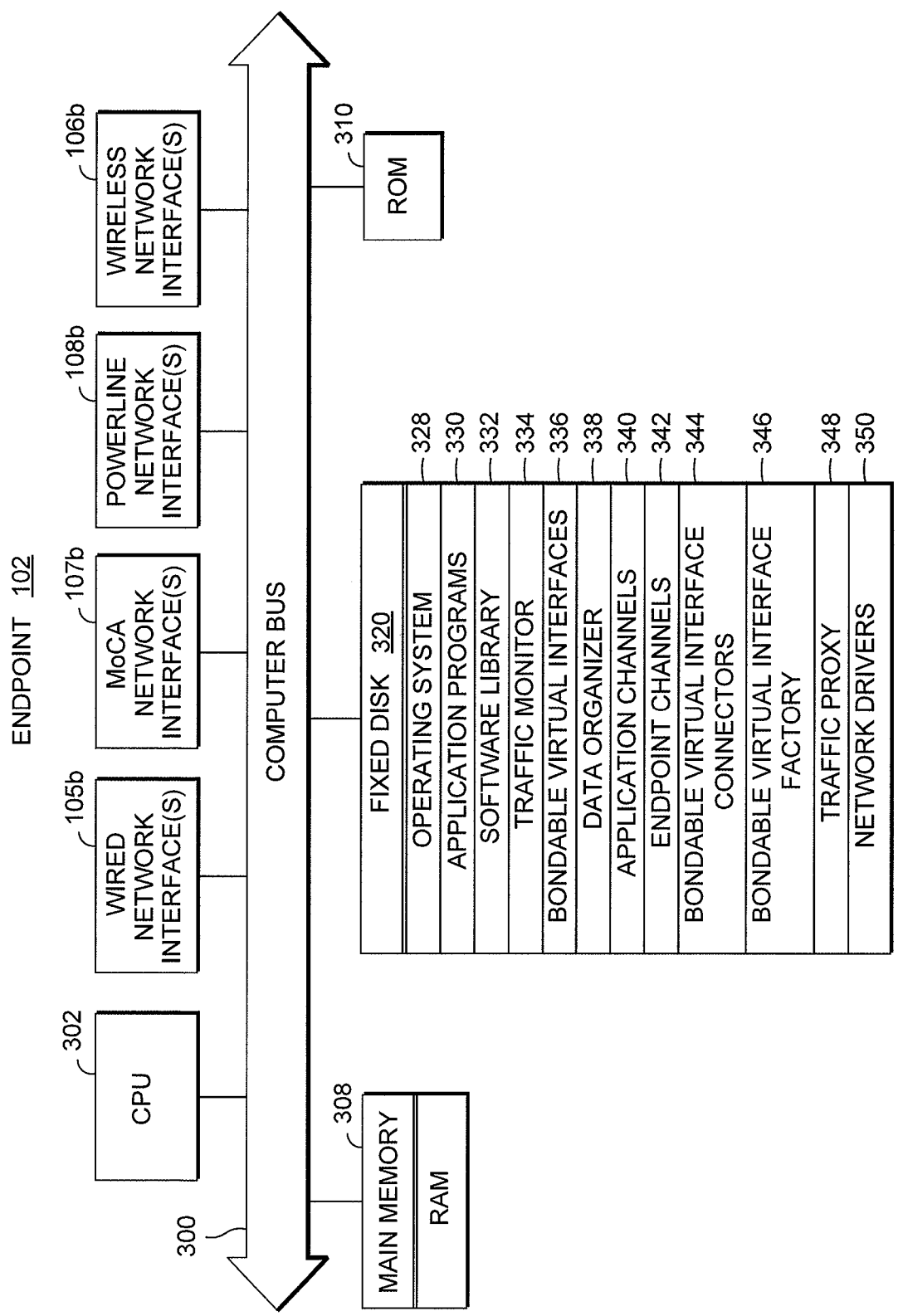
FIG. 3 is a detailed block diagram for explaining the internal architecture of the receiving endpoint of FIG. 1.

FIG. 3 is a detailed block diagram for explaining the internal architecture of the receiving endpoint 102 of FIG. 1. As shown in FIG. 3, receiving endpoint 102 includes central processing unit (CPU) 302 which interfaces with computer bus 300. Also interfacing with computer bus 300 are hard (or fixed) disk 320, wired network interface(s) 105b, wireless network interface(s) 106b, MoCA network interface(s) 107b, powerline network interface(s) 108b, random access memory (RAM) 308 for use as a main run-time transient memory, and read only memory (ROM) 310.

RAM 308 interfaces with computer bus 300 so as to provide information stored in RAM 308 to CPU 302 during execution of the instructions in software programs such as an operating system, application programs, and interface drivers. More specifically, CPU 302 first loads computer-executable process steps from fixed disk 320, or another storage device into a region of RAM 308. CPU 302 can then execute the stored process steps from RAM 308 in order to execute the loaded computer-executable process steps. In addition, data such as gathered network performance statistics or other information can be stored in RAM 308, so that the data can be accessed by CPU 302 during the execution of computer-executable software programs, to the extent that such software programs have a need to access and/or modify the data.

As also shown in FIG. 3, hard disk 320 contains operating system 328, application programs 330 such as programs for starting up and shutting down the receiving endpoint 102 or other programs. Hard disk 320 further contains software library 332 for controlling the receiving of data from receiving endpoint 102.

Software library 332 in this example is identical to software library 232 in sending endpoint 101. However, in other embodiments, the software library 332 need not be identical to library 232, so long as the two libraries implement a similar software architecture relative to the software library, the traffic monitor, the bondable virtual interfaces, and the data organizer. For example, the sending and receiving endpoints might implement different versions of the same software architecture. Or the sending and receiving endpoints might implement architecture that target different operating systems, such as Windows on the sending endpoint and Linux on the receiving endpoint. Or, the sending endpoint and the receiving endpoint might implement architecture that is OS-neutral like JAVA. Hard disk 320 also contains traffic monitor 334 for gathering performance statistics for each of the multiple physical interfaces 105b, 106b, 107b and 108b. In addition, hard disk 320 contains bondable virtual interfaces 336, data organizer 338, application channels 340, endpoint channels 342, bondable virtual interface connectors 344, bondable virtual interface factory 346, and traffic proxy 348, each of which is instantiated by the software library 332 and will be described in more detail below with reference to FIGS. 4 and 5. Traffic proxy 348 may be used as a communication interface between the software library 332 and the traffic monitor 334. Lastly, hard disk 320 contains network drivers 350 for software interface to networks such as networks 111, 112, 113 and 114.

In an example embodiment, software library 332 and traffic monitor 334 are loaded by CPU 302 into a region of RAM 308. CPU 302 then executes the stored process steps of the software library 332 and the traffic monitor 334 from RAM 308 in order to execute the loaded computer-executable steps. In addition, the process steps of the application programs 330 are loaded by CPU 302 into a region of RAM 308. CPU 302 then executes the stored process steps as described in detail below in connection with FIGS. 16, 18, 20 and 21, in order to execute the loaded computer-executable steps.

General Description of Architecture

Transferring data between two endpoints in an efficient manner is difficult. Efficiency can be improved in general by increasing the amount of information concerning the nature of the transfer. For example, efficiency can be improved with an understanding of how to send data between two endpoints and also an understanding of the type of data being sent. Further, by identifying multiple physical interfaces and combining them together into one physical interface (i.e., bondable virtual interface), data throughput may be improved.

In a simplistic architecture, a media receiver/player requests (via e.g., HTTP or RTSP) for a movie stream from a media server. The media server then sends data to the client with some, but probably little concern, as to the means or how well the client may have received the media stream data. In contrast, within the architecture of this example embodiment, the media client provides profile information (i.e., a suggested or predetermined bondable virtual interface configuration) as to the type of the media to be streamed, and negotiates with the media server as to the physical interfaces available to exchange data. With this knowledge of media type, both the sending and receiving buffer can be modified to improve throughput. The negotiation between the media client and the media server produces a configuration and setup for multiple physical interfaces via negotiation. In a case where there are multiple logical physical interfaces, the creation of a combined (or bondable virtual interface) physical interface will occur. In this regard, a bondable virtual interface is a combination of physical interfaces that can send data via multiple physical interfaces. Further, feedback information will be sent between both endpoints to improve throughput. The media client then receives the segments on the multiple physical interfaces, recombines the segments and provides the data to the media client's player (whether included in the media client or connected to the media client). Using this architecture makes it possible to ordinarily improve throughput by: (1) Sending information back (via a feedback channel) to the endpoint regarding changes to the data stream or processing of the data, which improves the efficiency of buffer management, and (2) using a bondable virtual interface which increases throughput of data by using multiple physical interfaces to send the data.

Figure 4:
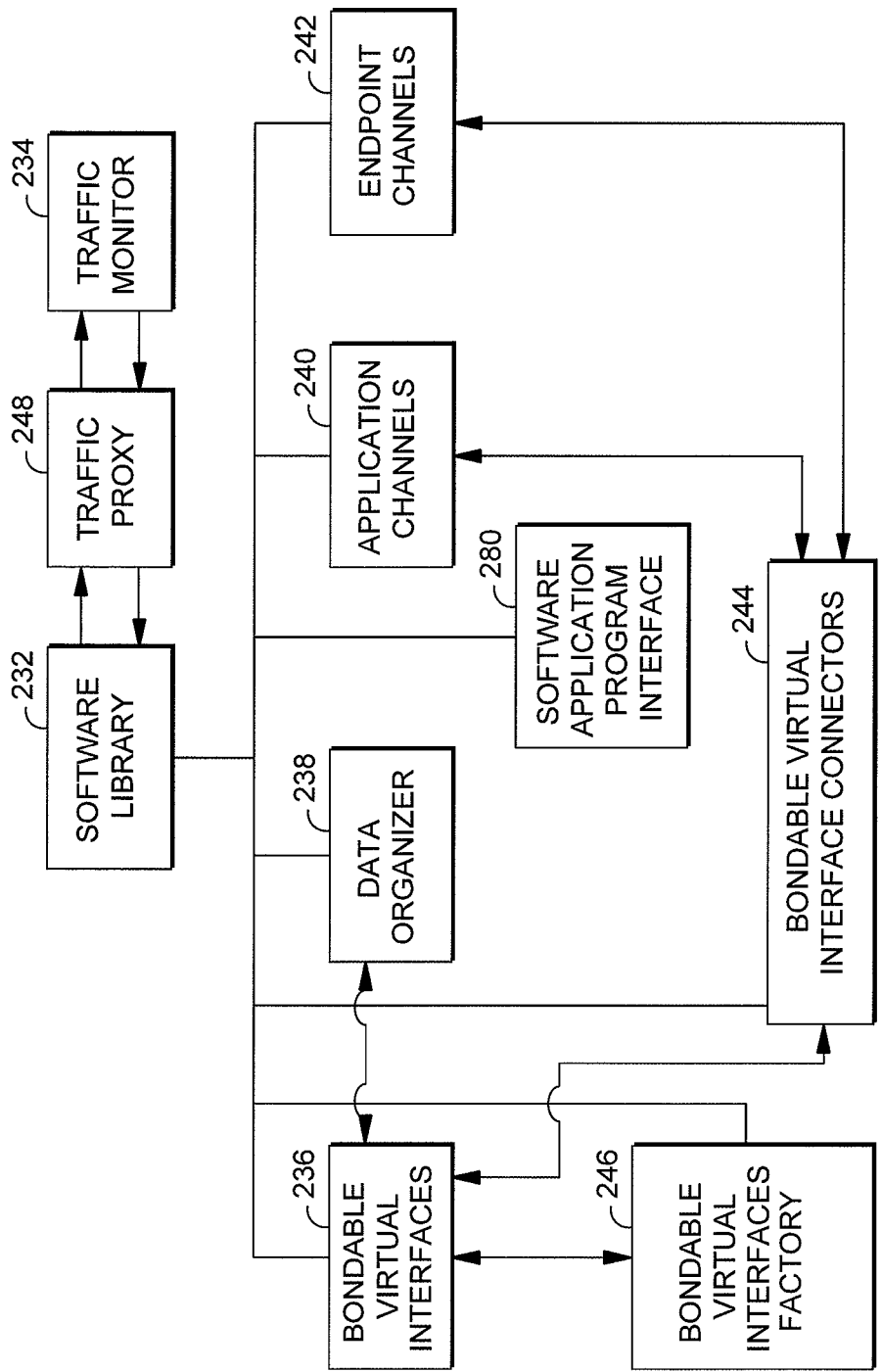
FIG. 4 is a high level view of an architecture according to an example embodiment.

FIG. 4 is a high level view of an architecture according to an example embodiment. As shown in FIG. 4, the architecture includes software library 232 and traffic monitor 234. The software library 232 is connected to and communicates with the traffic monitor 234 through traffic proxy 248. In this regard, the software library 232 instantiates and associates with the traffic monitor 234 via the traffic proxy 248. However, the traffic proxy 248 may be omitted, and the software library 232 and the traffic monitor 234 may communicate with each other directly.

As used herein, the word "instantiate" refers to the construction in memory of a software object, such as by use of an object factory. How the software object is created varies among different programming languages. In prototype-based languages, an object can be created from nothing, or an object can be based on an existing object. In class-based language, objects are derived from classes, which can be thought of as blueprints for constructing the software objects.

As further shown in FIG. 4, the software library 232 is connected to bondable virtual interfaces 236, bondable virtual interface factory 246, data organizer 238, software application program interface 280, application channels 240, and endpoint channels 242. In this regard, the software library 232 instantiates and associates with the bondable virtual interfaces 236, the bondable virtual interface factory 246, the data organizer 238, the software application program interface 280, the application channels 240, and the endpoint channels 242. In addition, the data organizer 238 instantiates a data splitter or a data combiner (both of which are described below in detail in connection with FIG. 5), depending on whether the architecture is implemented on a sending endpoint or a receiving endpoint. The foregoing mentioned components will be described, including their use and functionality, in more detail below in connection with FIG. 5.

Furthermore, the bondable virtual interface factory 246 is connected to and associates with the bondable virtual interfaces 236. The bondable virtual interfaces 236 are also connected to and associate with the data organizer 238 and the bondable virtual interface connectors 244. The bondable virtual interface connectors 244 also associate with application channels 240 and endpoint channels 242.

Figure 5:
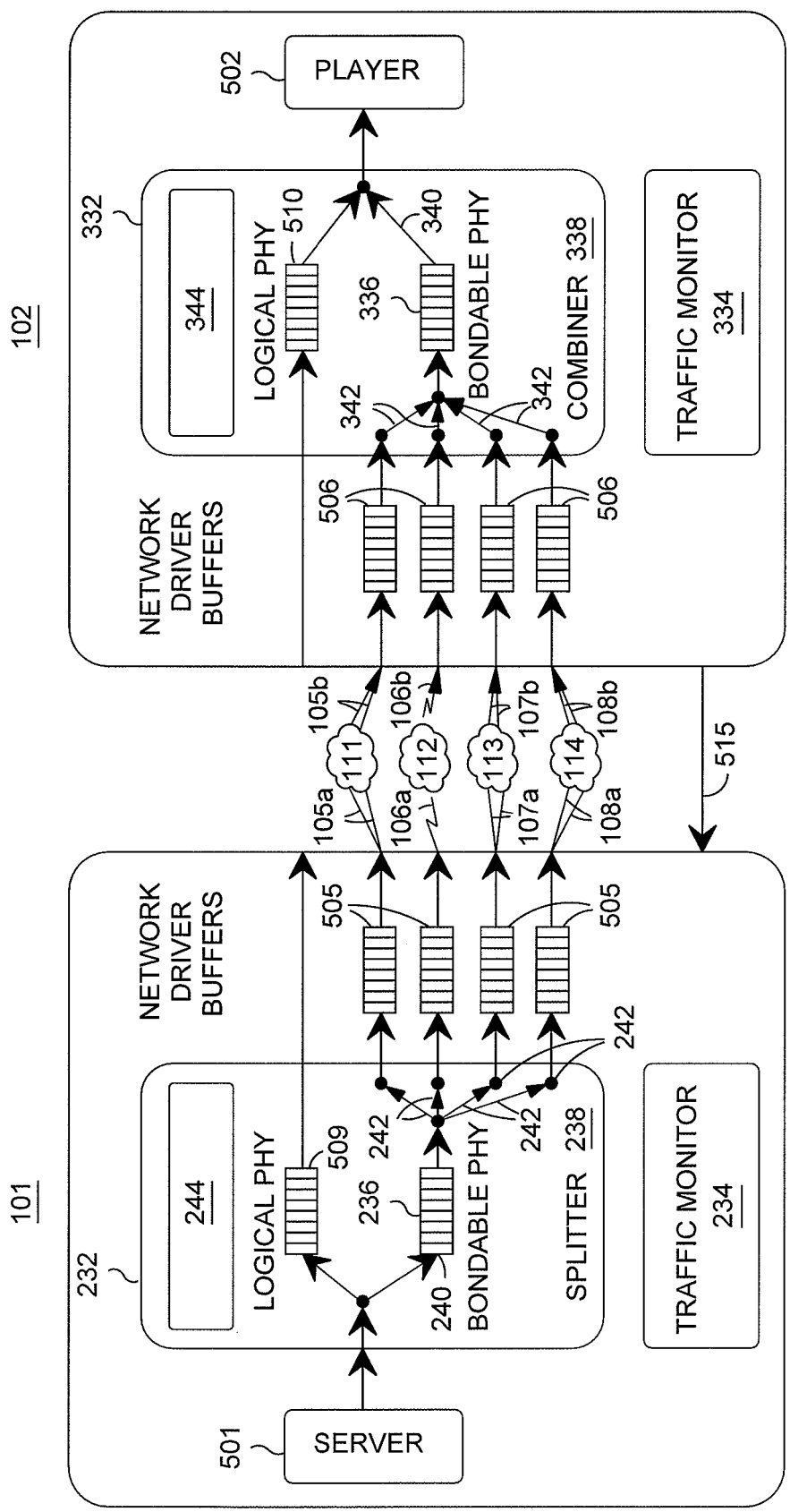
FIG. 5 is another view of a sending endpoint and a receiving endpoint, for providing a general explanation of an example embodiment.
Figure 6A:
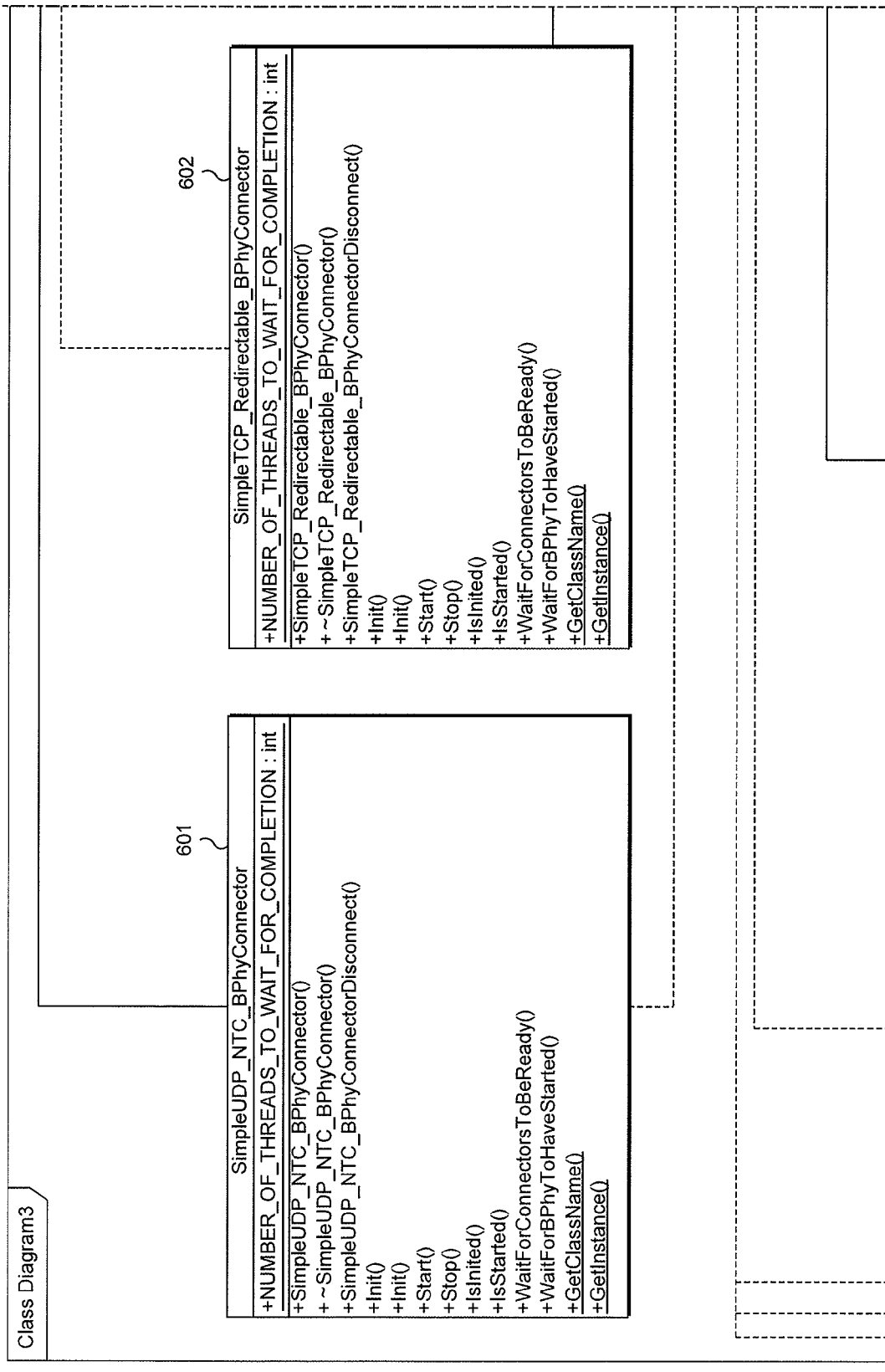
FIGS. 6A to 6N show a Unified Modeling Language (UML) class diagram for an architecture of an example embodiment.
Figure 6B:
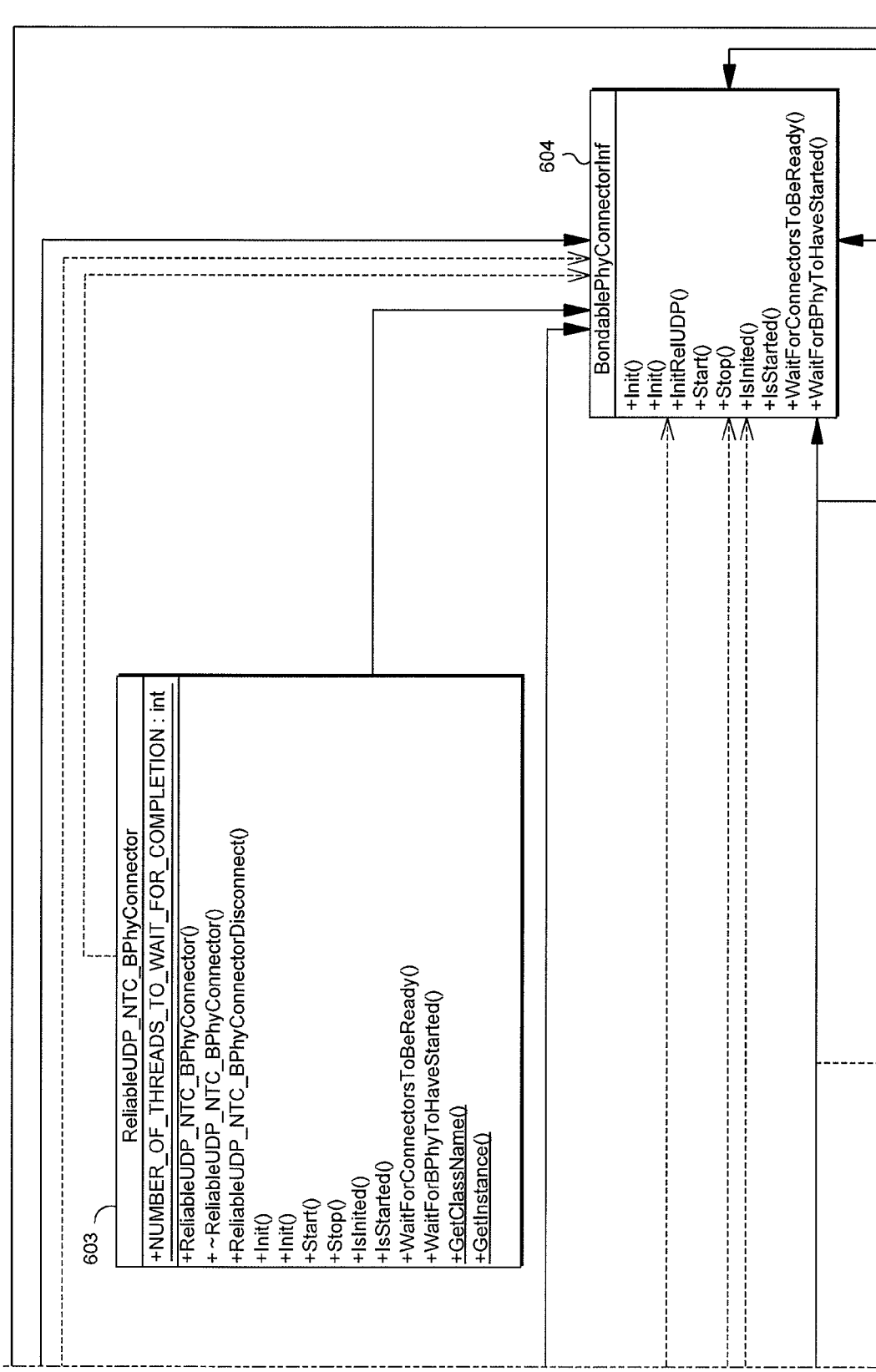
Figure 6D:
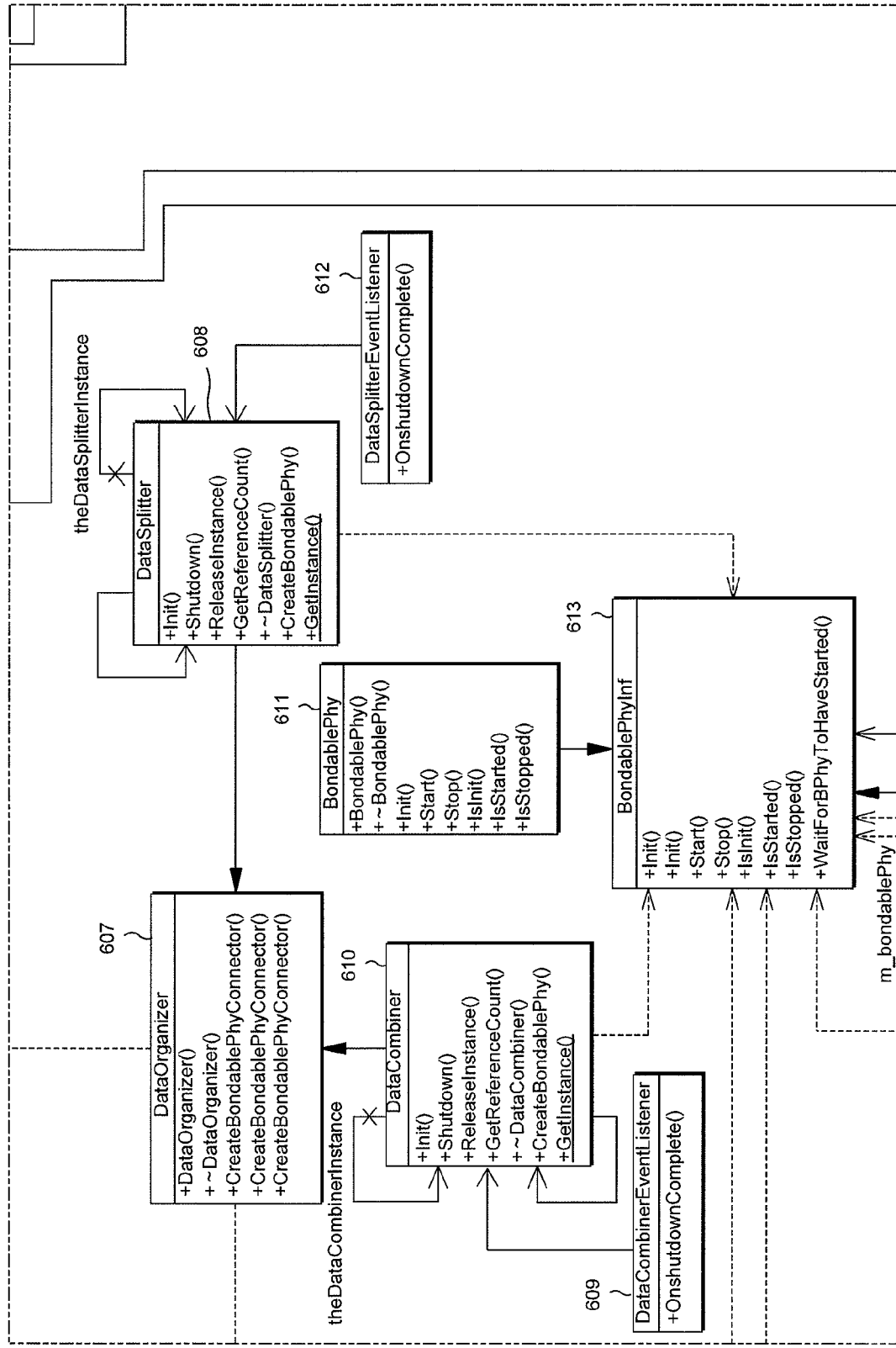
Figure 6E:
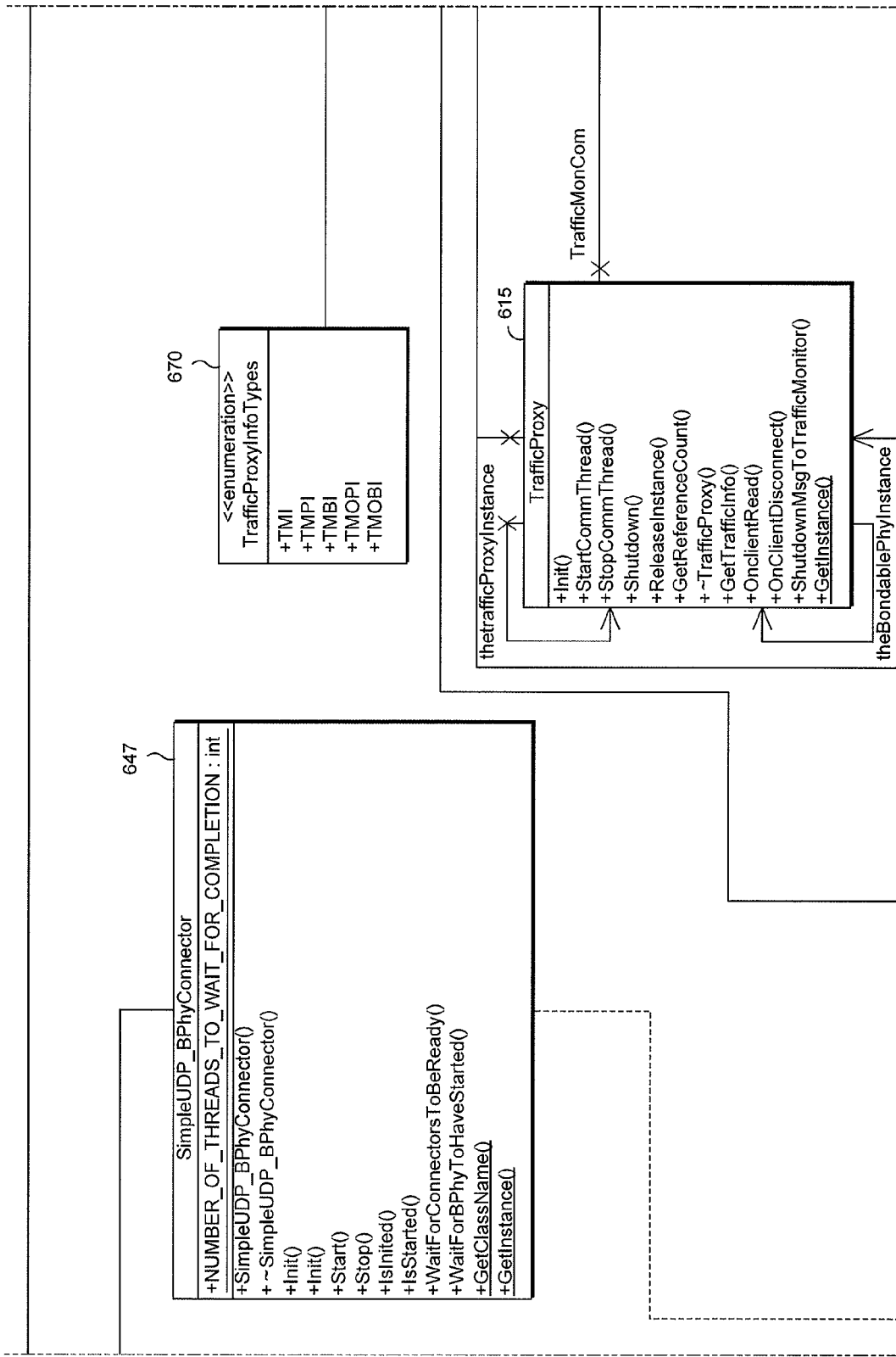
Figure 6F:
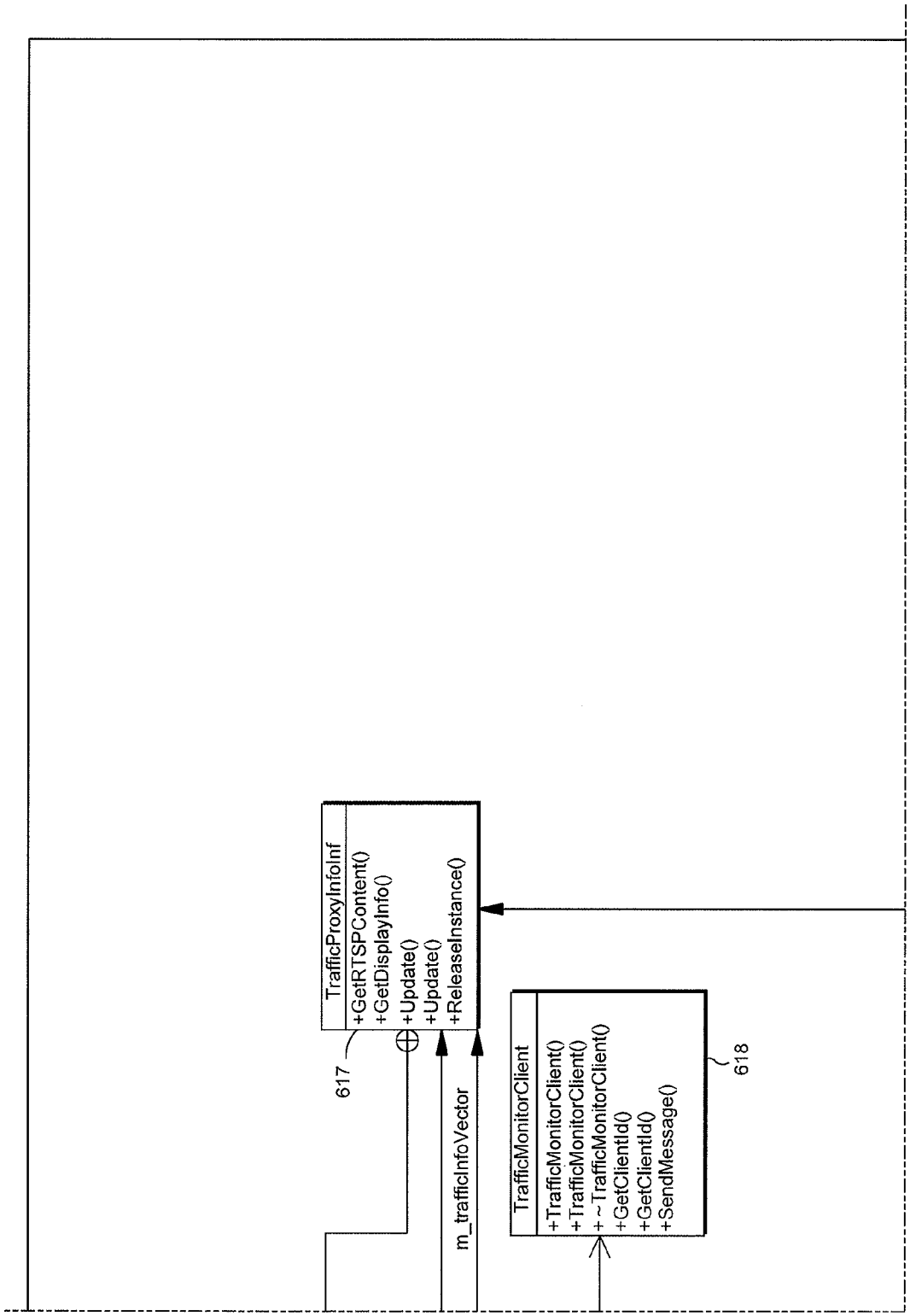
Figure 6G:
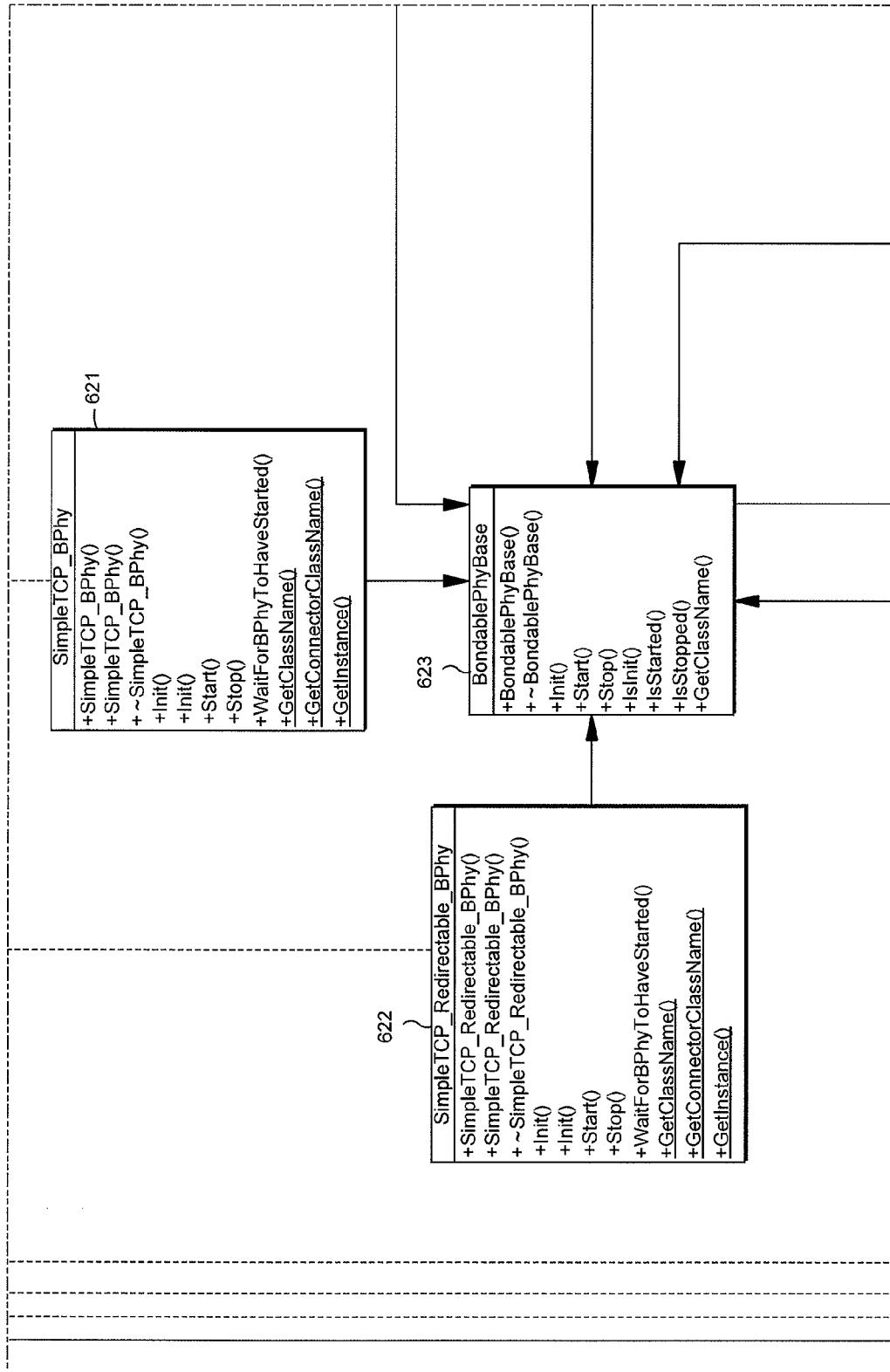
Figure 6H:
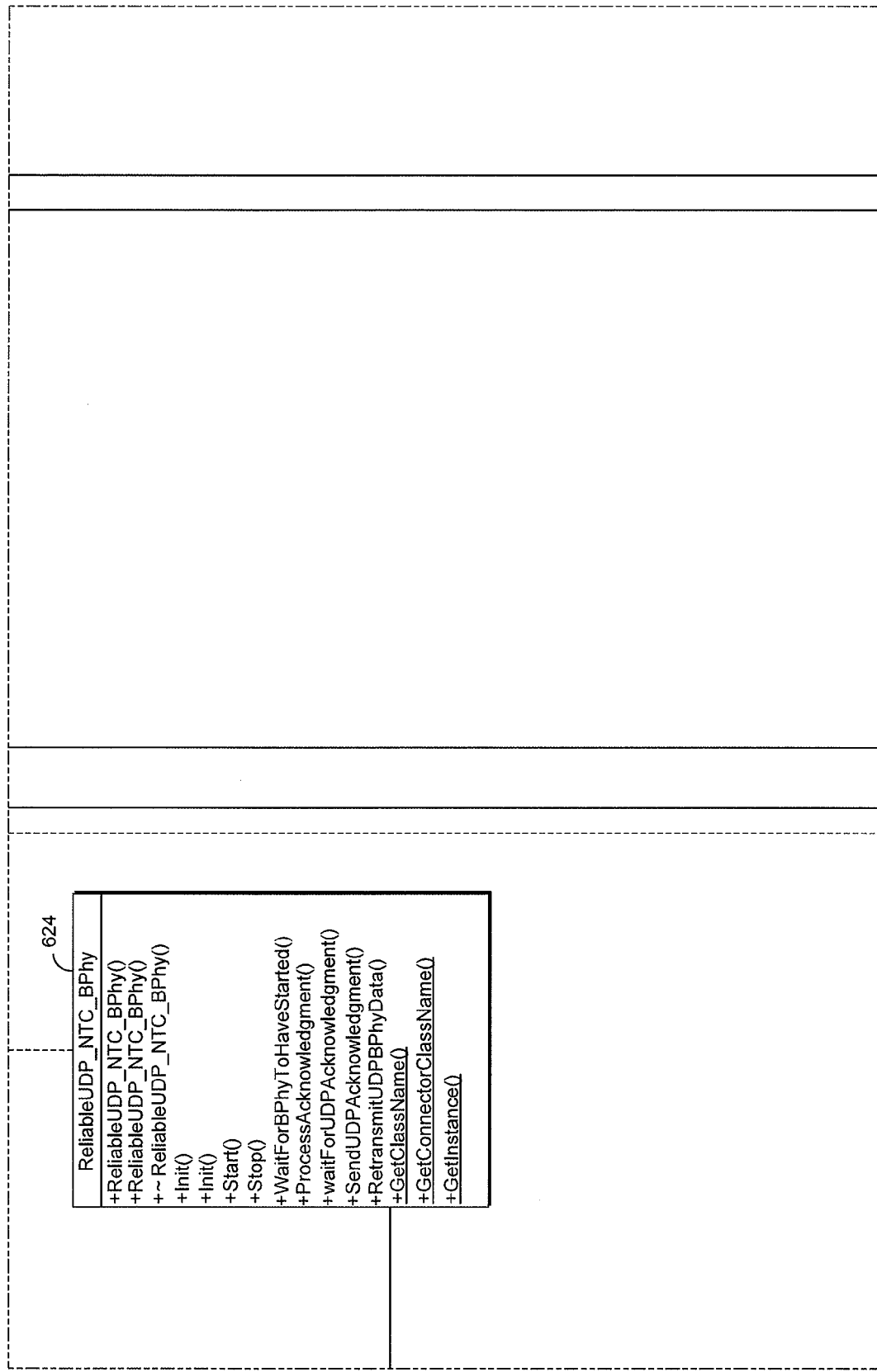
Figure 6I:
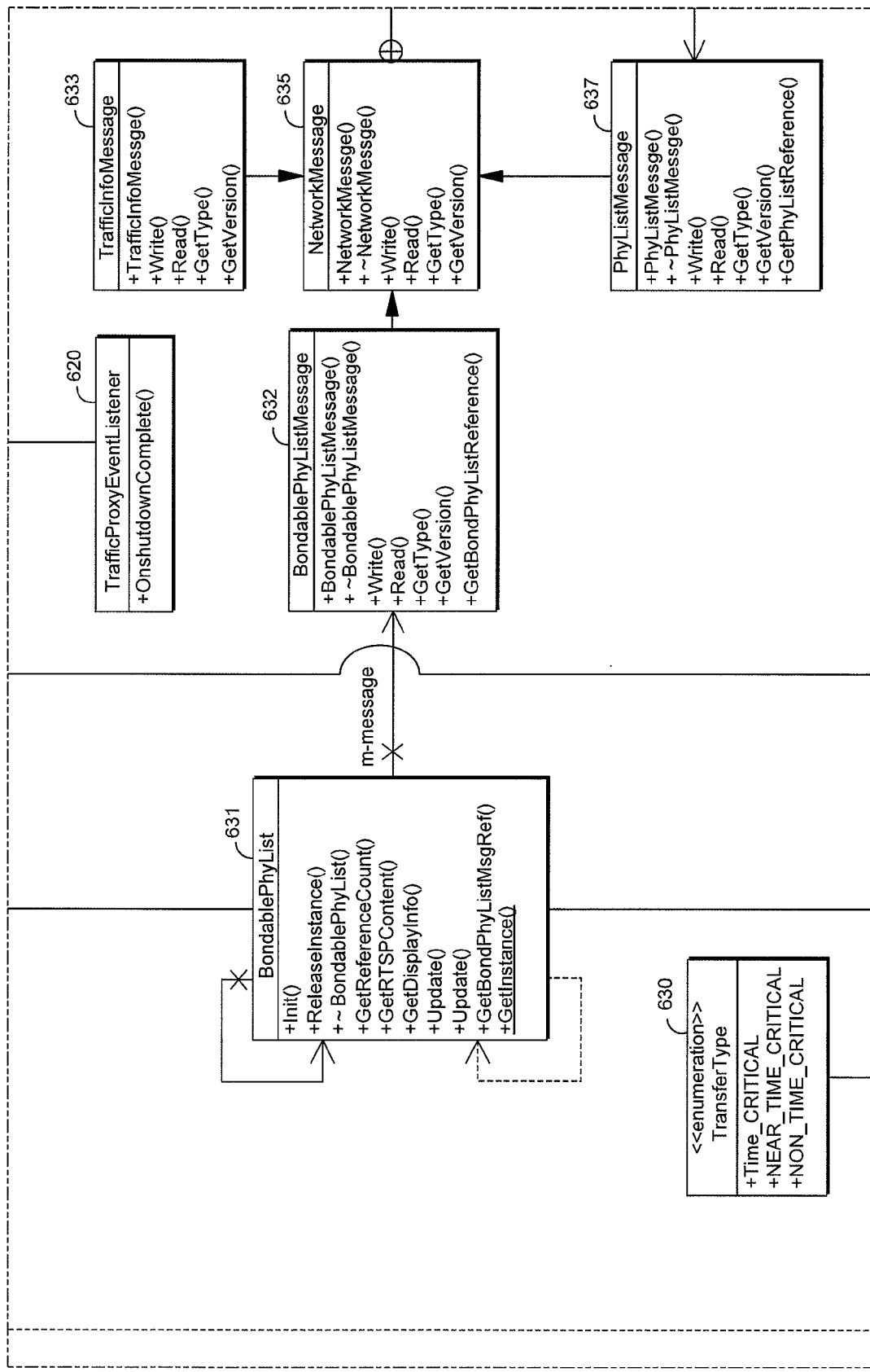
Figure 6J:
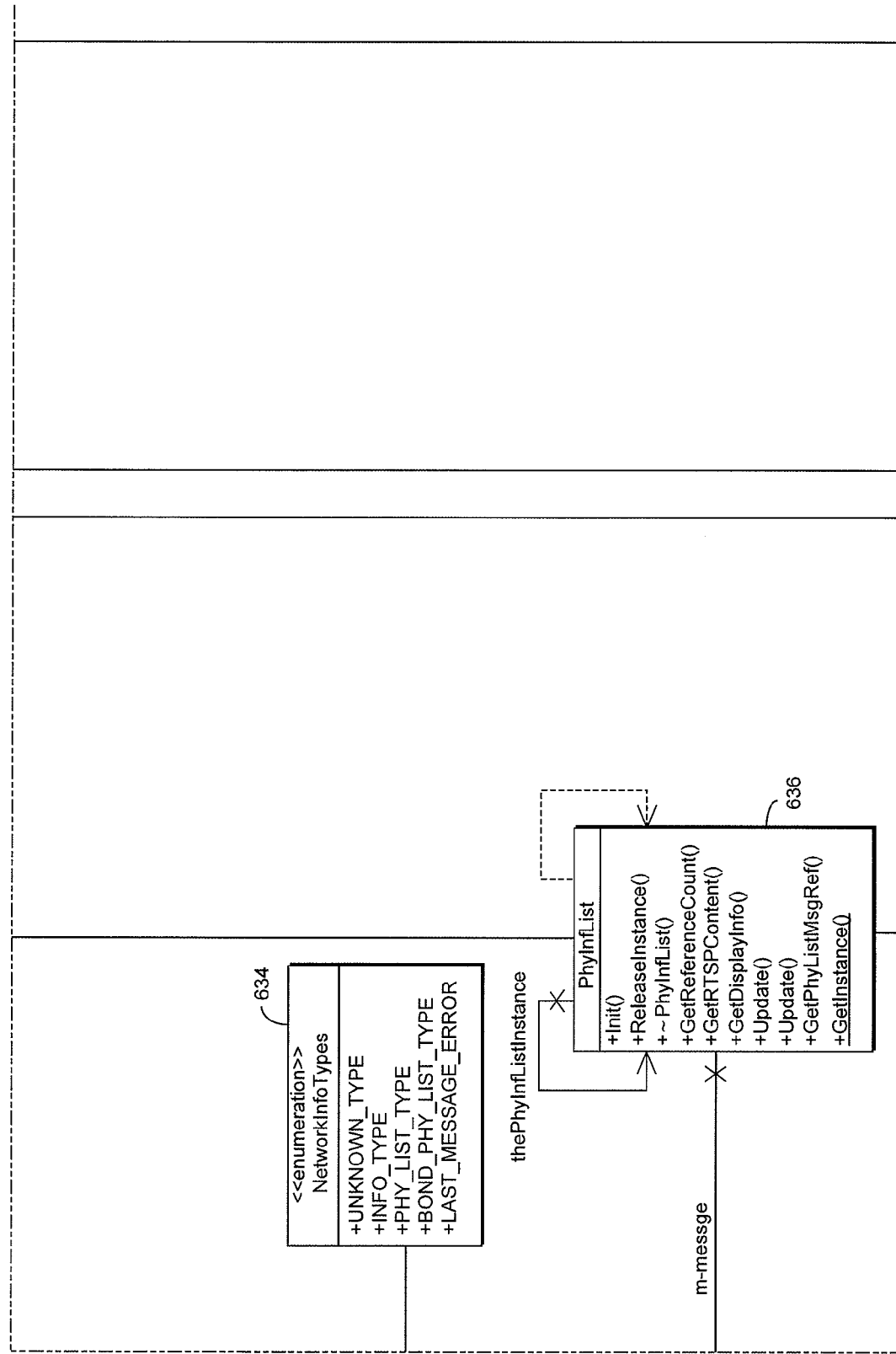
Figure 6K:
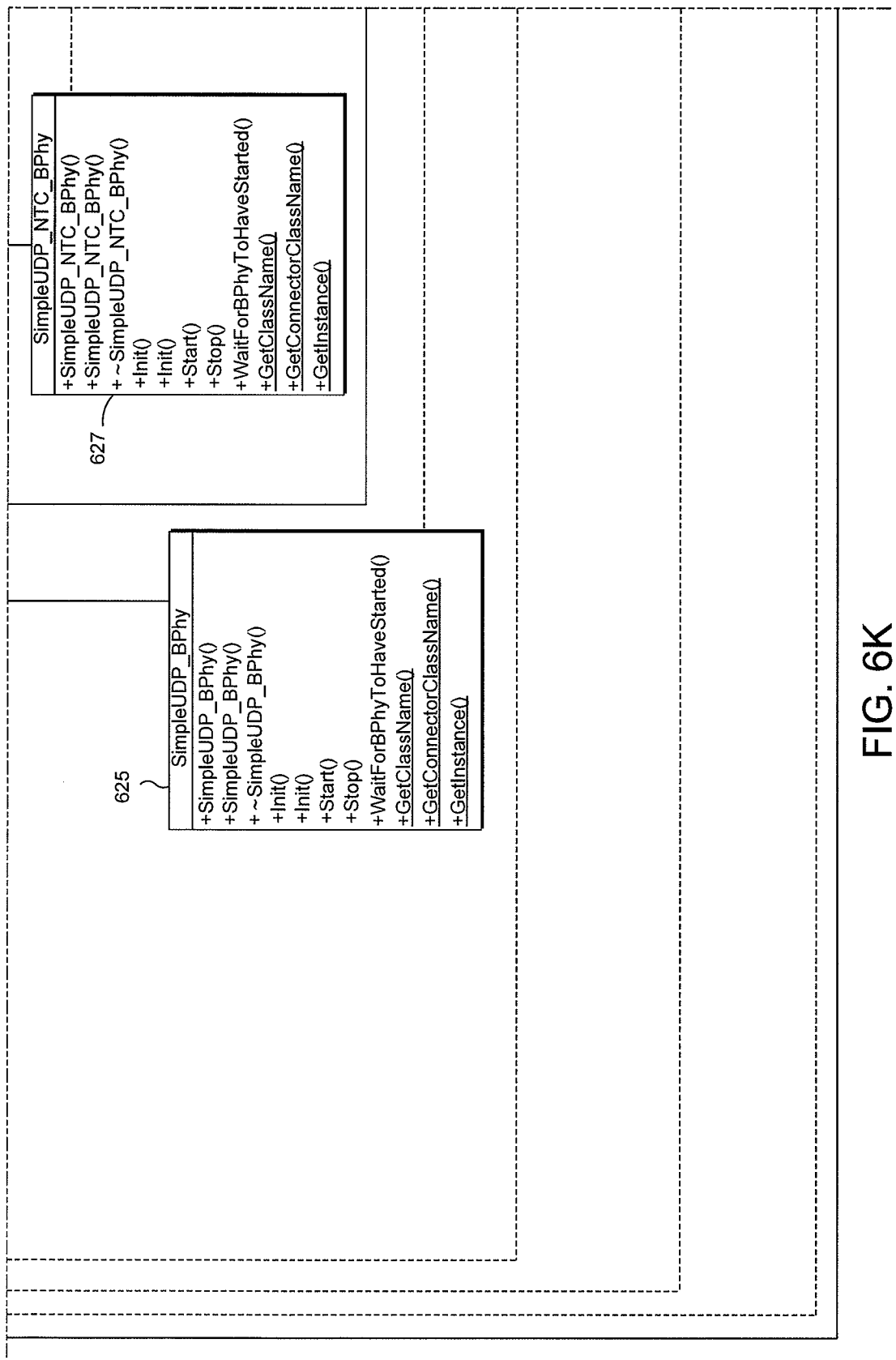
Figure 6L:
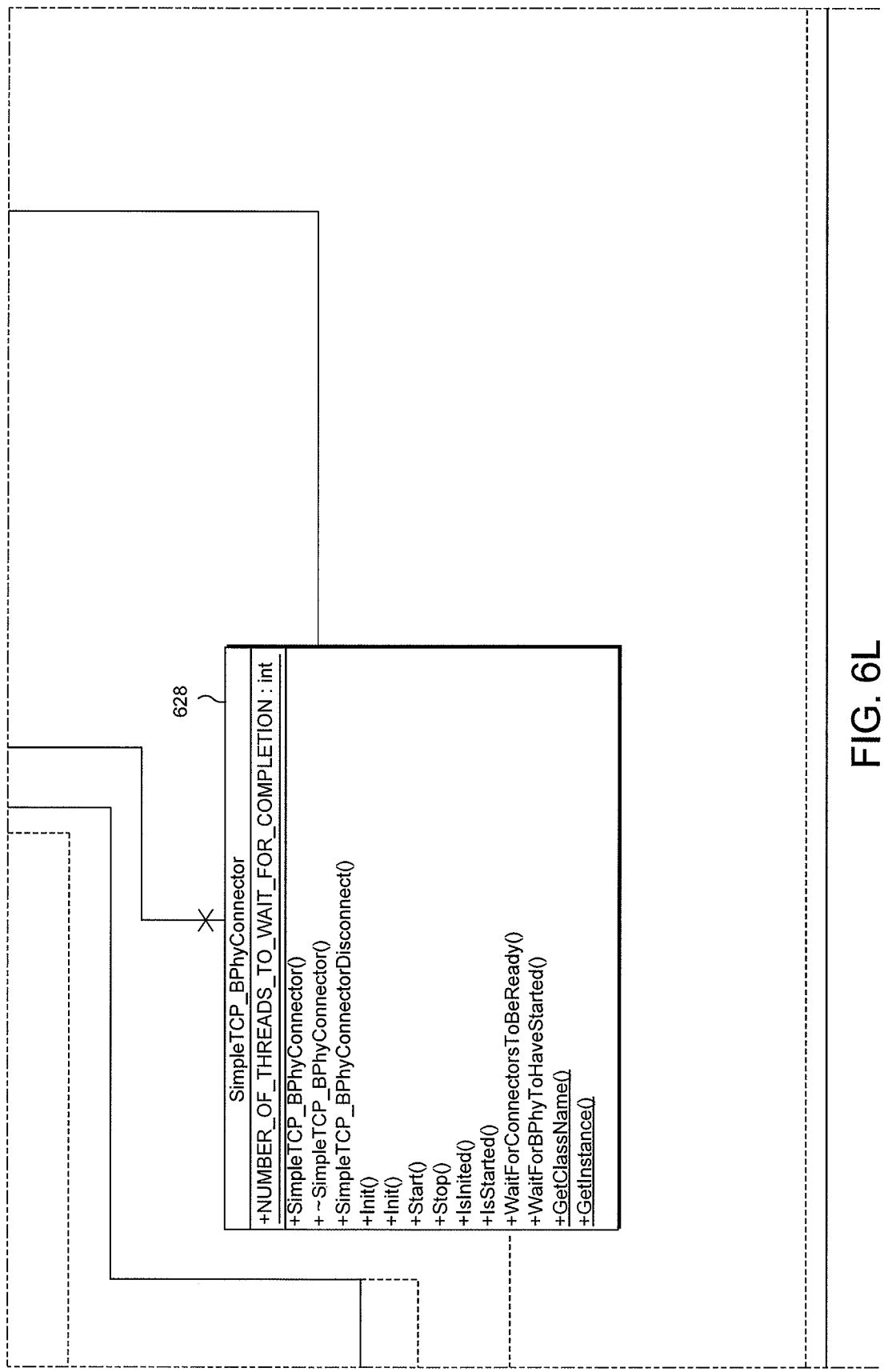
Figure 6M:
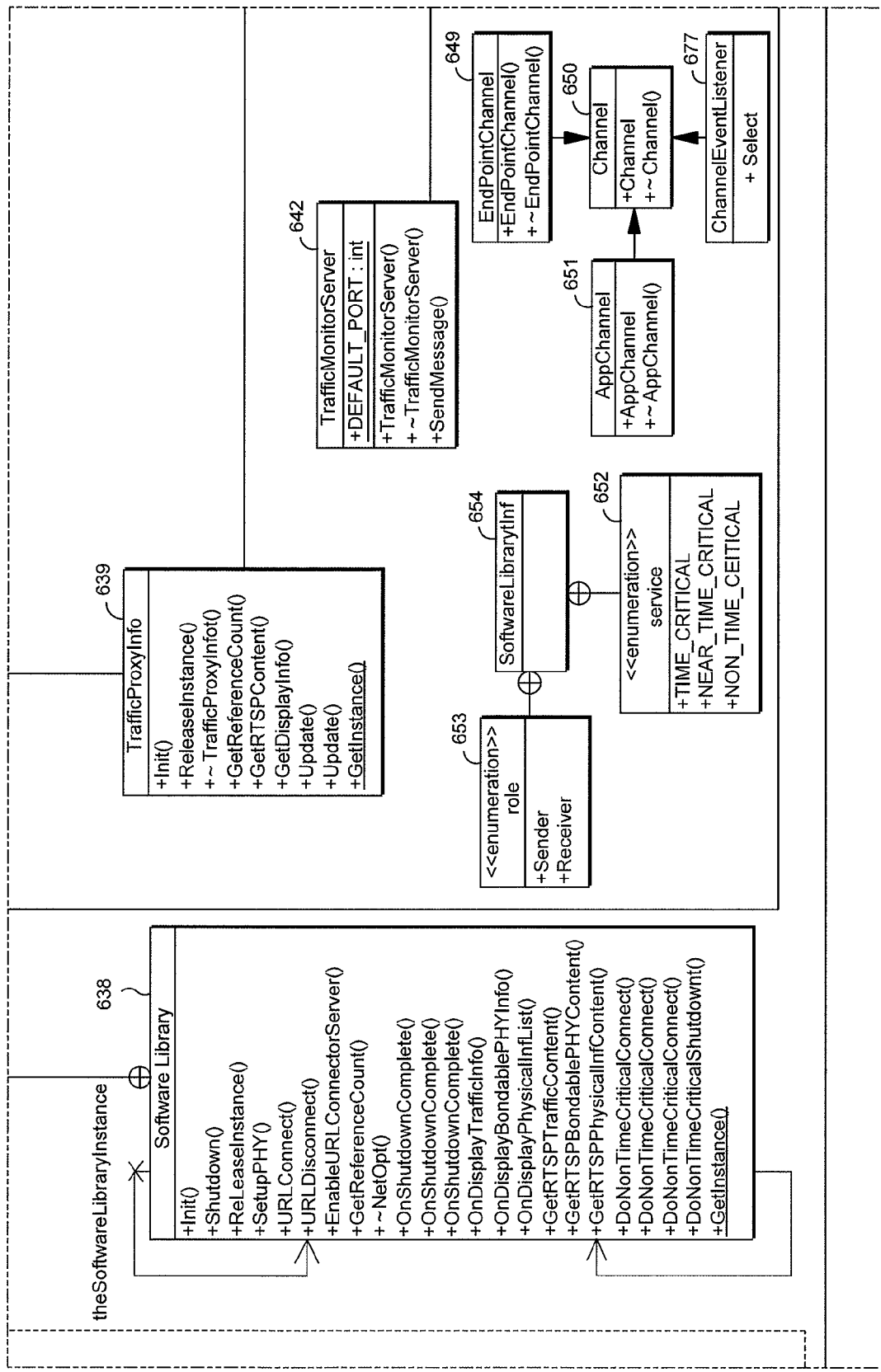
Figure 6N:
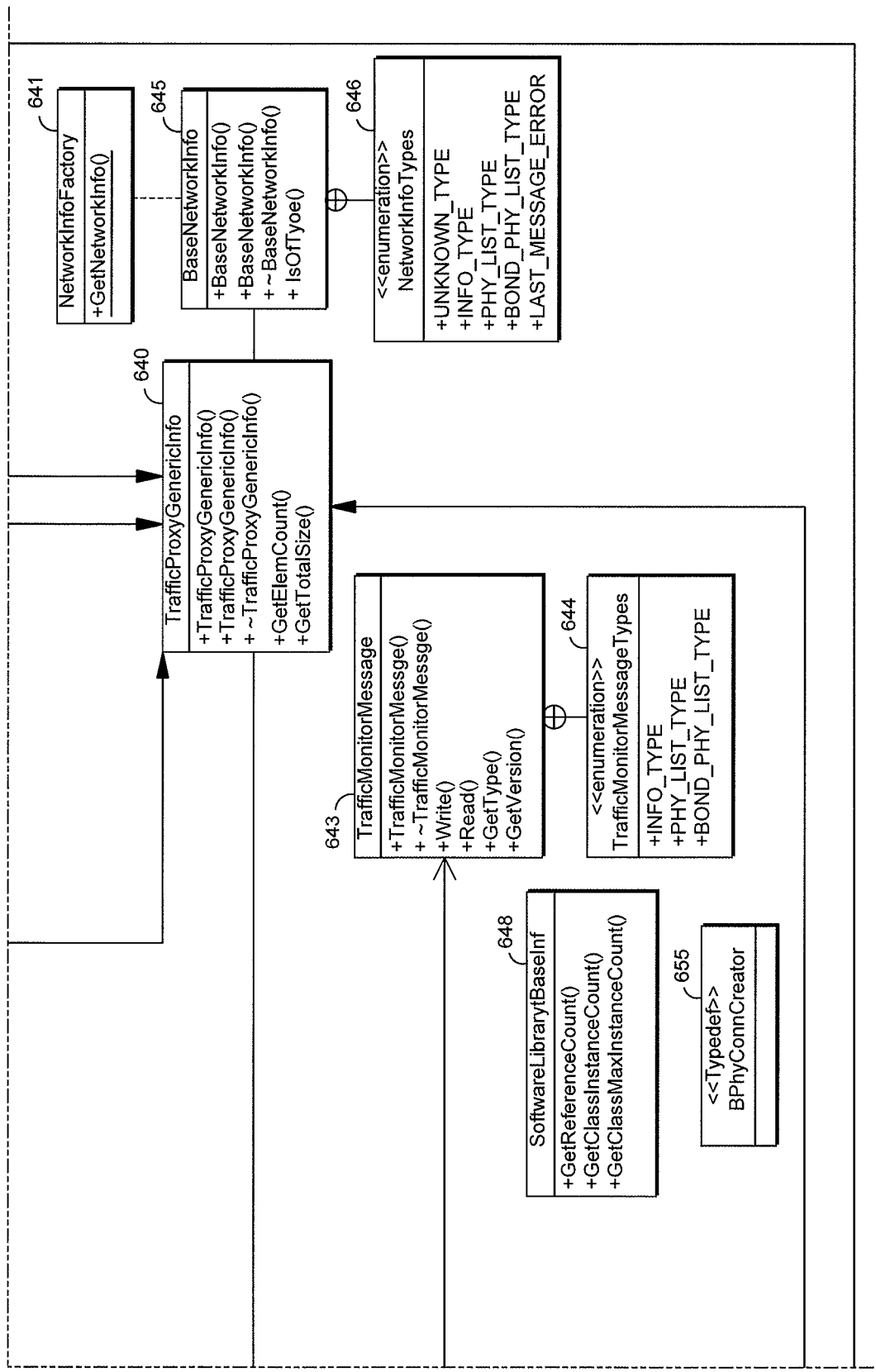

The above-mentioned architecture will now be described in more detail in connection with FIG. 5. FIG. 5 is another view of the sending endpoint 101 and the receiving endpoint 102 shown in FIG. 1, for providing an explanation of an example embodiment of the architecture included in both endpoints. As discussed above in connection with FIG. 1, the architecture is for streaming data from a sending endpoint 101 to a receiving endpoint 102 which are connected to each other by multiple networks (111, 112, 113, 114 of FIG. 1). Each of the sending endpoint 101 and the receiving endpoint 102 has multiple physical interfaces (105a and b, 106a and b, 107a and b and 108a and b of FIG. 1), each for interfacing to a respective one of the multiple networks. The architecture for controlling the streaming of the data is implemented on both the sending endpoint 101 and the receiving endpoint 102.

As shown in FIG. 5, the architecture on the sending endpoint 101 includes a software library 232 and a traffic monitor 234. The traffic monitor 234 is for gathering performance characteristics of each of the multiple physical interfaces. More specifically, the traffic monitor 234 is an operating system-specific application or (daemon) service that provides the software library 232 with all of the available physical interfaces, and with individual physical interface performance/traffic statistics and data. The traffic monitor 234 may obtain network status by periodically making system calls to system's data structures to acquire statistics for each physical interface of the sending endpoint 301. This data is then used by the traffic monitor 234 to specify corresponding configurations for bondable virtual interfaces, which will be described in more detail below, including a list of suitable known bondable virtual interfaces that can be used to transfer data based on current network traffic. The traffic monitor 234 communicates information back and forth between the software library 232. As shown in FIG. 5, the traffic monitor 234 communicates directly with the software library 232; however, in other embodiments, the traffic monitor 234 can communicate with the software library 232 via traffic proxy 248 as described above in connection with FIG. 4.

The software library 232 is for controlling the sending of the data stream from the sending endpoint 101. In controlling the sending of data, the software library 232 instantiates a plurality of bondable virtual interfaces 236 and a data organizer 238. In addition, the software library 232 instantiates logical physical interfaces 509. The logical physical interface 509 is an abstraction of a physical interface, which has a uniform interface. In addition, the bondable virtual interfaces 236 are instantiated by the software library based on the information communicated by the traffic monitor 234, for splitting the data stream into multiple data substreams at the sending endpoint 101. A bondable virtual interface is a clustering of two or more logical physical interfaces as a bondable object that aggregates available bandwidth with a single thread to manage a common buffer memory. The bondable virtual interface has a second thread to listen to a single feedback path from the receiving endpoint 102, and has additional threads for managing data transfer from a common buffer memory to each of an associated logical physical interface. An example of a bondable virtual interface is a pair of 802.11g wireless interfaces combined for a nominal available bandwidth of 44 Mb/s, assuming ~22 Mb/s of effective bandwidth for each individual interface.

In addition, the data organizer is used for designating one of the plurality of bondable virtual interfaces 236 for splitting the data stream. At the sending endpoint 101, the data organizer 238 instantiates a data splitter 238 for implementing the designated one of the plurality of bondable virtual interfaces 236 at the sending endpoint 101. In this regard, the data organizer 238 is a parent object for the data splitter, and includes functionality for the registration of new or added bondable virtual interfaces. Moreover, the data organizer 238 is inherited by the data splitter 238. The data splitter 238 contains the bondable virtual interfaces 236 class implementation, and contains the associated behavior for splitting the input data stream onto the multiple physical interfaces.

Similar to the sending endpoint 101, in the receiving endpoint 102, the architecture includes a software library 332 and a traffic monitor 334. The traffic monitor 334 is for gathering performance characteristics of each of the multiple physical interfaces. More specifically, the traffic monitor 334 is an operating system-specific application or (daemon) service that provides the software library 332 with all of the available physical interfaces and with individual physical interface performance/traffic statistics and data. The traffic monitor 334 may obtain network status by periodically making system calls to system's data structures to acquire statistics for each physical interface of the receiving endpoint 102. This data is then used by the traffic monitor 334 to specify corresponding configurations for bondable virtual interfaces, which will be described in more detail below, including a list of suitable known bondable virtual interfaces that can be used to transfer data based on current network traffic. The traffic monitor 334 communicates information back and forth between the software library 332. In FIG. 5, the traffic monitor 334 communicates directly with the software library 332; however, in other embodiments, the traffic monitor 334 can communicate with the software library 332 via a traffic proxy as described above in connection with FIG. 4.

The software library 332 is for controlling the receiving of the data stream at the receiving endpoint 102. In controlling the receiving of data, the software library 332 instantiates a plurality of bondable virtual interfaces 336 and a data organizer 338. In addition, the software library 332 instantiates logical physical interfaces 510. The logical physical interfaces 510 are substantially the same as logical physical interfaces 509, and provide the same functions. The bondable virtual interfaces 336 are instantiated by the software library based on the information communicated by the traffic monitor 334, for combining the multiple data sub-streams into the data stream at the receiving endpoint 102. In addition, the data organizer is for designating one of the plurality of bondable virtual interfaces 236 for combining the data stream.

At the receiving endpoint 102, the data organizer 338 instantiates a data combiner 338 for implementing the designated one of the plurality of bondable virtual interfaces 336 at the receiving endpoint 102. In this regard, the data combiner 338 is a parent object for the data combiner 338, and includes functionality for the registration of new or added bondable virtual interfaces. Moreover, the data organizer 338 is inherited by the data combiner 338. The data combiner 338 contains the bondable virtual interfaces 336 class implementation, and contains the associated behavior for combining multiple input streams into a resulting single data stream.

At startup of the architecture, the data splitter 238 and the data combiner 338 read network statistics provided by the traffic monitor 234 and 334. The traffic monitors' network statistics are updated periodically (at optionally application specified intervals), and are organized to display an ordered list of recommended bondable physical interface configurations, along with a minimum bandwidth available for each.

As further shown in FIG. 5, the sending endpoint 101 and the receiving endpoint 102 are each connected to one or more applications, such as application server 501 and application player 502, respectively. In this regard, the software library 232 of the sending endpoint 101 and the software library 332 of the receiving endpoint 102 further instantiate one or more application channels 240 and 340, respectively, connecting the software libraries 232 and 332 to one or more applications 501 and 502, respectively. The one or more application channels 240 write data to the software library 232, the written data having been received by the sending endpoint 101 from the one or more applications 501. In addition, the one or more application channels 340 read data from the software library 332, the read data having been sent from the receiving endpoint 102 to the one or more applications 502 connected to the receiving endpoint 102. For the application channels, a "named-socket" can be used, which provides a very similar interface to the traditional "single socket" approach in common usage. Moreover, the one or more application channels 240 and 340 include an event handling mechanism to indicate when there is data to be read from or written to the software libraries 232 and 332. The event handling mechanism for a named-socket is a select; however, many other means can be used for triggering events on the application channels.

As shown in FIG. 5, the software libraries 232 and 332 further instantiate multiple endpoint channels 242 and 342, respectively, connecting the software libraries 232 and 332 to the multiple physical interfaces 105a to 108a and 105b to 108b through network driver buffers 505 and 506. The multiple endpoint channels 242 and 342 write data to the software library 332, the written data having been received at the receiving endpoint 102 from the sending endpoint 101, and read data from the software library 232, the read data having been sent from the sending endpoint 101 to the receiving endpoint 102. The multiple endpoint channels 242 and 342 include an event handling mechanism to indicate when there is data to be read from or written to the multiple physical interfaces 105a and 105b to 108a and 108b. In addition, the network driver buffers 505 and 506 are provided to store data before sending data on the sending side, and before reconstructing the data stream and providing the single data stream to the application player 502 on the receiving side. In general, for the multiple endpoint channels, UDP and/or TCP sockets are used to write and read data to/from a network. Moreover, the event handling mechanism for the endpoint channels can be a select; however, other means for triggering events on the endpoint channels may be used. Lastly, an endpoint channel usually has an associated physical interface (e.g., an Ethernet socket); however, other instances exist in which this is not the case. For example, the case exists of using one physical interface but using multiple ports (e.g., using 2 sockets using IP address 192.168.10.1 port 10000 and port 10001).

The bondable virtual interfaces 236 and 336, as shown in FIG. 5, are created by the data splitter 238 or the data combiner 338 to perform the splitting or combining of the data stream. The bondable virtual interfaces 236 and 336 conform to an interface, which allows them to be used generically in the framework. In other words, one bondable virtual interface could be substituted with another bondable virtual interface quite easily without changing any interface requirements elsewhere in the software library, or in an application. Lastly, a bondable virtual interface can have multiple physical interfaces associated with it, or a bondable virtual interface can have a single logical physical interface (as is the case with sockets using one physical interface but with multiple ports).

In addition, the bondable virtual interfaces 236 and 336 have the basic functionality to split or combine data (based upon the role provided by the data splitter 238 or the data combiner 338). In general, the bondable virtual interfaces may be a reduction of a number or a set of rules regarding how to handle data from one or more application channels split over one or more endpoint channels (or vice versa, when recombining data). Thus, different types of bondable virtual interfaces may be created. Three examples of such bondable virtual interfaces are: a simple TCP Bondable virtual interface, a simple UDP bondable virtual interface, and a feedback TCP bondable virtual interface. A simple TCP bondable virtual interface is a bondable virtual interface consisting of multiple physical network interfaces, sending data with each interface using standard TCP connections. An example of a simple TCP bondable virtual interface would be a "round robin" type bondable virtual interface, which uses multiple interfaces to send data.

A simple UDP bondable virtual interface is a bondable virtual interface consisting of multiple physical network interfaces, and sending data with each interface using standard UDP datagrams.

A feedback TCP bondable virtual interface is a bondable virtual interface which utilizes feedback from the receiving endpoint to change the manner in which data is sent over multiple physical network interfaces using TCP connections.

When designating ones of the plurality of bondable virtual interfaces 236 and 336, the data splitter 238 and the data combiner 338 negotiate to designate one of the bondable virtual interfaces, based on the performance characteristics of the multiple physical interfaces 105a to 108a and 105b to 108b and available ones of the plurality of bondable virtual interfaces. During the negotiation between the data splitter 238 and the data combiner 338, the data splitter 238 presents available ones of the plurality of bondable virtual interfaces, and the data combiner 338 selects one of the available ones of the plurality of bondable virtual interfaces.

Furthermore, the software libraries 232 and 332 further instantiate a plurality of bondable virtual interface connectors 244 and 344, respectively. Each bondable virtual interface connector is associated with a specific bondable virtual interface. The bondable virtual interface connectors 244 and 344 ensure that the connections between the software libraries 232 and 332 and the multiple physical interfaces 105a to 108a and 105b to 108b via the multiple endpoint channels 242 and 342, respectively, are ready to accept data before sending data from the sending endpoint 101 to the receiving endpoint 102. In addition, the bondable virtual interface connectors 244 and 344 ensure that the connections between the software libraries 232 and 332 and the one or more applications 501 and 502 via the one or more application channels 240 and 340, respectively, are ready to accept data before sending data from the sending endpoint 101 to the receiving endpoint 102.

When sending streaming data from the sending endpoint 101 to the receiving endpoint 102, the one or more applications 501 specify a category of time objective: the categories include a non-time critical objective, a time critical objective, or a near-time critical objective. A non-time critical data stream is a data stream where the data should be received without error; however, time may not be a critical factor (i.e., there may be scenarios (or situations) where time is a critical factor). In these scenarios, a contributing factor for a non-time critical data stream should also include data integrity and thus, in these situations, there is a significant difference between non-time critical, near-time critical and time critical. For example, a non-time critical objective would be specified for a simple file transfer, because the data in this scenario ordinarily should be received without error, and arrival time may not be important for this data.

A near-time critical data stream is a data stream where the data is bound to an endpoint within a range of time. For example, a video stream can possibly be buffered for 5 seconds before the first video frame is displayed on the screen. Or, in the case of a larger memory buffer or hard drive, the first couple of minutes can be burst from the sender to the receiver (i.e., video server to video player). Thus, after the head start (buffer or system priming) has been buffered, the remaining data can be sent in a more leisurely manner, as long as it is received in time to be consumed by the player without interruption in playback. Further, in video streams, it is often the case that some of the packets may be dropped, corrupted or lost due to collision or other network impairments. In this regard, UDP is often the de-facto standard of video streaming and UDP does not guarantee delivery.

For a time-critical data stream, it is usually imperative that the information be received as quickly as possible. Moreover, a time critical objective would be specified when streaming an interactive video stream such as a video conference, because the data in this scenario should be received as soon as possible, while a loss of an insignificant portion of the data may be acceptable.

Because a time objective is specified for the data to be sent, the architecture has greater flexibility in choosing which of the multiple physical interfaces to utilize in sending data. Thus, instead of solely relying on network bandwidth of the multiple physical interfaces, the architecture can utilize the time objectives to provide an even more efficient means of sending data between the endpoints.

For the near-time critical and the time critical data streams, transferring of the stream will involve a payload stream mechanism, a feedback stream mechanism 515, and a control stream mechanism. The payload stream mechanism sends the payload content from the sending endpoint 101 to the receiving endpoint 102. In the architecture, the payload stream is sent via a bondable virtual interface, for example, using an RTP-like protocol where multiple physical interfaces will be used to send data to the receiving endpoint 102. The feedback stream mechanism 515 sends processing and physical interface behavior information between the receiving endpoint 102 and the sending endpoint 101 (or in other scenarios vice-a-versa) using, for example, an RTCP like protocol. The control stream mechanism sends content control commands from the receiving endpoint 102 to the sending endpoint 101 (e.g., play, pause, etc.) using, for example, an RTSP like protocol.

For a non-time critical data stream, the transferring of the stream within the architecture will have the same behavior as the near-time and the time critical data streams with no control stream. Thus, the transferring of the stream for a non-time critical data stream involves a payload stream mechanism and a feedback stream mechanism, each having similar characteristics as the stream mechanisms of the near-time and the time critical data streams.

Furthermore, the software libraries 232 and 332 each further comprise a software application program interface 280, as described in connection with FIG. 4, which consists of a set of commands used by the one or more applications 501 and 502 to utilize the architecture. In addition, the software libraries 232 and 332 each instantiate a bondable virtual interface factory 246, as described in connection with FIG. 4, for registering the newly created ones of the plurality of bondable virtual interfaces, unregistering ones of the plurality of bondable virtual interfaces which are no longer available, and providing a list of available bondable virtual interfaces to the data organizer.

As discussed above, the traffic monitors 234 and 334 may communicate with the software libraries 232 and 332, respectively, via a traffic proxy. In this case, the software libraries 234 and 334 each further instantiate a traffic proxy 248 (as described in connection with FIGS. 2 and 4) and a traffic proxy 348 (as described in connection with FIG. 3) for communicating information between the traffic monitors 234 and 334 and the software libraries 232 and 332, respectively, via a shared common interface. The common interface is a shared library, which contains objects containing information and the means to share this common data between the traffic monitors 232 and 332 and the traffic proxies 248 and 348. The transport mechanism can be changed easily and additional information can be added (e.g., by adding new objects). Furthermore, in cases where the bondable virtual interface uses some form of feedback mechanism, traffic problems identified by feedback will be relayed to the traffic monitors 234 and 334 via the traffic proxies 248 and 348.

In general, all interaction between the architecture and other applications is conducted through a basic interface. This basic interface is comprised of a core functionality, which is specific to the architecture, and behavioral functionality, which is specific to the operation of the interfacing application. Examples of core functionality would be a startup and shutdown of the architecture. Behavioral functionality examples might include RTSP, or URL connection functionality. For example, the architecture will provide a setup functionality to extend the standard RTSP setup functionality, in which the extension to RTSP is obtainable from an RTSP OPTIONS command. In another example, URL connection functionality can be added to achieve file transfer behavior.

FIG. 6 (6A to 6N) shows a Unified Modeling Language (UML) class diagram for an architecture of an example embodiment. As shown in FIG. 6, a TransferType 630 object is contained by a SoftwareLibrary object 638.

Also shown in FIG. 6, is a SimpleUDP_NTC_BPhyConnector object 601, a SimpleTCP_Redirectable_BPhyConnector object 602, and a ReliableUDP_NTC_BPhyConnector object 603, all of which associate and are dependent upon BondablePhyConnectorInf object 604. In addition, a SimpleUDP_PhyConnector object 647, and a SimpleTCP_BPhy-Connector 628 all associate with and are dependent upon the BondablePhyConnectorInf object 604. Moreover, a BondablePhyFactory object 605 is dependent upon the BondablePhyConnectorInf object 604. Furthermore, a BondableBPhy-Connector object 606 associates with BondablePhyConnectorInf object 604.

The SimpleTCPBPhyConnector object 628 also associates with BondablePhyInf object 613. Moreover, a SimpleTCP_Redirectable_BPhy object 622, a SimpleTCP_BPhy object 621, a ReliableUDP_NTC_BPhy object 624, a SimpleUDP NTCJBPhy object 627, a SimpleUDPJBPhy object 625, a DataCombiner object 610, and a DataSplitter object 608 are all dependent upon the BondablePhyInf object 613. In addition, the SimpleTCP_BPhy object 621, the SimpleTCP_Redirectable_BPhy object 622, the ReliableUDP_NTC_BPhy object 624, the SimpleUDP_BPhy object 625, and the SimpleUDP_NTC_BPhy 627 all associate with BondablePhyBase object 623. The BondablePhyBase object 623 associates with the BondablePhyInf object 613. BondablePhy object 611 also associates with the BondablePhyInf object 613.

The DataCombiner object 610 and DataSplitter object 608 each are associated with and inherit the DataOrganizer object 607, which is dependent upon the BondabtePhyConnector object 606 and the BondablePhyConnectorInf object 604. In addition, a DataCombinerEventListener object 609 and a DataSplitterEventListener object 612 associate with the DataCombiner object 610 and the DataSplitter object 608, respectively.

Furthermore, a TrafficProxyInfoTypes object 670 is contained by a TrafficProxyInfoInf object 617. In addition, a PhyInfList object 636, a TrafficProxyInfo object 639, a BondablePhy List object 631, and a TrafficProxy object 615 all associate with the TrafficProxyInfoInf object 617. In addition, a TrafficProxyEventListener 620 associates with the TrafficProxy object 615, and the TrafficProxy object 615 associates with a TrafficMonitorClient object 618. The BondablePhyList also associates with the TrafficProxyGenericInfo object 640 and a BondablePhyListMessage object 632. Moreover, the TrafficProxyInfo object 639 and a BaseNetworkInfo 645 associate with the TrafficProxyGenericInfo object 640. TheBaseNetworkInfo object 645 is dependent upon the NetworkInfoFactory object 641, and a NetworkInfoTypes object 646 is contained by the BaseNetworkInfo object 645.

Moreover, the BondablePhyListMessage object 632, the TrafficInfoMessage object 633, and the PhyListMessage object 637 all associate with a NetworkMessage object 635. In addition, a NetworkInfoTypes object 634 is contained by the NetworkMessage object 635. Furthermore, the PhyInfList object 636 associates with the PhyListMessage object 637 and the TrafficProxyGenericInfo object 640.

In addition, a TrafficMonitorMessageTypes object 644 is contained by a TrafficMonitorMessage object 643, and a TrafficMonitorServer object 642 associates with the TrafficMontiorMessage object 643.

FIG. 6 also shows that an EndPointChannel object 649 and an AppChannel object 651 associate with a Channel object 650. Also shown in FIG. 6, are an <<enumeration>> role object 653 and an <<enumeration>> service object 652 which interface with a SoftwareLibraryInf object 654. A ChannelEventListener object 677 is also associated with the Channel object 650.

Use Cases

Some example implementations are described below, which use the architecture according to an example embodiment. These use cases include situations in which the architecture will be used, and the steps to be implemented for these situations. The following use cases are not an extensive list of use cases for all scenarios of using the architecture; rather, other use cases and implementations may exist or be developed.

Video Streaming Use Case

Figure 7:
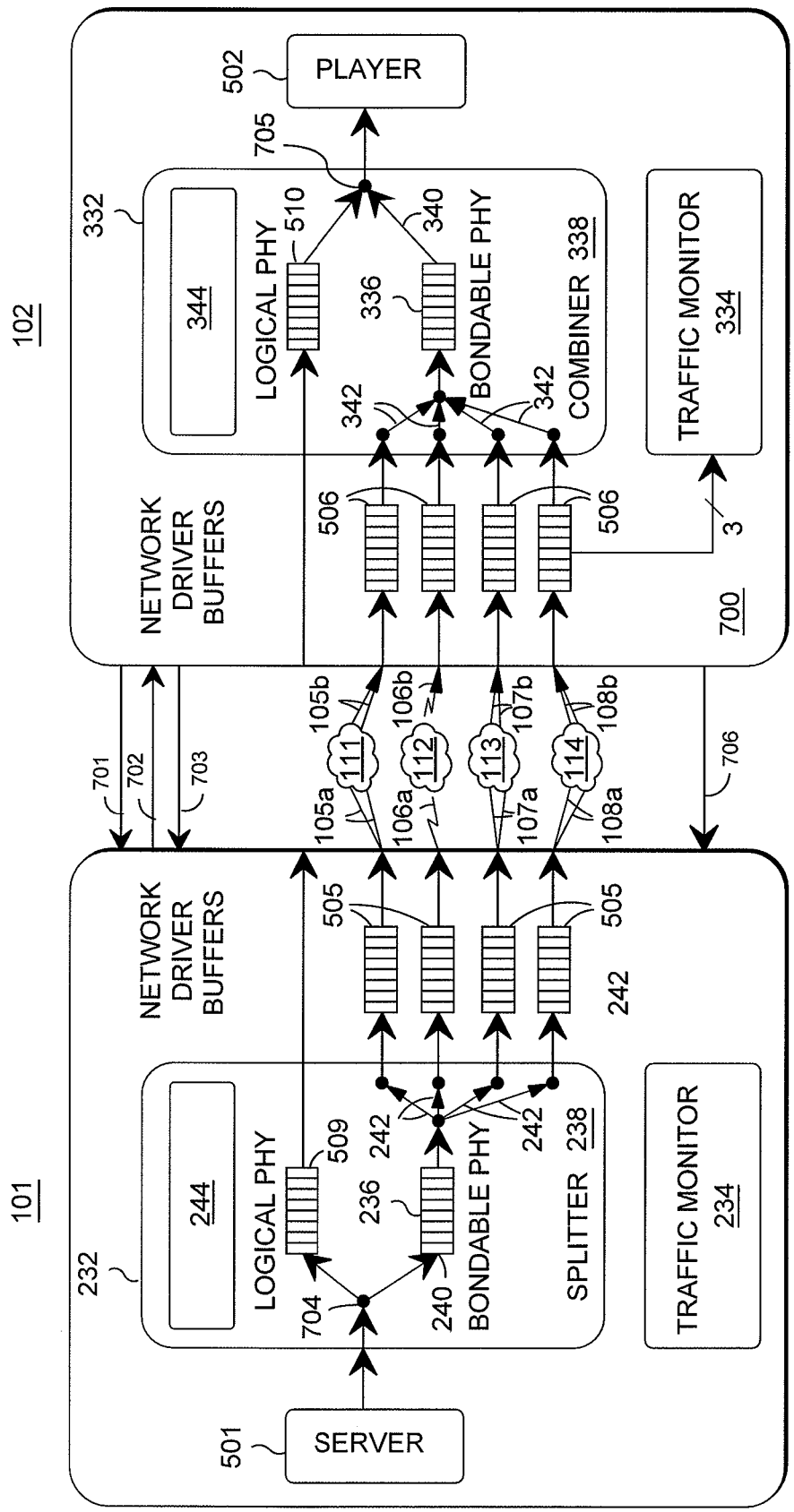
FIG. 7 is an illustration for providing an explanation of a sending endpoint and a receiving endpoint negotiating a playback of a media stream in accordance with an example embodiment.

FIG. 7 is an illustration for providing an explanation of a sending endpoint and a receiving endpoint negotiating a playback of a media stream. In particular, FIG. 7 shows how the sending endpoint 101 and the receiving endpoint 102 of FIG. 1 negotiate a playback of a media stream over multiple interfaces 105a and 105b to 108a to 108b connecting the sending endpoint 101 and the receiving endpoint 102 to multiple networks 111 to 114 using a session initiation and control protocol such as RTSP. FIGS. 8 to 15 describe this behavior of the sending endpoint 101 and the receiving endpoint 102, using UML sequence diagrams. FIG. 7 describes the behavior at a top level in order to better understand the behavior from an overall system viewpoint. Each of the sending endpoint and the receiving endpoint has multiple physical interfaces (105a and b, 106a and b, 107a and b and 108a and b of FIG. 1), each for interfacing to a respective one of the multiple networks. The architecture for controlling the streaming of data is implemented on both the sending endpoint 101 and the receiving endpoint 102.

As shown in FIG. 7, each of sending endpoint 101 and receiving endpoint 102 are connected to multiple physical interfaces 105a to 108a and 105b to 108b, respectively, which connect the endpoints through multiple networks 111 to 114, as similarly shown in FIG. 5. Also similar to the structure in FIG. 5, each of the sending endpoint 101 and the receiving endpoint 102 includes an architecture for controlling the streaming of data over the multiple physical interfaces 105a to 108a and 105b to 108b, the architectures including components such as the software libraries 232 and 332 and traffic monitors 234 and 334.

In FIG. 7, the traffic monitors 234 and 334 on the sending endpoint 101 and receiving endpoint 102, respectively, periodically record the current status of the multiple physical interfaces 105a and 105b to 108a and 108b, monitoring such statistics as the number of dropped packets since the last observation, the number of packets received in error, and the number of collisions observed on this interface (700). If possible, knowledge of the link rate (capacity) and bandwidth consumed by observed traffic are used to calculate available bandwidth remaining for each of the physical interfaces. Known device profiles (i.e., combinations of available interfaces into logical and bondable virtual interfaces) are used to create a list of paths, in preferred order, using criteria such as, for example, available bandwidth, latency, observed or expected congestion, or perhaps all three. This list is used to negotiate the desired set of interfaces, which forms the bondable virtual interfaces 236 and 336, to use when playing back a media stream.

Assuming that the receiving endpoint 102 already has the correct URL for a data stream, the receiving endpoint 102 contacts the sending endpoint 301 to initiate playback of that URL. This playback request is accompanied by a list of preferred profiles to use for playback, as obtained from the traffic monitor 334 of the receiving endpoint 102 (701).

The sending endpoint 101 receives the playback request and the profile list, and uses its traffic monitor 234 to generate a sending side list of preferred profiles. The sending endpoint compares the profile lists looking for a good match, and communicates the chosen profile back to the receiving endpoint 102 (702).

The receiving endpoint 102 confirms (agrees) which paths are to be used, and requests the software library 332 instantiate the data combiner 338 with which to receive and reconstruct the expected media sub-streams (703). The sending endpoint 101 then receives the confirmation, and requests to have the software library 232 instantiate the data splitter 238 to handle the stream. Splitting and sending of the sub-streams over the multiple physical interfaces 105*a* and 305*b* to 108*a* and 108*b* then commences. In particular, the data splitter 238 splits the single data stream from the server application 501 into sub-streams via the bondable virtual interfaces 236 and 336 (704).

The data combiner then receives and reconstructs the stream, and passes it along to a player application for consumption on the sending endpoint (705). The data combiner 338 and/or the player application 502 generates feedback information, and sends it to the data splitter 238 in the sending endpoint 102.

After playback is complete (signaled, perhaps, by an RTSP teardown command), the architectures on either side of the connection shutdown the connections and the associated data splitter 238 and the data combiner 338. The traffic monitors 234 and 334 continue to run periodically to update network statistics for a next data transfer.

Startup Sequence for Receiving Endpoint

Figure 8:
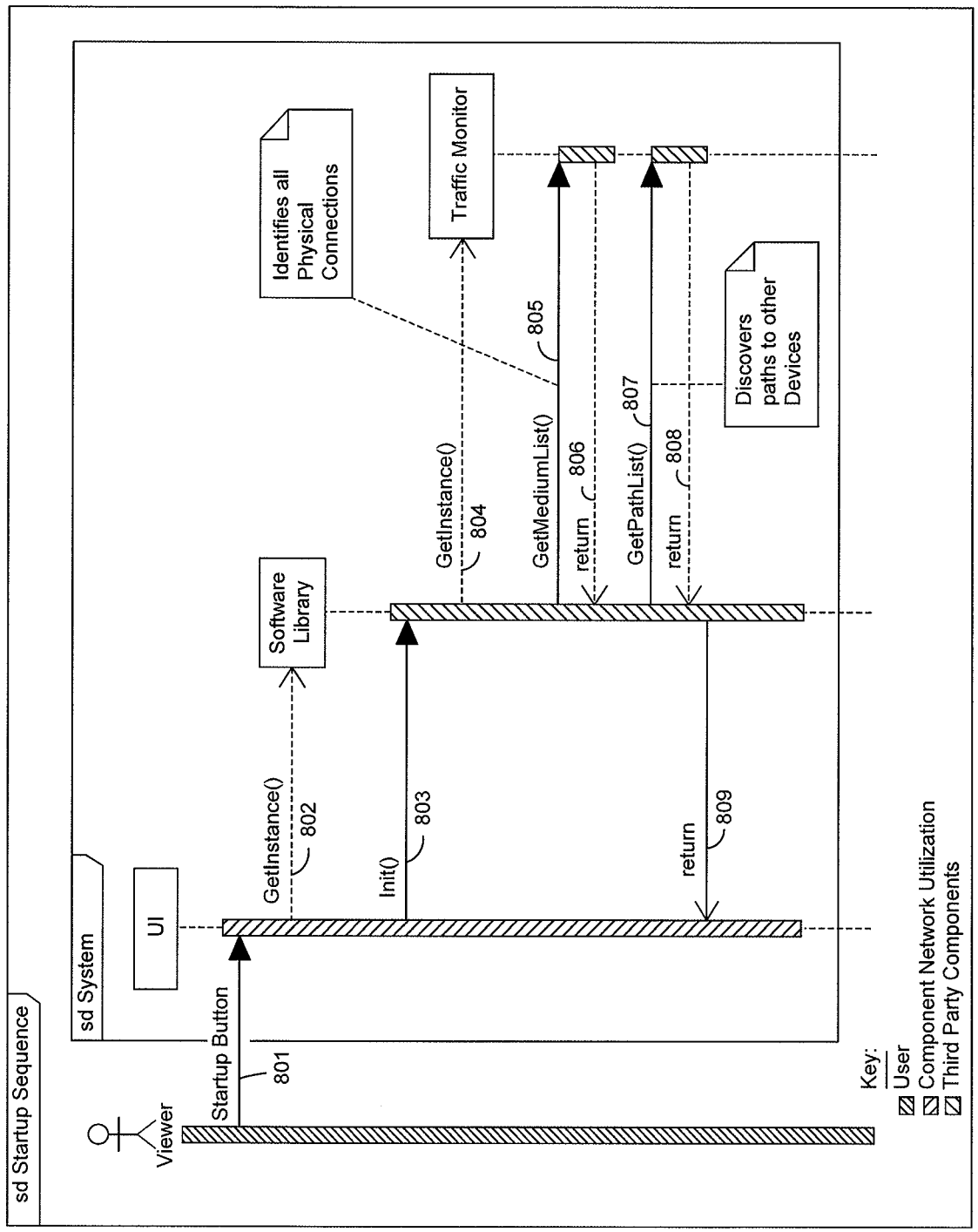
FIG. 8 shows a startup sequence diagram for the architecture on a receiving endpoint according to an example embodiment.

FIG. 8 shows a startup sequence diagram for the architecture on a receiving endpoint according to an example embodiment. As shown in FIG. 8, when a user powers-on a receiving endpoint, such as a set top box (STP) device, an application program such as application program 330 of FIG. 3 may start the architecture in the receiving endpoint 102 of FIG. 1. A set top box device is a hardware device that receives large media streams from a server, or in some cases sends large streams of data to a storage device (e.g., in the transferring of a video stream to be stored on a media server). The application program will get a handle to the architecture and call the init function. In the init function the software library will get a handle to the traffic monitor, and the software library will obtain information about the physical interfaces and the network paths.

More specifically, a user starts up the receiving endpoint 102 device, and a power-on sequence calls a start-up (801). Next, the application program calls the software library to obtain a reference (802), and uses the reference to call the init function (803). The software library then calls the traffic monitor to obtain a reference (804), and calls GetMediumList to obtain a list of the physical interfaces (805). The traffic monitor then returns the list of physical interfaces to the software library (806). The software library then calls a GetPathList( ) which discovers different paths to other devices (807). The traffic monitor then returns a list of the discovered paths to the software library (808), and the status of the init is returned to the application program (809).

Startup Sequence for Sending Endpoint

Figure 9:
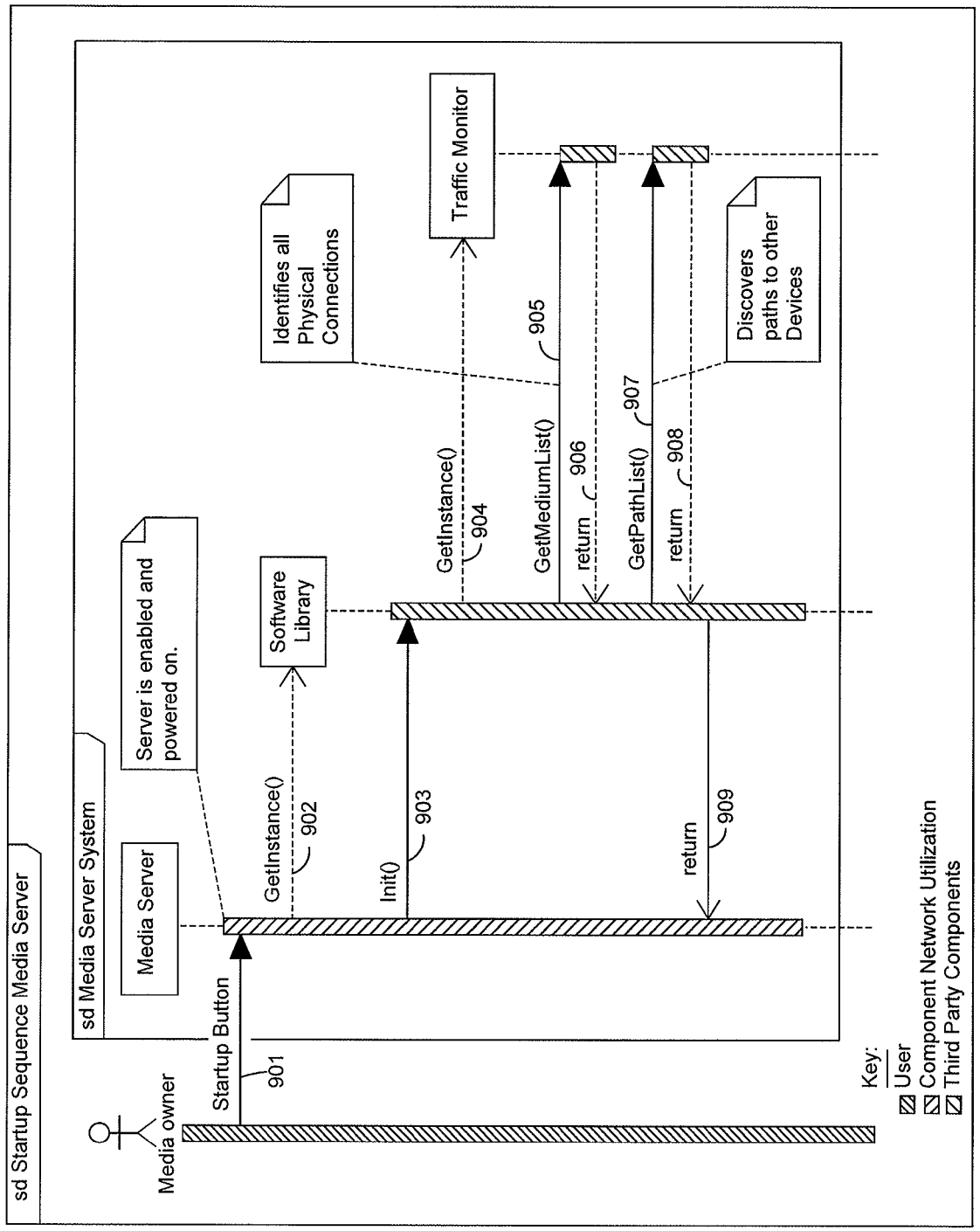
FIG. 9 shows a startup sequence diagram for a sending endpoint according to an example embodiment.

FIG. 9 shows a startup sequence diagram for a sending endpoint according to an example embodiment. As shown in FIG. 9, when a user starts the sending endpoint 101 of FIG. 1, an application program such as application program 230 of FIG. 2 will start the architecture in the sending endpoint 101. The application program will get a handle to the architecture and call the init function. In the init function, the software library will get a handle to the traffic monitor. The software library will then obtain information about the physical interfaces and the network paths.

More specifically, a user starts up the sending endpoint 101 device, and a power-on sequence calls a start-up (901). Next, the application program calls the software library to obtain a reference (902), and uses the reference to call the init function (903). The software library then calls the traffic monitor to obtain a reference (904), and calls GetMediumList to obtain a list of the physical interfaces (905). The traffic monitor then returns the list of physical interfaces to the software library (906). The software library then calls a GetPathList( ) which discovers different paths to other devices (907). The traffic monitor then returns a list of the discovered paths to the software (908), and the status of the init is returned to the application program (909).

With respect to FIGS. 8 and 9, the traffic monitors gather information from all the physical interfaces (e.g., bandwidth utilization), during initialization and periodically thereafter.

Shutdown Sequence

Figure 10:
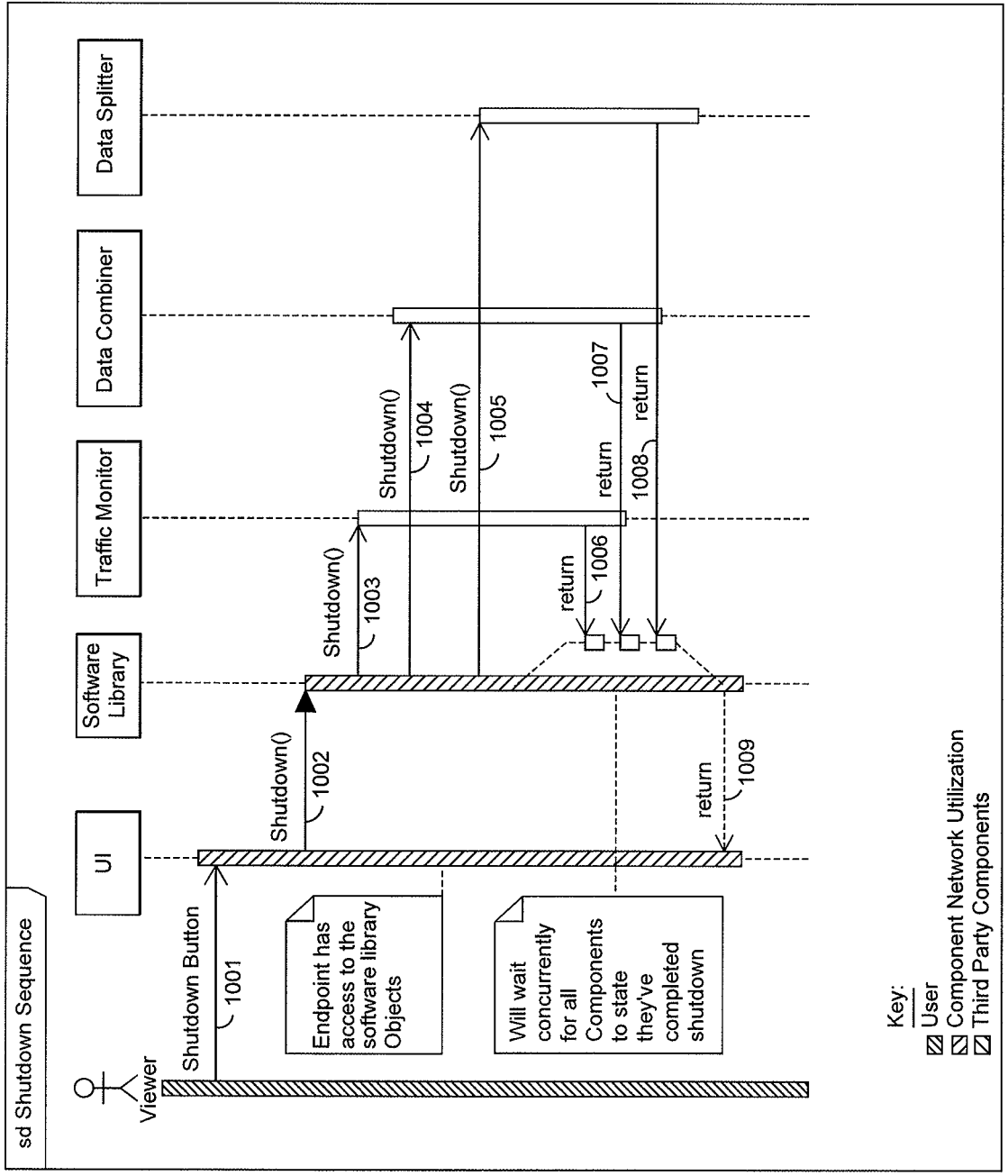
FIG. 10 shows a shutdown sequence diagram according to an example embodiment.

FIG. 10 shows a shutdown sequence diagram according to an example embodiment. As shown in FIG. 10, the application program, such as application program 230 or 330, which has a handle to the architecture can call the shutdown mechanism. The software library will call all of the components' (i.e., the traffic monitor's, the data combiner's or data splitter's) shutdown method. The software library will wait until all of the components return an OK before shutting down the architecture.

More specifically, a user initiates a quit (1001), and the application program calls a software library shutdown function (1002). Moreover, an asynchronous shutdown is sent to the traffic monitor (1003), an asynchronous shutdown is sent to the data combiner (1004), and/or an asynchronous shutdown is sent to the data splitter (the data splitter could have been invoked when the application sent data to a storage server) (1005). These asynchronously sent messages allow the software library to continue running. Next, the traffic monitor sends a return status to the software library (1006). This return is sent to the software library, where the software library is waiting for all the components to return their shutdown status. Then, the data combiner sends a return status to the software library (1007), and the data splitter sends a return status to the software library (1008). A status of the software library shutdown object is then returned to the application program (1009).

Retrieve Media List

Figure 11:
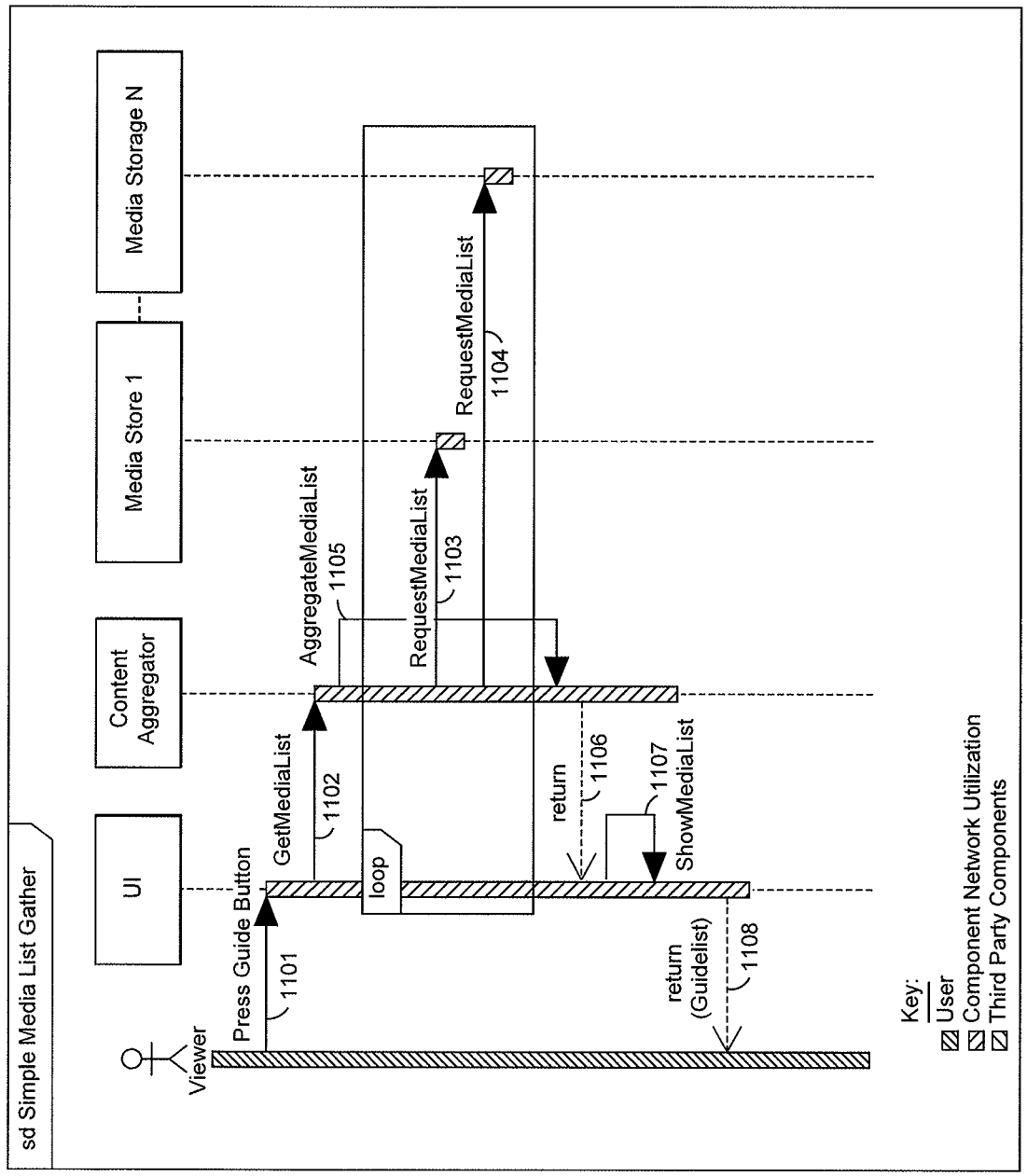
FIG. 11 shows a sequence diagram for gathering a list of media according to an example embodiment.

FIG. 11 shows a sequence diagram for gathering a list of media according to an example embodiment. This sequence diagram depicts a request for a movie or a media list from a content aggregator, which may include components not shown in FIG. 11. As shown in FIG. 11, a user presses a list button (e.g., a guide button), which is then sent to a user interface (UI) on a STB (1101). The UI then sends an appropriate message to a content aggregator (1102). The content aggregator then retrieves the media content by calling pertinent media stores for information (1103). The content aggregator calls more than one media store (for example, an N number of media stores), so as to obtain an extensive list of media content (1104). The aggregated list is then formed and returned to the STB's UI (1105). The STB UI processes the media list (1106), and the STB UI displays the media list (1107). The list is then returned to the software library (1108).

Streaming a Video

FIG. 12 shows a sequence diagram for streaming a video according to an example embodiment. The sequence diagram of FIG. 12 will be described in five sections, namely: (i) startup, (ii) setup, (iii) command, (iv) stream, and (v) teardown.

(i) Startup

Figure 12A:
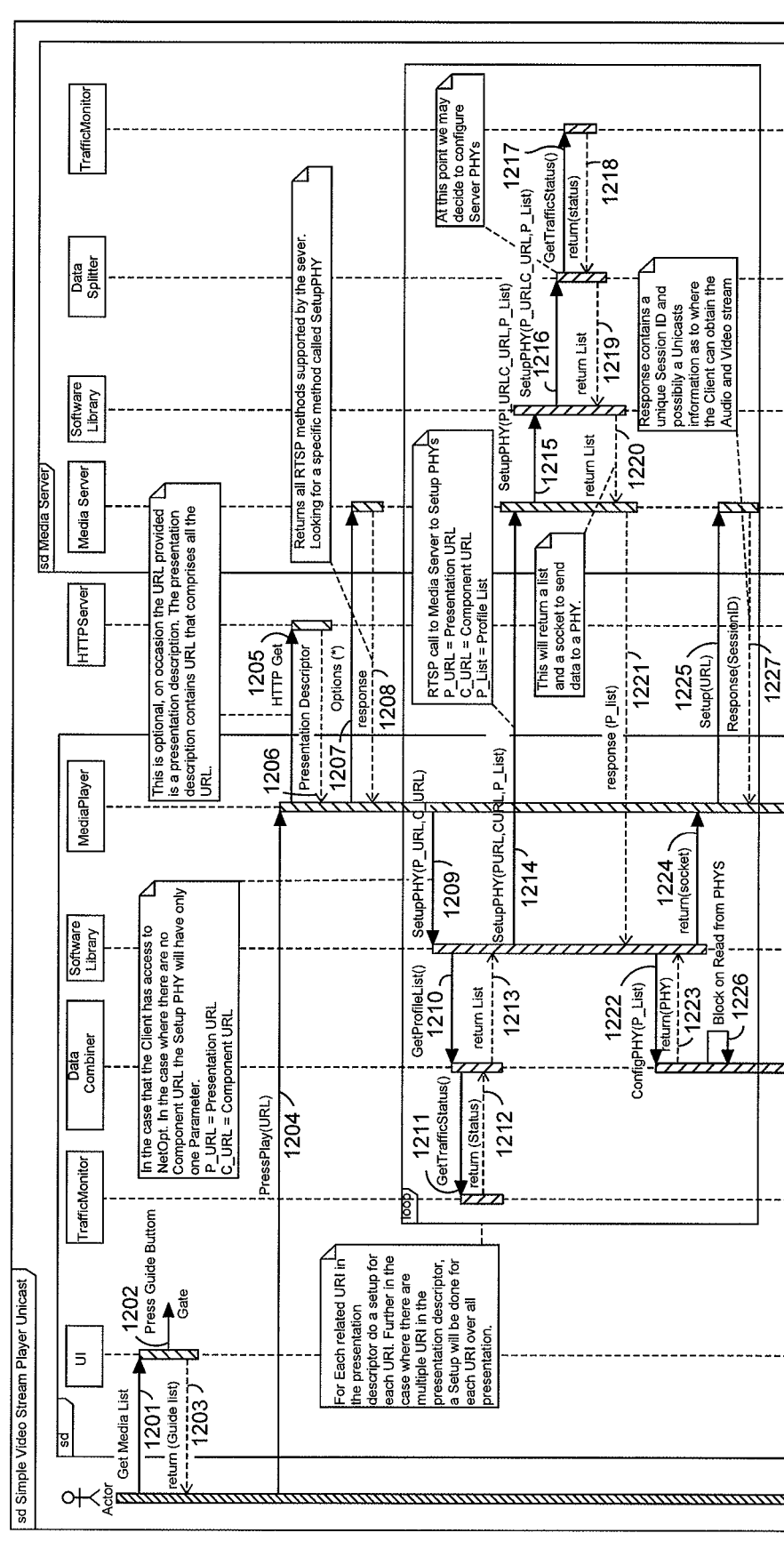
FIG. 12 shows a sequence diagram for streaming a video according to an example embodiment.

As shown in FIG. 12A, a user presses a list button to obtain a media list, as described-above in more detail in connection with FIG. 11 (steps 1201 to 1203). The user selects a URL to play, and the receiving endpoint 102 is given the selected URL to play (1204). If the URL is a presentation descriptor, the receiving endpoint 102 asks another application for the information (e.g., an HTTP and RTSP server) (1205)(1206). The receiving endpoint 102 then sends, for example, a standard RTSP OPTIONS command to the sending endpoint 101 (1207). The OPTIONS command returns a list, for example, of RTSP methods available (which contains a Software Library RTSP extension command called "SetupPHY") (1208).

(ii) Setup

As shown in FIG. 12A, the receiving endpoint 102 calls the software library SetupPHY( ) method (1209), and the software library calls the GetProfileList( ) method of the data combiner (1210). During the process of getting the ProfileList, the data combiner calls the traffic monitor to GetTrafficStatus( ) (1211). The traffic monitor then returns the physical interface status in the form of a list (1212). The ProfileList may be a list of bondable virtual interfaces, and the list of bondable virtual interfaces may be in order of preference. On the other hand, the ProfileList may be a list of physical interfaces. The resulting ProfileList is then returned to the software library (1213). The software library makes a direct RTSP call to the sending endpoint 101, sending the list (1214). The sending endpoint 101 then calls the software library's SetupPHY( ) method, passing the list (1215), and calls the GetProfileList( ) method of the data splitter (1216). During the process of getting the ProfileList, the data splitter calls the traffic monitor to GetTrafficStatus( ) (1217). The traffic monitor then returns the physical interface status in the form of a list (1218). The ProfileList may be a list of bondable virtual interfaces, and the list of bondable virtual interfaces may be in order of preference. On the other hand, the ProfileList may be a list of physical interfaces. The resulting ProfileList is then returned to the software library (1219). The actual physical interfaces to be used for the data transfer are returned to the sending endpoint 101, which includes the list of sockets to be used to send the multiple substreams, and a single socket that will be used by the sending endpoint 101 to send the stream (1220). The single socket is an application channel 240. The sending endpoint 101 then responds to the RTSP call from step 1214, passing the actual connection information to be used (1221). This information is then passed to the ConfigurePHY( ) method of the data combiner, and used to create the socket that will be used to receive the data stream (1222). The sockets are then returned to the software library (1223), and then returned to the sending endpoint 101 (1224).

(iii) Command

Figure 12B:
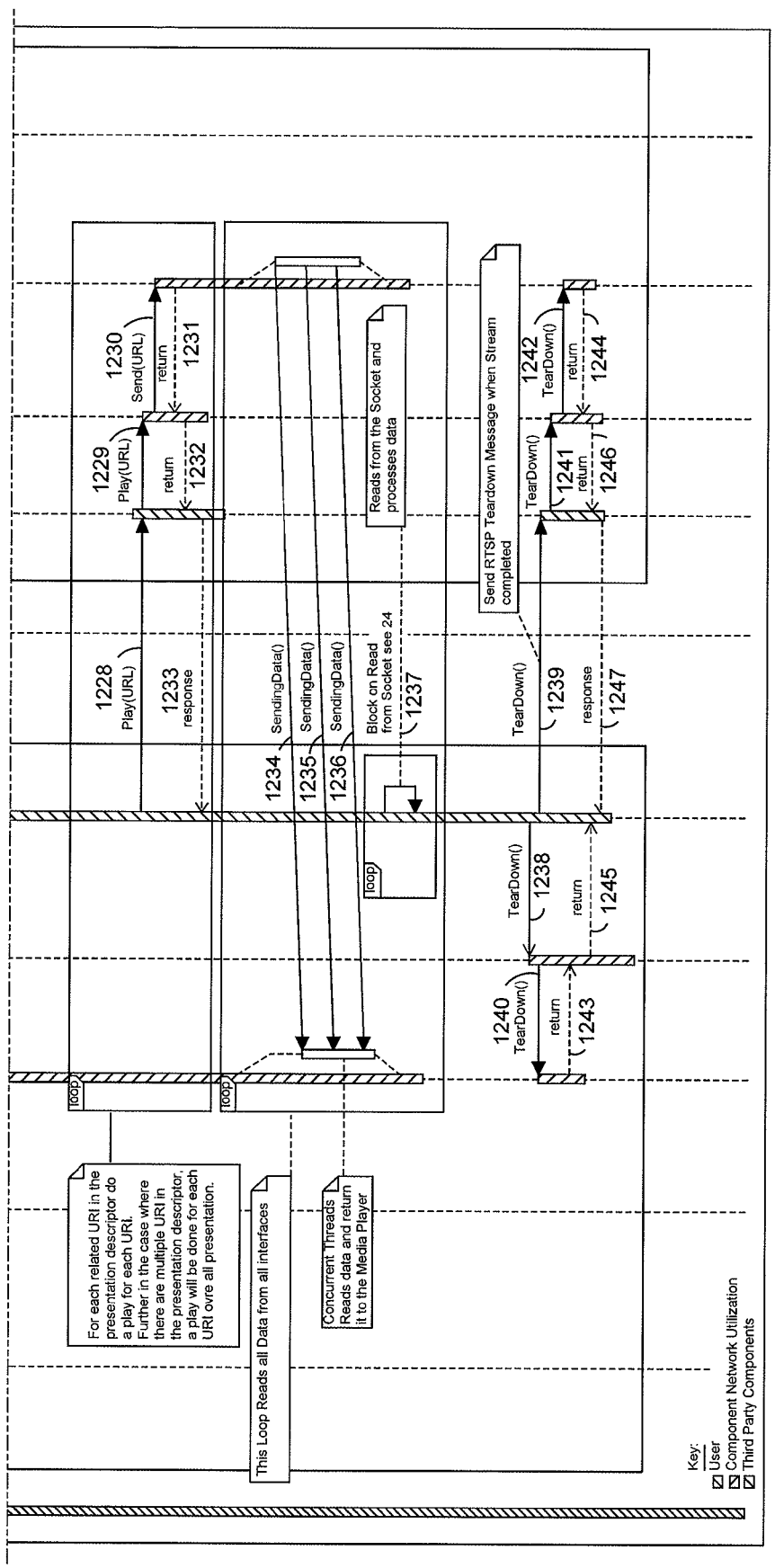

As shown in FIG. 12A, an RTSP setup command is sent to the sending endpoint 101 to the receiving endpoint 102 (1225). Meanwhile, the data combiner is blocked, waiting for data (1226). The setup response is then returned, along with a unique SessionID (1227). As shown in FIG. 12B, the RTSP play command is then sent, using the unique SessionID (1228). The sending endpoint 101 calls the software library Play( ) method to begin playback of the data stream (3229). The software library then calls the data splitter's Send( ) method (1230 and 1231). The software library play method then completes (1233), and the sending endpoint 101 responds to the RTSP play command (1233). If there is more than one stream to be played (e.g., a separate audio and video stream), then steps 1225 to 1233 are executed for each stream.

(iv) Stream

As shown in FIG. 12B, asynchronous calls are made passing portions of the data using the bondable virtual interface to transfer substreams from the sending endpoint's data splitter object over the multiple networks, to be received by the receiving endpoint's data combiner object (1234 to 1236). The receiving endpoint 102 then blocks, and continues to read from the single socket, which is an application channel 240, provided by the software library from step 1224, with the reconstructed stream (1237).

(v) Tear Down

As shown in FIG. 12B, when the receiving endpoint 102 receives the end of the data stream, the receiving endpoint 102 calls the TearDown( ) method asynchronously (1238), and then immediately sends an RTSP teardown command to the sending endpoint 101 (1239). The software library of the receiving endpoint 102 then calls the data combiner's Teardown( ) method, and then waits for a response to the RTSP command (which will occur in step 1247) (1240, 1243 and 1245). The sending endpoint 101 then receives the RTSP teardown command and begins a similar process as used in steps 1240, 1243 and 1245, to tear down the data splitter (1241, 1242, 1244 and 1246).

For special play modes, such as fast-forward and reverse, the sequence diagram is the same as the above-described sequence diagram in FIG. 12, except that in the RTSP call to play, the scale is increased. More specifically, in a normal play mode the scale would be 1, while fast-forwarding would scale to a value greater than 1. In addition, a play mode in reverse would scale to a negative value. For example, a fast-forward of 2× would scale to 2, while a reverse 2× would scale to −2. In addition, special consideration should be given to scenarios where the receiving endpoint has a mass storage container (i.e., allowing for recording), where the data must be streamed in normal play speed (i.e., scale=1), and special play will take place in the streaming from the storage container. However, this special scenario is not the case for this example embodiment.

Whiteboard Conferencing

Figures 13, 13A:
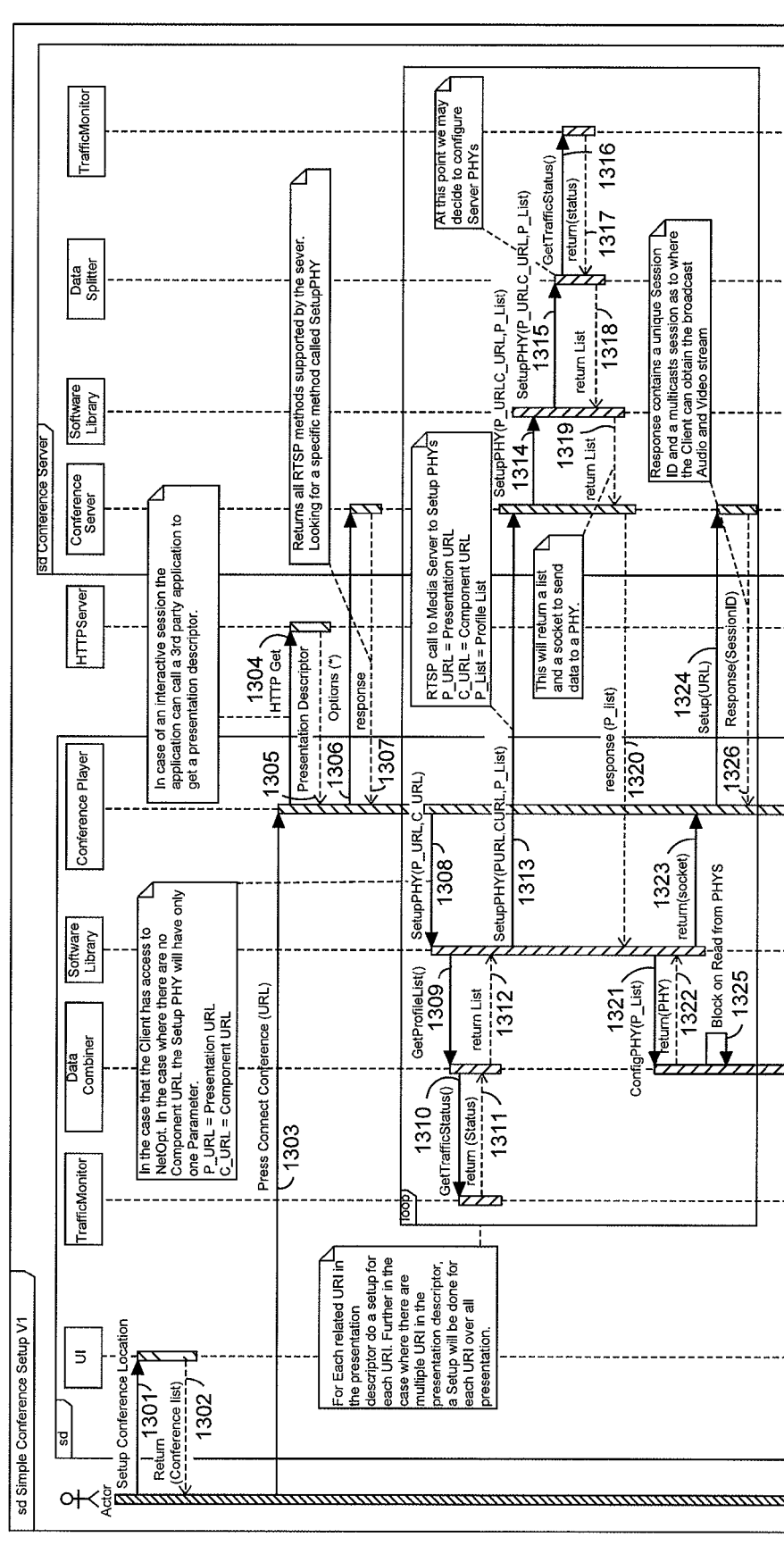
FIG. 13 shows a sequence diagram for streaming a video conference according to an example embodiment.

FIG. 13 shows a sequence diagram for streaming a video conference according to an example embodiment. The sequence diagram of FIG. 13 depicts the interaction of the architecture in a conference scenario. This scenario is similar to the video streaming scenario, except that the data can flow in both directions. This sequence diagram will also be described in five sections, namely: (i) startup, (ii) setup, (iii) command, (iv) stream, and (v) teardown.

(i) Startup

As shown in FIG. 13A, a user calls a setup conference location (1301), and a conference list is then returned to the user (1302). A URL is then given to the receiving endpoint 102 (1303), and the receiving endpoint 102 optionally requests to get a presentation descriptor (1304 and 1305). The receiving endpoint 102 then sends, for example, a standard RTSP OPTIONS command to the sending endpoint 101 (1306). The OPTIONS command returns a list, for example, of RTSP methods available (which will contain a Software Library RTSP extension command called 'SetupPHY') (1307).

(ii) Setup

As shown in FIG. 13A, the receiving endpoint 102 calls the software library SetupPHY( ) method (1308). The software library then calls a GetProfileList( ) method of the data combiner (1309). During the process of getting the ProfileList, the data combiner calls the traffic monitor to GetTrafficStatus( ) (1310). The traffic monitor then returns a status for each of the physical interfaces in the form of a list (1311), and the resulting ProfileList is returned to the software library (1312). The ProfileList may be a list of bondable virtual interfaces, and the list of bondable virtual interfaces may be in order of preference. On the other hand, the ProfileList may be a list of physical interfaces. The software library of the receiving endpoint 102 then makes a direct RTSP call to the sending endpoint 301, sending the list (1313). The sending endpoint 301 then calls its software library's SetupPHY( ) method, passing the list (1314). The software library then calls a GetProfileList( ) method of the data splitter (1315). During the process of getting the ProfileList, the data combiner calls the traffic monitor to GetTrafficStatus( ) (1316). The traffic monitor then returns a status for each of the physical interfaces in the form of a list (1317), and the resulting ProfileList is returned to the software library (1318). The ProfileList may be a list of bondable virtual interfaces, and the list of bondable virtual interfaces may be in order of preference. On the other hand, the ProfileList may be a list of physical interfaces. The actual physical interfaces to be used for the transfer are returned to the sending endpoint 101, which includes the list of sockets to be used to send the multiple substreams, and a single socket that will be used by the sending endpoint 101 to send the data stream (1319). The single socket is an application channel 240. The sending endpoint 101 then responds to the RTSP call from step 1313, passing the actual connection information to be used to the receiving endpoint 102 (1320). This information is then passed to a ConfigurePHY( ) method of the data combiner, and used to create the socket that will be used to receive the data stream (1321). The sockets are then returned to the software library of the receiving endpoint 102 (1322), and then to the receiving endpoint 102 (1323).

(iii) Command

Figure 13B:
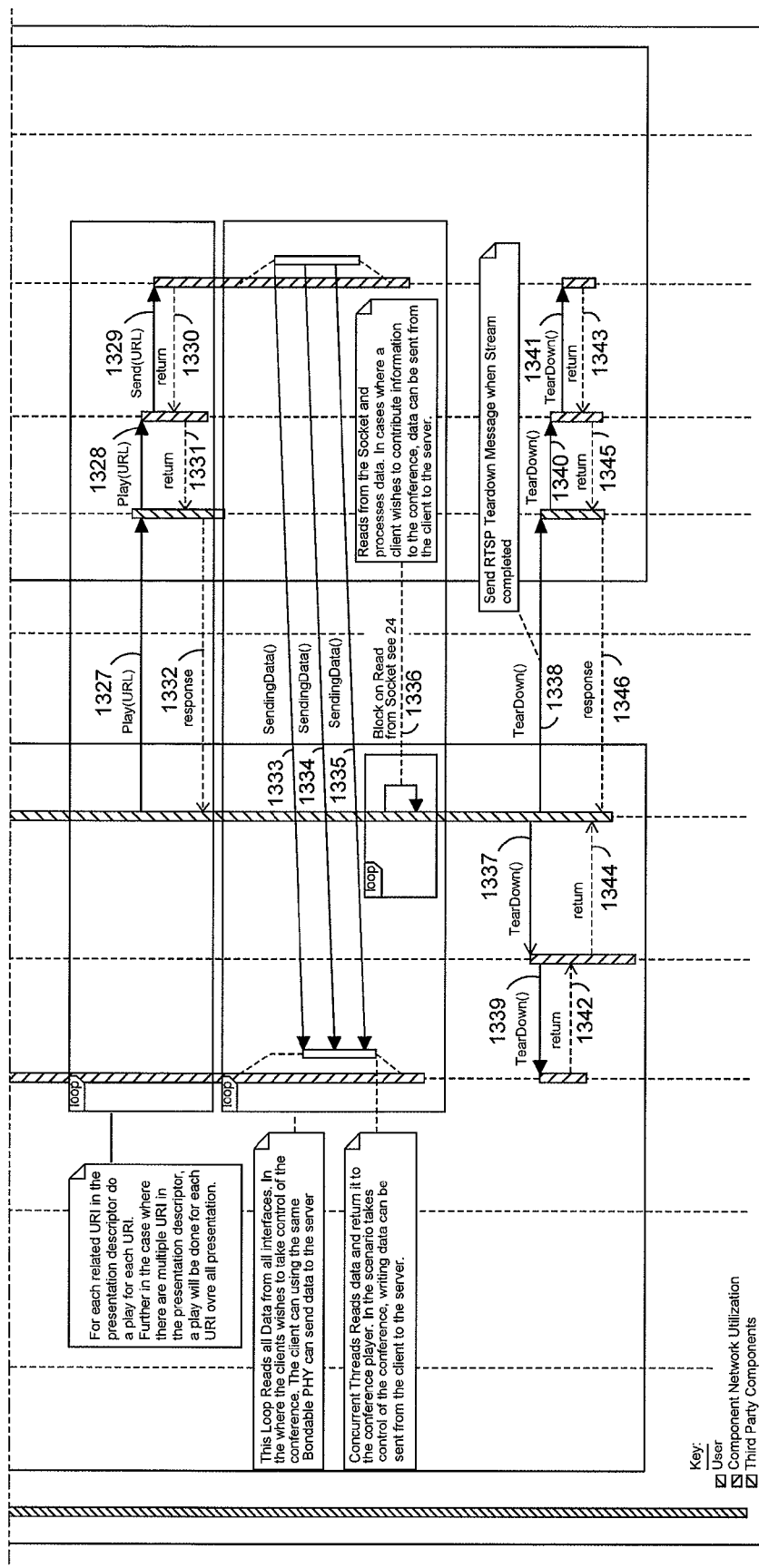

As shown in FIG. 13A, an RTSP setup command is then sent to the sending endpoint 101 (1324). Meanwhile, the data combiner is blocked, waiting for data (1325). The setup response is then returned, along with a unique SessionID (1326). As shown in FIG. 13B, the RTSP command is then sent to the sending endpoint 103, using the unique SessionID from step 1326 (1327). The sending endpoint 301 then calls a software library Play( ) method to begin playback of the data stream (1328). The software library of the sending endpoint 101 then calls the data splitter's Send( ) method (1329 and 1330). The software library Play( ) method then completes (1331), and the sending endpoint 101 responds to the RTSP play command (1332). If there is more than one stream to be played (e.g., separate audio and video streams), then steps 1324 to 1332 are then executed for each stream.

(iv) Stream

As shown in FIG. 13B, asynchronous calls are made passing portions of the data using the bondable virtual interface to transfer substreams from the sending endpoint's data splitter object over the one or more networks, to be received by the receiving endpoint's data combiner object (1333 to 1335). The sending endpoint 102 blocks, and continues to read from the single socket provided by the software library (from step 1323), with the reconstructed stream (1336).

(v) Teardown

As shown in FIG. 13B, when the receiving endpoint 102 receives the end of the data stream, the receiving endpoint calls a TearDown( ) method asynchronously, and then immediately sends an RTSP teardown command to the sending endpoint 101 (1338). The software library on the receiving endpoint 102 calls the data combiner's TearDown( ) method, and then waits for the response to the RTSP command (which will occur in step 1346) (1339, 1342 and 1344). The sending endpoint 101 then receives the RTSP teardown command and begins a similar process as used in steps 1339, 1342 and 1344, to tear down the data splitter (1340, 1341, 1343 and 1345).

In general, the entire process of FIG. 13 may occur simultaneously in the opposite direction. In other words, the process of FIG. 13 may occur in the direction from the sending endpoint to the receiving endpoint, and may also occur simultaneously in the direction from the receiving endpoint. In addition, in the process of FIG. 13, the sending endpoint and the receiving endpoint may trade roles. For example, if a viewer on a receiving endpoint takes control of a conferencing session, the software library can be used to stream inputs from this viewer (now the sending endpoint) to the receiving endpoint.

Archival Data Transfer

Figures 14, 14A:
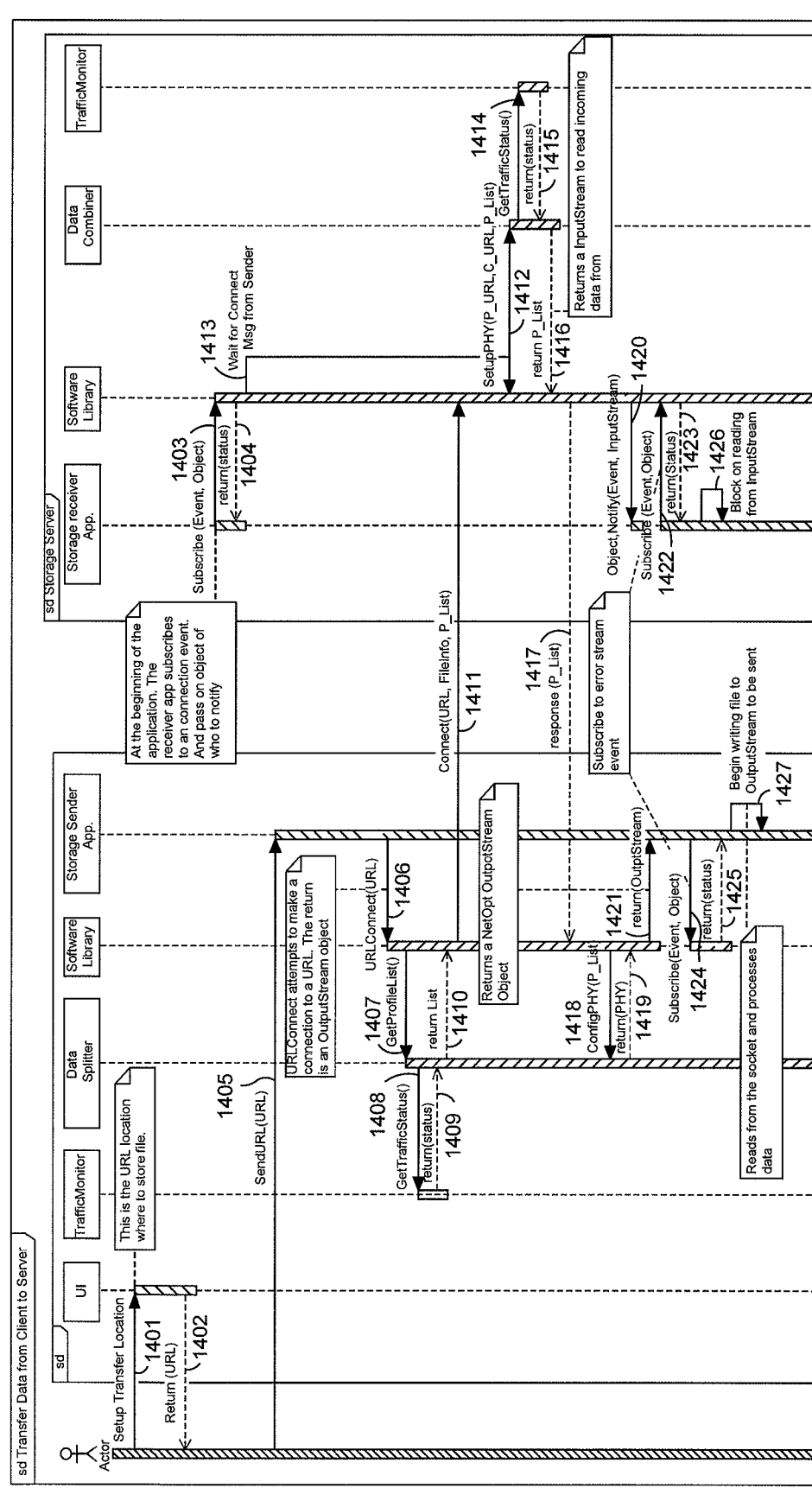
FIG. 14 shows a sequence diagram for streaming a data file transfer according to an example embodiment.

FIG. 14 shows a sequence diagram for streaming a data file transfer according to an example embodiment. In FIG. 14, a transfer data sequence diagram is depicted to show the interaction between the architecture components when an application wishes to transfer an amount of data to be stored on a server. For this sequence, the paradigm that is used is one of a simple URL connection, in which the inner working of the connection is similar to basic media streaming. However, instead of using a socket to communicate between the two endpoints, an input and an output stream will be used. Although the implementation of an input or output stream can be achieved via a socket, the foregoing interface is used to ensure that data flows from the sending application to the receiving server storage. This sequence diagram will be described in four sections, namely: (i) startup, (ii) connection, (iii) transfer, and (iv) disconnect.

(i) Startup

As shown in FIG. 14A, the application retrieves a URL identifying where to store the data to be transferred (1401 and 1402). The receiving endpoint 102 sustains a subscription to a connection event (1403 and 1404), and waits for an incoming connection, such as a sending endpoint connecting and sending a file (1413).

(ii) Connection

As shown in FIG. 14A, the URL is sent to the sending endpoint 101 (1405), and the sending endpoint 101 calls its software library's URLConnect( ) method (1406). The software library then calls the GetProfileList( ) method of the data splitter (1407). During the process of getting the ProfileList, the data splitter calls the traffic monitor to GetTrafficStatus( ) (1408), and the traffic monitor returns status of the physical interfaces in the form of a list (1409). The ProfileList may be a list of bondable virtual interfaces, and the list of bondable virtual interfaces may be in order of preference. On the other hand, the ProfileList may be a list of physical interfaces. The resulting ProfileList is then returned to the software library of the sending endpoint 101 (1410). The sending endpoint 101 then makes a ConnectURL call over the one or more networks to the software library of the receiving endpoint (1411). The software library then calls the GetProfileList( ) method of the data combiner (1412). During the process of getting the ProfileList, the data combiner calls the traffic monitor to GetTrafficStatus( ) (1434), and the traffic monitor returns status of the physical interfaces in the form of a list (1415). The ProfileList may be a list of bondable virtual interfaces, and the list of bondable virtual interfaces may be in order of preference. On the other hand, the ProfileList may be a list of physical interfaces. An InputStream to read incoming data is then returned to the software library of the receiving endpoint 102 (1416). Next, the receiving endpoint 102 responds to the ConnectURL call from step 1411 (1417). This information is then passed to the ConfigurePHY( ) method of the data splitter, and used to create the socket that will be used to send the data stream (1418). An OutputStream is then returned to the software library of the sending endpoint 301 (3419), and then to the sending endpoint 101 (1423). The software library of the receiving endpoint 102 then notifies the receiving endpoint 102, which is waiting (from step 1413), that a connection has been made (1420). The receiving endpoint 102 then subscribes for an error stream, to be notified of any errors encountered during reception (1422 and 1423). Likewise, the sending endpoint 101 subscribes to an error stream, to be notified of any errors encountered while sending data (1424 and 1425). The receiving endpoint 102 then blocks, waiting for data (1426).

(iii) Transfer

Figure 14B:
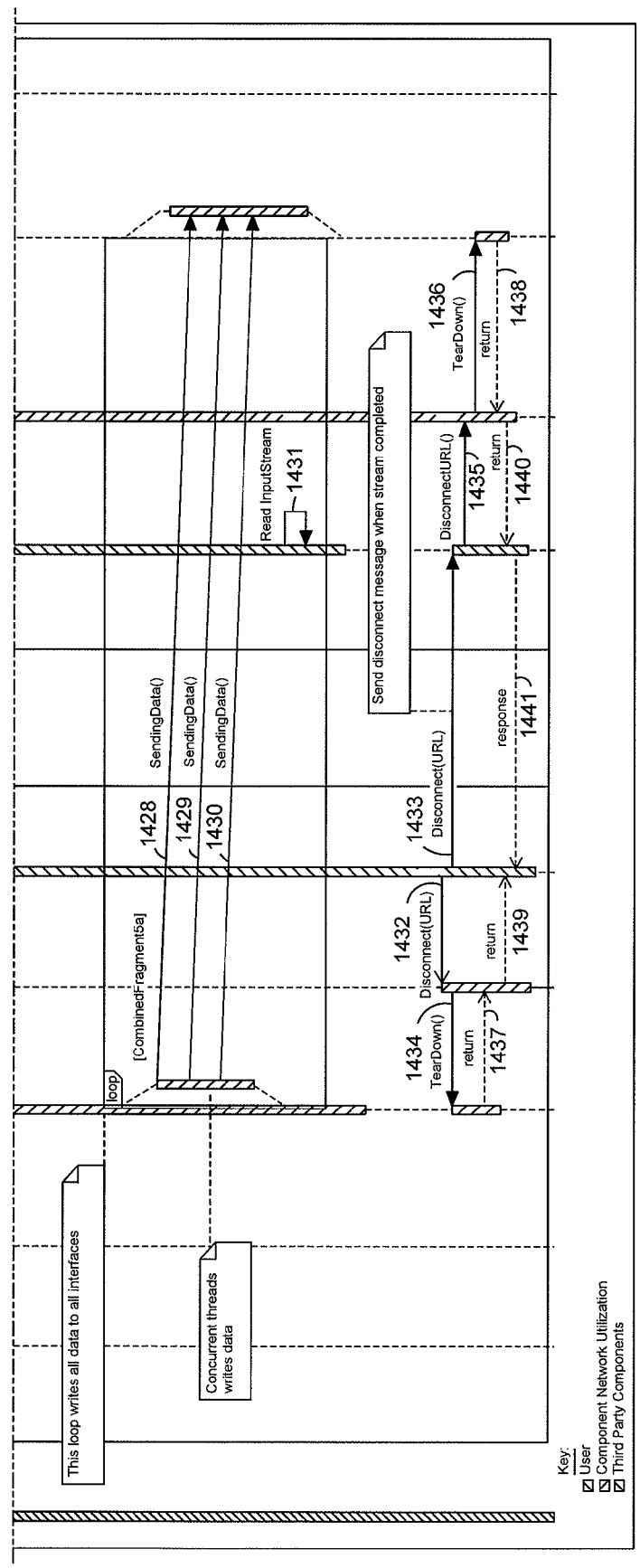

As shown in FIG. 14B, the sending endpoint 101 begins sending data on the output stream (1427). Asynchronous calls are made passing portions of the data using the bondable virtual interfaces to transfer substreams from the sending endpoint's data splitter object over the one or more networks, to be received by the receiving endpoint's data combiner object (1430). The receiving endpoint 102 then blocks, and continues to read the reconstructed data stream from the single input stream (1431).

(iv) Disconnect

As shown in FIG. 14B, when the sending endpoint 101 reaches the end of the data stream, the sending endpoint 101 calls a DisconnectURL( ) method asynchronously (1432), and then immediately sends a Disconnect( ) command to the receiving endpoint 102 (1433). The software library of the sending endpoint 101 calls the data splitter's TearDown( ) method, and then waits for the response to the Disconnect( ) command (which will occur in step 1441) (1432, 1434, 1437 and 1439). The receiving endpoint 102 then receives the DisconnectURL command and begins a similar process as used in steps 1432, 1434, 1437 and 1439, to tear down the data combiner (1435, 1436, 1438 and 1440).

Feedback Mechanism

Figure 15:
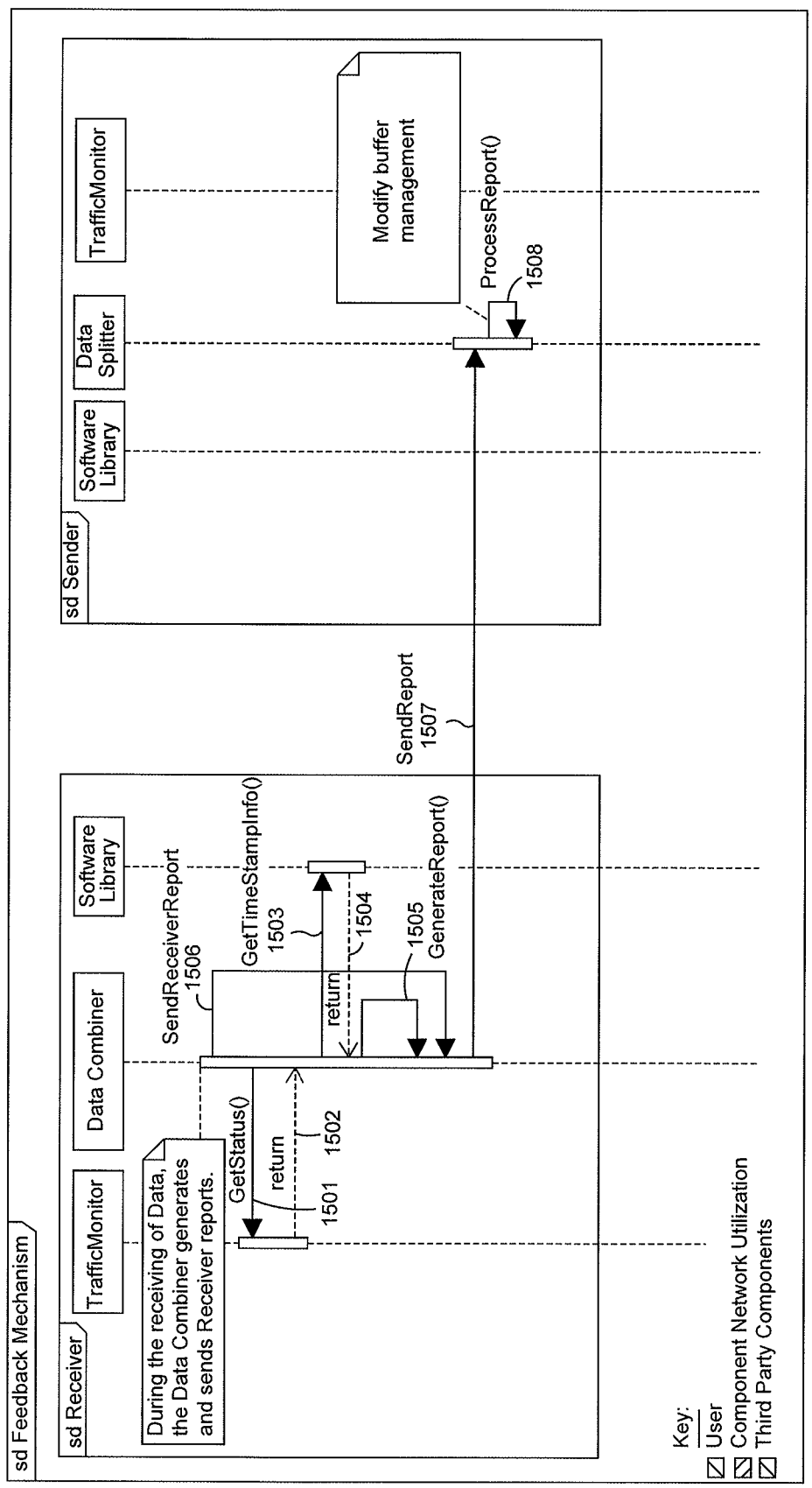
FIG. 15 shows a sequence diagram for a feedback mechanism according to an example embodiment.

FIG. 15 shows a sequence diagram for a feedback mechanism according to an example embodiment. In this sequence diagram, a basic feedback mechanism is depicted which is used by the data combiner to provide information to the data splitter. The information provided to the data splitter is used to modify the buffer management of both the data splitter and the data combiner. Furthermore, the feedback data is unidirectional and is sent from the data combiner to the data splitter. A modified RTCP-like protocol may be used to send data reports.

As shown in FIG. 15, during normal intervals and processing, events may trigger the data combiner to generate a new report. The data combiner then calls the GetStatus from the traffic monitor (1501), and the status is returned to the data combiner (1502). The data combiner then calls the software library of the receiving endpoint 102 for a GetTimeStampInfo from the software library used in creating the report (1503), and the information is returned to the data combiner (1504). A report is then created by the data combiner (1505), and sent directly to the data splitter of the sending endpoint 101 (1506 and 1507). The report is then processed and an update is made to the buffer management of the data splitter (1508).

Figure 16:
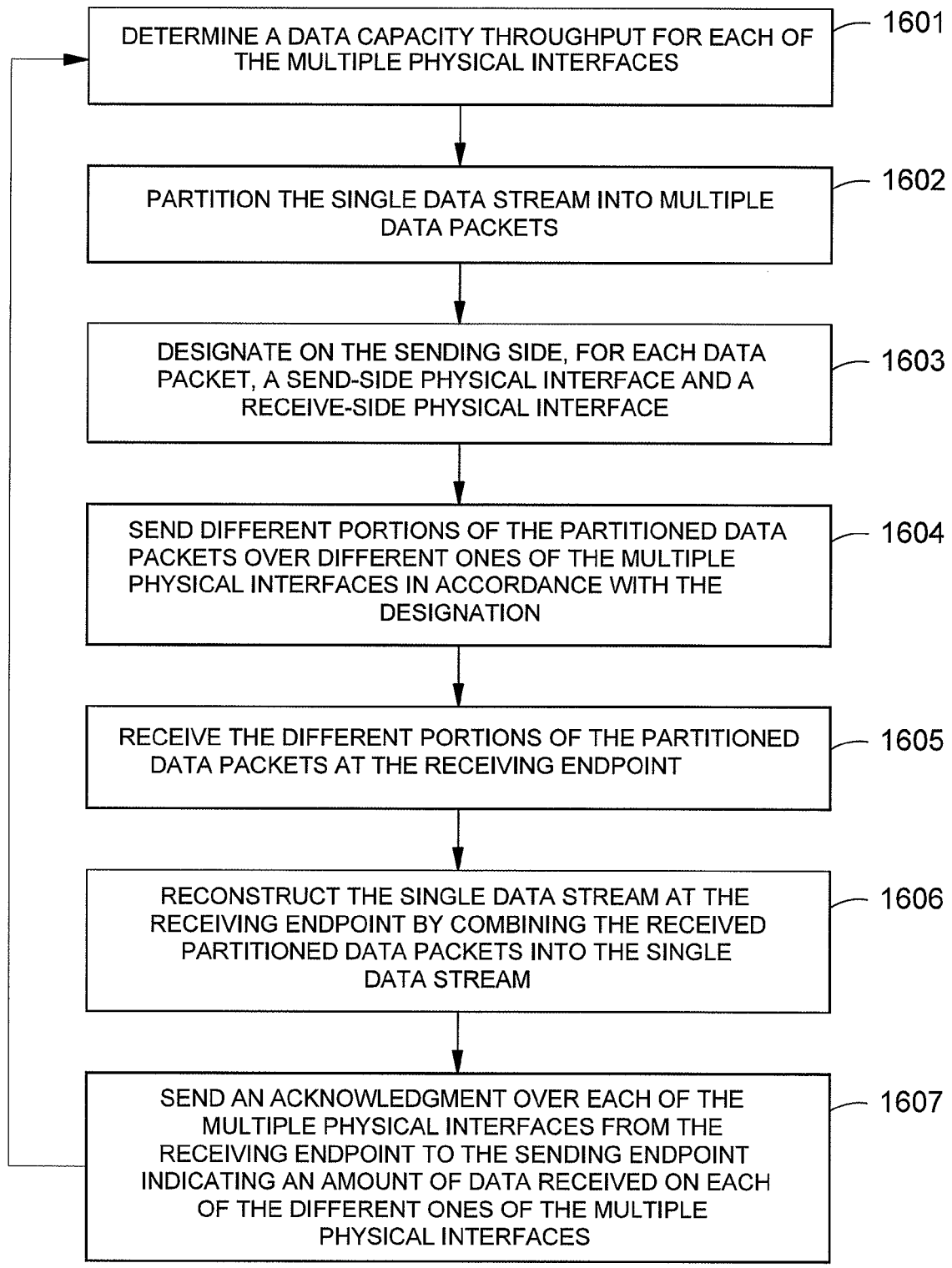
FIG. 16 is a flowchart for providing a detailed explanation of another example embodiment.

Reliable Network Streaming Of A Single Data Stream Over Multiple Physical Interfaces FIG. 16 is a flowchart for providing a detailed explanation of another example embodiment. More specifically, FIG. 16 depicts a flowchart for providing a detailed explanation of an example embodiment, in which a single data stream is sent from a sending endpoint 101 to a receiving endpoint 102 (as shown in FIG. 1). Both of the sending endpoint 101 and the receiving endpoint 102 each have multiple physical interfaces (105a and 105b to 108a and 108b of FIG. 1) connecting the sending endpoint 101 and the receiving endpoint 102 to multiple networks (111 to 114 of FIG. 1), respectively.

As shown in FIG. 16, in block 1601, a data capacity throughput for each of the multiple physical interfaces 105a and 105b to 108a and 108b is determined. In this regard, the data capacity throughput for a physical interface is an amount of data throughput which is currently possible of being sent over the physical interface. Data capacity throughput is different from capacity. As an example, consider a case where a physical interface is connected to a network with a 100 Mbit network connection, the capacity of the physical interface is going to be 100 Mbps. However, in this same case, the data capacity throughput of the physical interface may be 40 Mbps due to, for example, other network traffic on the network.

The single data stream is then partitioned into multiple data packets (1602). Each of the multiple data packets has header information which identifies a sequence identifier indicating an in-sequence position of the data packet in the single data stream (e.g., a string used to represent the sequence number). Next, on the sending side, for each data packet, a send-side physical interface and a receive-side physical interface are designated (1603). The designation of the send-side physical interface and the receive-side physical interface depends at least partly on the data capacity throughput. Different portions of the partitioned data packets are then sent over different ones of the multiple physical interfaces 105a and 105b to 108a and 108b in accordance with the designation (1604). The different portions of the partitioned data packets are then received at the receiving endpoint 102 (1605). The single data stream is then reconstructed at the receiving endpoint 102 by combining the received partitioned data packets into the single data stream in accordance with the header information of the multiple data packets (1606). An acknowledgment is then sent over each of the multiple physical interfaces from the receiving endpoint 102 to the sending endpoint 101 indicating an amount of data received on each of the different ones of the multiple physical interfaces 105a and 105b to 108a and 108b (1607). The acknowledgment includes an indication of any changes in the data capacity throughput for each of the multiple physical interfaces 105a and 105b to 108a and 308b on the recipient side. The sending endpoint 103 waits for the acknowledgment in block 1607 before sending anymore data.

By virtue of the foregoing arrangement, it is ordinarily possible when sending data between endpoints of a network over multiple physical interfaces, to utilize all or nearly all of the multiple physical interfaces in an efficient manner. More precisely, because a data capacity throughput of each of the multiple physical interfaces is determined, different portions of partitioned data packets can be sent over different ones of the multiple physical interfaces in accordance with the determined data capacity throughput of the multiple physical interfaces. Since different portions of the partitioned data packets are sent over different ones of the multiple physical interfaces in accordance with the data capacity throughput, the multiple physical interfaces are used more efficiently than if the same amount of data was sent over different ones of the multiple physical interfaces without regard to throughput capabilities. Moreover, because a receiving endpoint sends an acknowledgment indicating an amount of data received from a sending endpoint on each of the multiple physical interfaces, the foregoing arrangement also ensures that each data packet sent over the multiple physical interfaces is received at the receiving endpoint. Furthermore, because each of the data packets has header information which identifies a correct position of the data packet in the single data stream, tire receiving endpoint is able to combine the data packets into a single data stream, regardless of the order in which the data packets are received.

When determining a data capacity throughput for each of the multiple physical interfaces 305a and 105b to 108a and 108b in block 1601, the indication of any changes in the data capacity throughput for the physical interface on the recipient side, included in the sent acknowledgment, is used in making the determination. As a result, the sending endpoint 101 is able to accurately determine the data capacity throughput for each of the multiple physical interfaces 105a and 105b to 108a and 108b. In addition, in one example embodiment, the data capacity throughput of each of the multiple physical interfaces 105a and 105b to 108a and 108b is determined using a TCP/IP window size of each of the multiple physical interfaces 105a and 105b to 108a and 108b. However, other mechanisms may be used to determine the data capacity throughput of each of the multiple physical interfaces 105a and 105b to 108a and 108b. For example, in another example embodiment, for ones of the multiple physical interfaces using a UDP connection, TCP/IP is used as a control channel, and the data capacity throughput of the physical interfaces is determined using a TCP/IP window size of the physical interface provided by the TCP/IP control channel.

Furthermore, in block 1607, the amount of data received on each of the multiple physical interfaces can be indicated by identifying a byte index that is expected to be received on each of the multiple physical interfaces. For example, if 5 k bits of data is sent from the sending endpoint 101, and only 3 k is received or accepted by the receiving endpoint 102, the acknowledgment would indicate that it is now ready for 3 k+1 byte of data, and if there are any changes to the amount of data that can be received (i.e., data window).

If in block 1607, the acknowledgment indicates that the entire portion of sent data packets was received, then the receiving endpoint 102 will reconstruct the data stream as stated in block 1606 and send the data stream to a receiving application to be processed.

If in block 1607, the acknowledgment indicates that an amount of a portion of data packets was not received over one of the multiple physical interfaces 105a and 105b to 108a and 108b, then, depending on the data capacity throughput of the multiple physical interfaces 105a and 105b to 108a and 108b determined in block 1601, the sending endpoint 101 resends the portion of not received data packets over the same multiple physical interfaces. On the other hand, depending on the data capacity throughput of the multiple physical interfaces 105a and 105b to 108a and 108b determined in block 1601, the sending endpoint 101 may repartition the portion of not received data packets, and send the repartitioned data packets over one or more of available ones of the multiple physical interfaces. In a case that the portion of data packets was not received because of a physical interface failure, the sending endpoint 101 will repartition the portion of not received data packets, and send the repartitioned data packets over one or more remaining multiple physical interfaces. As a result, the sending endpoint 101 can decide on the best method of sending the data packets so as to ensure that the data packets are received, and received in an efficient manner.

In addition, for ones of the multiple physical interfaces using a non-TCP connection, in a case where the acknowledgment is not received by the sending endpoint 101, or the acknowledgment is a negative acknowledgment, the different portions of the partitioned data packets sent over different ones of the multiple physical interfaces 105a and 105b to 108a and 108b are re-sent in their entirety over different ones of the multiple physical interfaces 305a and 105b to 108a and 108b. As used herein, a "negative acknowledgment" refers to an indication that some of the data was received incorrectly or is corrupted (e.g., the data may have a checksum or message length error). In this regard, no receipt of an acknowledgment is treated as a negative acknowledgment.

If the acknowledgment described above indicates that a portion of the re-sent data packets was not received when the receiving endpoint 102 sends another acknowledgment over each of the multiple physical interfaces to the sending endpoint 101 indicating an amount of data received on each of the different ones of the multiple physical interfaces 105a and 105b to 108a and 108b, then the sending endpoint 101 continues to resend any portion of the not received data packets. In addition, the receiving endpoint 102 continues to send acknowledgments indicating an amount of data received, until the portion of partitioned data packets is entirely received by the receiving endpoint 302. If the acknowledgment indicates that a portion of the re-sent data packets was not received, then the re-sent portion of data packets not received is repartitioned and sent over one or more available ones of the multiple physical interfaces 105a and 105b to 108a and 108b. This process will continue until the first portion of data is received by the receiving endpoint 102 successfully. When the first portion of data is received successfully, the process repeats itself for a next portion of data to be sent. Because the receiving endpoint 102 continues to send acknowledgments, and the sending endpoint 101 continues to resend any not-received data packets, any potential loss of data packets during streaming is greatly reduced.

In block 1603, when the sending endpoint 101 and the receiving endpoint 102 each have a single physical interface connected to each of the multiple networks 111 to 114, for each data packet, the designated receive-side physical interface is a physical interface connected to a same network as the designated send-side physical interface. In other words, there is only one send-side interface and one receive side interface per network, which simplifies a selection of a receive-side physical interface. Because the sending endpoint and the receiving endpoint each have a single physical interface connected to each of the multiple networks there is no need to select which receiving-side physical interface is to connect with which sending-side physical interface because there is only one receive-side physical interface connected to the network of the designated send-side physical interface. Since there is no need to make a selection of a receive-side physical interface, the processing power used by the receiving endpoint to designate a receive-side physical interface for each data packet, is reduced. In particular, the physical interfaces are essentially designated based on a data capacity throughput of each of the multiple networks.

In block 1603, when the sending endpoint 101 and the receiving endpoint 102 each have multiple physical interfaces connected to each of the multiple networks 111 to 114, for each data packet, when designating a send-side physical interface, one of the multiple physical interfaces of the sending endpoint 101 connected to one of the multiple networks is designated as the send-side physical interface. In addition, when designating a receive-side physical interface, one of the multiple physical interfaces of the receiving endpoint 102 connected to a same network as the designated send-side physical interface is designated. Because the sending endpoint and the receiving endpoint each have multiple physical interfaces connected to each of the multiple networks, more combinations exist for designating a send-side physical interface and a receive-side physical interface, which in turn provides more flexibility when sending the data packets over the different multiple physical interfaces. Having more flexibility when sending the data packets over the different multiple physical interfaces allows for the single data stream to be sent from the sending endpoint to the receiving endpoint even more efficiently.

Moreover, in another embodiment, when the sending endpoint 101 and the receiving endpoint 102 each have multiple physical interfaces connected to each of the multiple networks 111 to 114, the designated receive-side physical interface is automatically selected according to the designation of the send-side physical interface. For example, a physical interface of the sending endpoint 101 connected to one of the multiple networks may be assigned to a physical interface of the receiving endpoint 102 connected to the same network and thus, once a physical interface is designated on the send-side, the assigned receive-side physical interface is automatically designated. As a result, no decision making is necessary at the receive-side end because the physical interface on the receive-side end is automatically selected according to the assignation. Accordingly, the processing power used for designating a receive-side physical interface is reduced, while still providing more combinations for designations of physical interfaces. In other words, because a receive-side physical interface is automatically selected as a physical interface assigned to a certain send-side physical interface, excess processing power is saved which might have been used to decide which physical receive-side interface to utilize.

Furthermore, in yet another embodiment, when the sending endpoint 101 and the receiving endpoint 102 each have multiple physical interfaces connected to each of the multiple networks 111 to 114, the designated receive-side physical interface is designated based on a data capacity throughput of the multiple physical interfaces of the receiving endpoint connected to a same network as the designated send-side physical interface, and a data capacity throughput of the designated send-side physical interface. Because the designated receive-side physical interface is designated based on a data capacity throughput of the multiple physical interfaces of the receiving endpoint, the single data stream may be streamed over the multiple physical interfaces with high efficiency.

Figure 17:
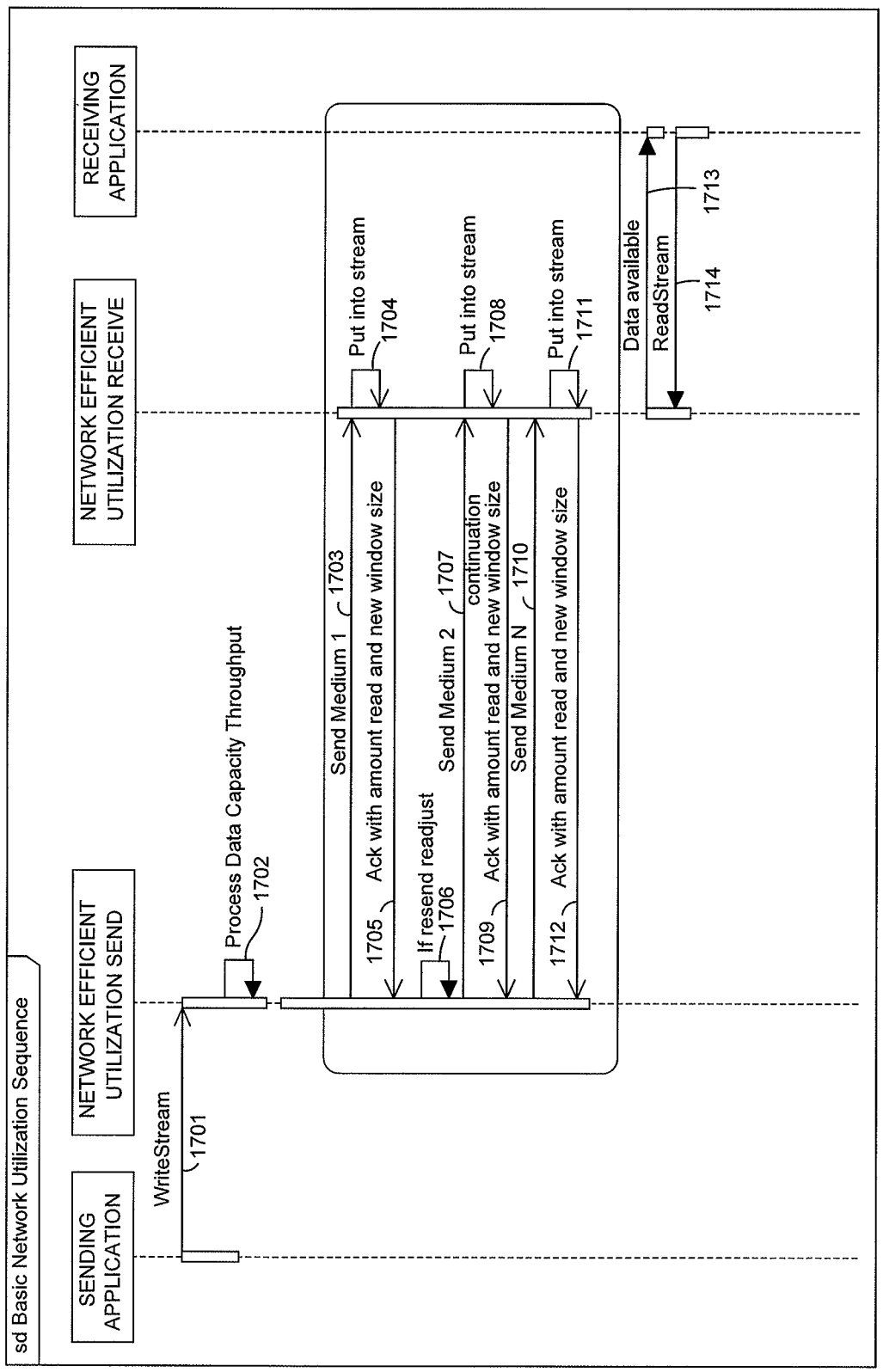
FIG. 17 shows a sequence diagram in accordance with the example embodiment shown in FIG. 16.

FIG. 17 shows a sequence diagram in accordance with the example embodiment shown in FIG. 16. As shown in FIG. 17, a sending application calls a WriteStream which sends a single data stream to a sending endpoint 101 (i.e., network efficient utilization send) (1701). The sending endpoint 101 then processes a data capacity throughput for each of the multiple physical interfaces (1702) (which corresponds with block 1601 of FIG. 16). In steps 1703, 1707 and 1710, the single data stream is partitioned into multiple data packets, and different portions of the partitioned data packets are sent over different ones of multiple physical interfaces (i.e., Medium 1, Medium 2, . . . , Medium N) (which corresponds to blocks 1602 and 1604 of FIG. 16). The receiving endpoint 102 (i.e., network efficient utilization receive) receives the different portions of the partitioned data packets, and reconstructs the single data stream by combining the received partitioned data packets into the single data stream (1704, 1708 and 1711). For each of the portions of data packets sent over the different ones of multiple physical interfaces, an acknowledgment is sent from the receiving endpoint 102 to the sending endpoint 101, indicating an amount of data read and a new window size (1705, 1709 and 1712). In the case that the acknowledgment indicates that any part of the portions of the data packets 1703, 1707, or 1710 was not received by the receiving endpoint 102, then the sending endpoint 101 readjusts the portions of data packets and resends the portions of data packets over available ones of the multiple physical interfaces as described in more detail above in connection with FIG. 16. The receiving endpoint 102 then sends available data to a receiving application (1713), and the receiving application reads the reconstructed single data stream (1714).

Figure 18:
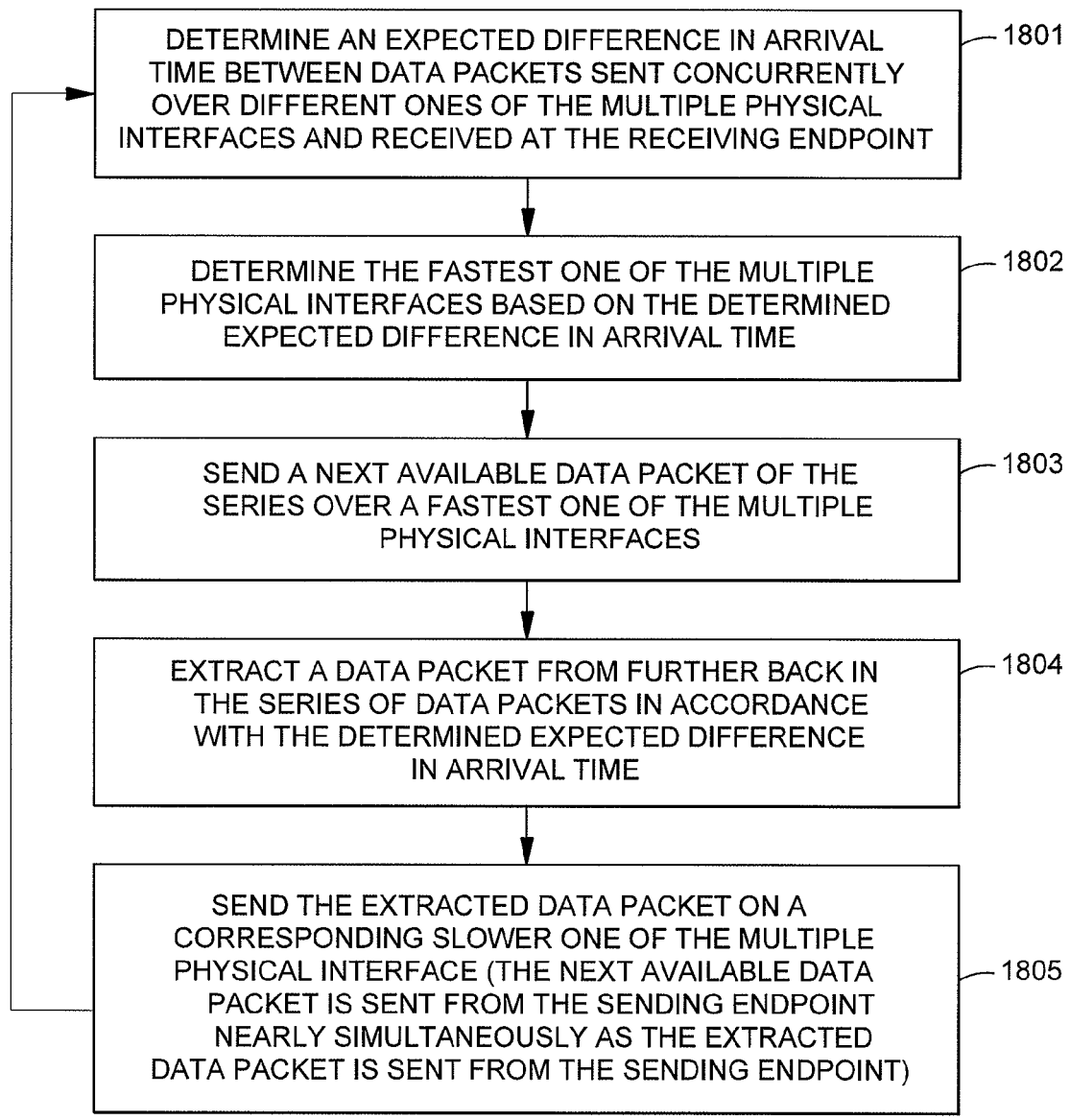
FIG. 18 is a flowchart for providing a detailed explanation of yet another example embodiment.

Network Streaming Of A Single Data Stream Simultaneously Over Multiple Physical Interfaces FIG. 18 is a flowchart for providing a detailed explanation of yet another example embodiment. More specifically, FIG. 18 depicts a flowchart for providing a detailed explanation of another example embodiment, in which a data stream is sent from a sending endpoint 101 to a receiving endpoint 102 (as shown in FIG. 1). Both of the sending endpoint 101 and the receiving endpoint 102 each have multiple physical interfaces 105a and 105b to 108a and 108b (as shown in FIG. 1) connecting the sending endpoint 101 and the receiving endpoint 102 to multiple networks 111 to 114 (as shown in FIG. 1), respectively. In this embodiment, the data stream is split into a series of data packets and sent over the multiple physical interfaces 105a and 105b to 108a and 108b.

As shown in FIG. 18, in block 1801, a determination is made of an expected difference in arrival time between data packets sent concurrently over different ones of the multiple physical interfaces 105a and 105b to 108a and 108b and received at the receiving endpoint 102. A fastest one of the multiple physical interfaces is then determined based on the determined expected difference in arrival time (1802). A next available data packet of the series is then sent over the fastest one of the multiple physical interfaces (1803). A data packet is then extracted out of order from further back in the series of data packets in accordance with the determined expected difference in arrival time (1804).

Figure 19:
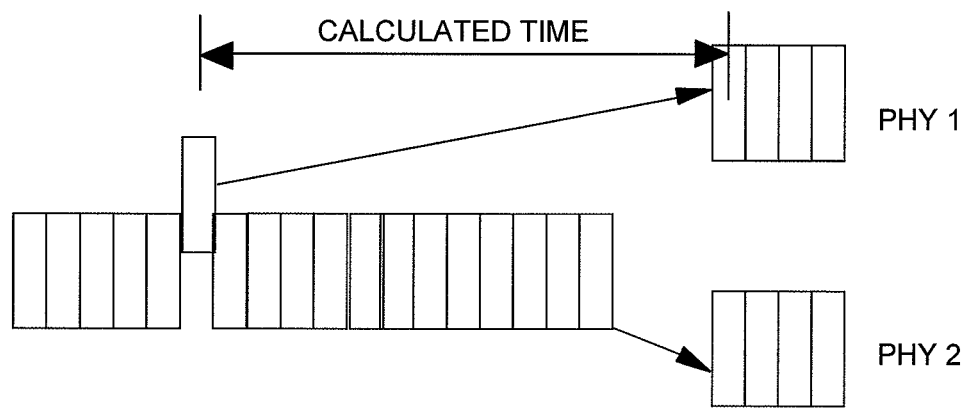
FIG. 19 is an illustration for providing an explanation of an extracted data packet from further back in a series of data packets.

As used herein, "further back in the series" refers to a data packet extracted an amount of calculated time back in the series of data packets, the calculated time being equal to the determined expected difference in arrival time. FIG. 19 illustrates this point. As shown in FIG. 19, a data packet is extracted further back in the series of data packets according to a calculated time, the calculated time being the time it will take for the extracted data packet to reach a receiving endpoint at approximately the same time as the data packet sent from the front of the line, the calculated time having been determined by the expected difference in arrival time. In cases when data is being sent with a protocol which uses time stamps, the time stamps can be used in order to determine which data packet should be extracted from further back in the series so as to equal the calculated time. For example, if the calculated time is 5 seconds and the next data packet to be sent (i.e., first in line) has a time stamp header of 1:23:05, then the data packet to be extracted further back in the series would be a data packet with a time stamp header of 1:23:10.

In other cases for other types of data (e.g., non-media, with no additional protocol header time stamps, or media data that is intentionally not partitioned along the protocol packet boundaries, and therefore cannot use time stamp headers), then the aggregate available bandwidth, capacity, or a historical throughput would be used to estimate how much data represents the calculated time. For example, if physical interface 1 (PHY 1) of FIG. 19 is known (e.g., through aggregate available bandwidth or historical throughput) to send 10 Mb of data from endpoint to endpoint in 10 seconds, and physical interface 2 (PHY 2) is known to send 10 Mb of data from endpoint to endpoint in 1 second, then, assuming each data packet is 1 Mb and the calculated time is 10 seconds, the data packet to be extracted farther back in the series would be a data packet which is 10 data packets back in the series from the front.

As further shown in FIG. 18, the extracted data packet is sent on a corresponding slower one of the multiple physical interfaces. The next available data packet is sent from the sending endpoint 101 nearly simultaneously as the extracted data packet is sent from the sending endpoint 101 (1805). As a result, the data packets are received at the receiving endpoint 102 in an approximate order of appearance as in the original data stream.

By virtue of the foregoing arrangement, it is ordinarily possible to ensure that data packets of a data stream are received at a receiving endpoint on time and in approximate order, which in turn minimizes any unnecessary processing requirements at the receiving endpoint of a network. In this regard, the receiving endpoint may be, for example, a typical set top box, digital video recorder (DVR), or other consumer device such as a consumer device intended for use with a TV. When compared with a typical desktop computer, laptop computer, or home server, the typical devices for a receiving endpoint are resource constrained having drastically less processing power, reduced memory, and smaller mass storage. However, the typical devices for the receiving endpoint will be tasked with, for example, receiving one or more streams of multimedia content, viewing and/or recording content from a cable or satellite TV provider, acting as an input/aggregation device for collecting pictures or uploading personal video content, purchasing and/or playing music, etc. In addition, in the above described arrangement of sending a single stream of data over multiple physical interfaces, if a portion of sent data is late or missing the receiving endpoint carries the additional burden of temporarily storing an unknown amount of data, and then reassembling the resulting data stream when the late or missing data is received. Therefore, because data packets are extracted out of order from further back in the series, and these extra data packets are sent over slower ones of the multiple physical interfaces so as to arrive in an approximate order of the original data stream, any unnecessary buffering and/or processing being performed by the receiving endpoint is minimized, which greatly reduces the load on an already overburdened receiving endpoint.

In one example embodiment, when determining the expected difference in arrival time as shown in block 1801, the expected difference in arrival time is assumed to be a same difference in arrival time as observed in a previous sending of data packets. In another example embodiment, when determining the expected difference in arrival time as shown in block 1801, the expected difference in arrival time is looked up in a table which stores various constant values to be used as an initial expected difference in arrival time for specific ones of the multiple physical interfaces 105a and 105b to 108a and 108b.

When extracting a data packet from further back in the series of data packets in accordance with the determined expected difference in arrival time as shown in block 1804, the extracted data packet represents a unit of time in the future equal to the determined expected difference in arrival time. In this regard, the extracted data packet may be identified by its protocol header timestamp. However, in other embodiments, the extracted data packet may be identified using other means as described in more detail below.

In one example embodiment, when the data stream is a multimedia data stream, and when extracting a data packet from further back in the series of data packets in accordance with the determined expected difference in arrival time as shown in block 1804, the extracted data packet represents a unit of time in the future equal to the determined expected difference in arrival time. In this example embodiment, the extracted data packet is identified using a known average bit rate of the multimedia. Furthermore, the format of the data stream is known based upon a transport protocol (e.g., RTF).

In yet another example embodiment, when the data stream is a non-media stream, and when extracting a data packet further back in the series of data packets in accordance with the determined expected difference in arrival time as shown in block 1804, the extracted data packet represents a unit of time in the future equal to the determined expected difference in arrival time. In this example embodiment, the extracted data packet is identified using a known aggregate available bandwidth of the multiple physical interfaces. Furthermore, the format of the data stream is known based upon a transport protocol (e.g., RTP).

In one example embodiment, the sending endpoint 101 and the receiving endpoint 102 each have a single physical interface connected to each of the multiple networks 111 to 114. When sending the next available data packet of the series over a fastest one of the multiple physical interfaces 105a and 105b to 108a and 108b as shown in block 1803, a send-side physical interface is selected from one of the single physical interfaces connected to one of the multiple networks 111 to 114. The selected send-side physical interface is the fastest single physical interface of the sending endpoint 101 in accordance with the determined expected difference in arrival time. In addition, a receive-side physical interface is selected, in which the selected receive-side physical interface is the physical interface of the receiving endpoint 102 connected to a same network as the selected send-side physical interface.

Moreover, in this example embodiment, when sending the extracted data packet of the series over a corresponding slower one of the multiple physical interfaces 105a and 105b to 108a and 108b as shown in block 1805, a send-side physical interface is selected from one of the single physical interfaces connected to one of the multiple networks 111 to 114. The selected send-side physical interface is a slower corresponding single physical interface of the sending endpoint 101 in accordance with the determined expected difference in arrival time. In addition, a receive-side physical interface is selected, in which the selected receive-side physical interface is the physical interface of the receiving endpoint 102 connected to a same network as the selected send-side physical interface. Because the sending endpoint and the receiving endpoint each have a single physical interface connected to each of the multiple networks, the processing power, necessary for designating a send-side physical interface and a receive-side physical interface for each data packet, is reduced.

According to another example embodiment, the sending endpoint 101 and the receiving endpoint 102 each have multiple physical interfaces 105a and 105b to 108a and 108b connected to each of the multiple networks 111 to 114. When sending the next available data packet of the series over a fastest one of the multiple physical interfaces 105a and 105b to 108a and 108b as shown in block 1803, a fastest send-side physical interface is selected from the multiple physical interfaces 105a and 105b to 108a and 108b of the sending endpoint 101 in accordance with the determined expected difference in arrival time. In addition, a receive-side physical interface is selected from the multiple physical interfaces 105a and 305b to 108a and 108b of the receiving endpoint 102 connected to a same network as the selected send-side physical interface. In this regard, a receive-side physical interface corresponding to the fastest send-side physical interface when determining the expected difference in arrival time is the selected receive-side physical interface for the next available data packet.

Moreover, in this example embodiment, when sending the extracted data packet of the series over a corresponding slower one of the multiple physical interfaces 105a and 105b to 108a and 108b as shown in block 1805, a corresponding slower send-side physical interface is selected from the multiple physical interfaces 105a and 105b to 108a and 108b of the sending endpoint 101 in accordance with the determined expected difference in arrival time, and a receive-side physical interface is selected from the multiple physical interfaces 105a and 105b to 108a and 108b of the receiving endpoint 102 connected to a same network as the selected send-side physical interface. In this regard, a receive-side physical interface corresponding to a slower send-side physical interface when determining the expected difference in arrival time is the selected receive-side physical interface for the extracted data packet. Because the sending endpoint and the receiving endpoint each have multiple physical interfaces connected to each of the multiple networks, a greater number of possible paths are provided on which data packets may be sent.

Figure 20:
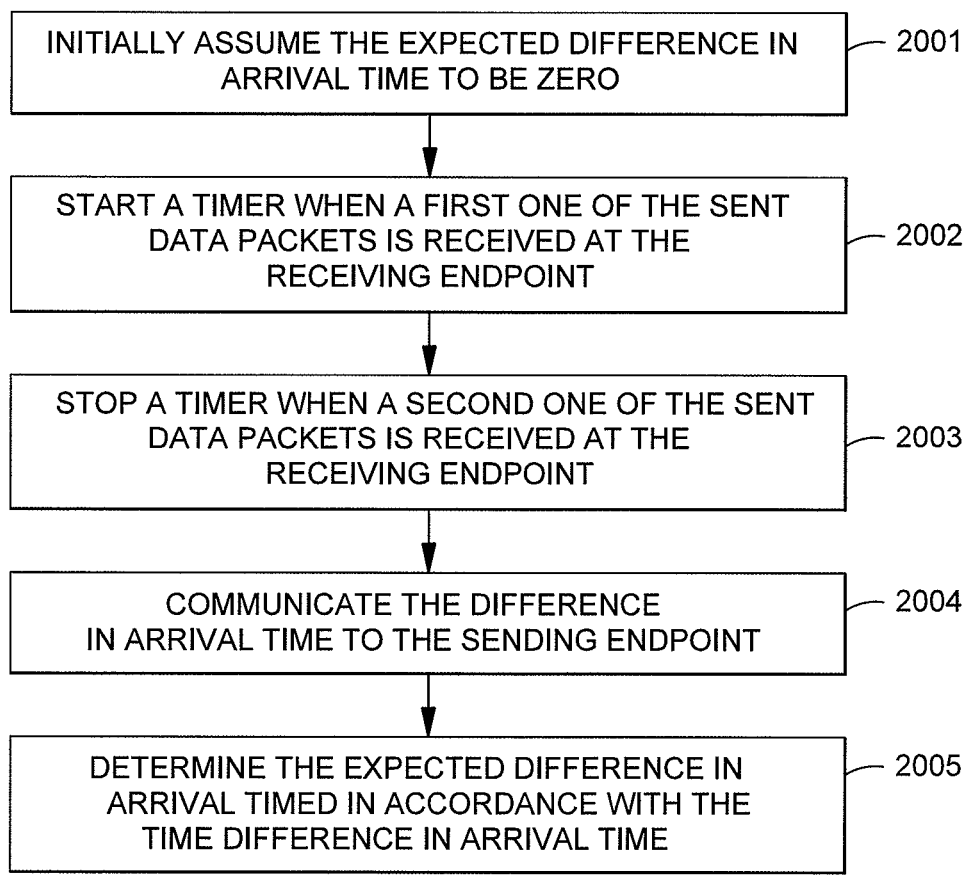
FIG. 20 is a flowchart for providing a detailed explanation of determining an expected difference in arrival time according to one example embodiment as shown in FIG. 18.

FIG. 20 is a flowchart for providing a detailed explanation of determining an expected difference in arrival time as shown in FIG. 18 according to one example embodiment. As shown in FIG. 20, when determining the expected difference in arrival time, the expected difference in arrival time is initially assumed to be zero (2001). The receiving endpoint 102 then starts a timer when a first one of the sent data packets is received at the receiving endpoint 102 (2002). Then, receiving endpoint 102 stops the timer when a second one of the sent data packets is received at the receiving endpoint 102 (2003). The receiving endpoint 102 then communicates the difference in arrival time to the sending endpoint 101 (2004), and the determination of the expected difference in arrival time is made in accordance with the timed difference in arrival time (2005). In one example embodiment, the receiving endpoint 102 communicates the difference in arrival time to the sending endpoint 101 via a custom feedback message. In another example embodiment, the receiving endpoint 102 communicates the difference in arrival time to the sending endpoint 101 by incorporating the communication into an existing receiver message. For example, the existing receiver message is a receiver message defined in Real-Time Transport Protocol.

Figure 21:
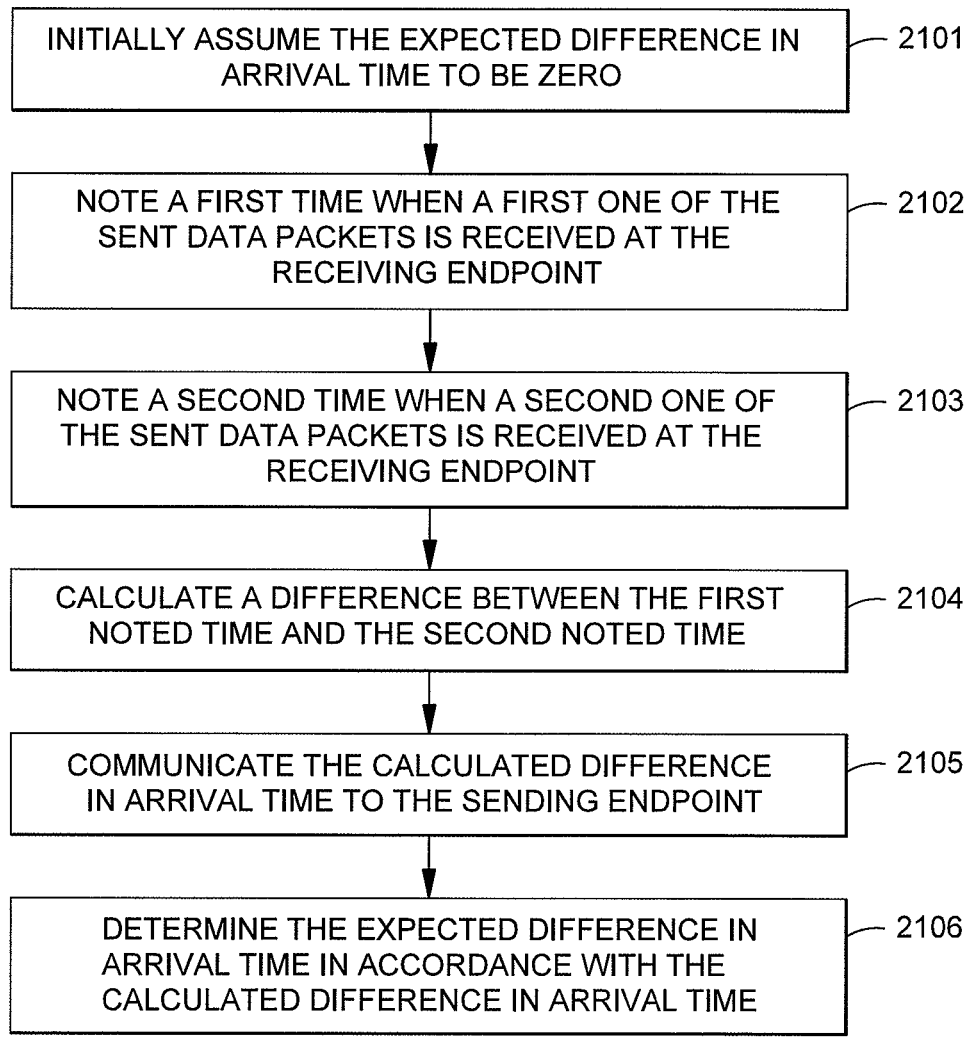
FIG. 21 is a flowchart for providing a detailed explanation of determining an expected difference in arrival time according to another example embodiment as shown in FIG. 18.

FIG. 21 is a flowchart for providing a detailed explanation of determining an expected difference in arrival time as shown in FIG. 18 according to another example embodiment. As shown in FIG. 21, when determining the expected difference in arrival time, the expected difference in arrival time is initially assumed to be zero (2101). The receiving endpoint 102 then notes a first time when a first one of the sent data packets is received at the receiving endpoint 102 (2102), and the receiving endpoint 102 notes a second time when a second one of the sent data packets is received at the receiving endpoint (2103). The receiving endpoint 102 then calculates a difference between the first time and the second time (2104), and communicates the calculated difference in arrival time to the sending endpoint 101 (2105). The determination of the expected difference in arrival time is then made in accordance with the calculated difference in arrival time (2106). In one example embodiment, the receiving endpoint 102 communicates the difference in arrival time to the sending endpoint 101 via a custom feedback message. In another example embodiment, the receiving endpoint 102 communicates the difference in arrival time to the sending endpoint 101 by incorporating the communication into an existing receiver message. For example, the existing receiver message is a receiver message defined in Real-Time Transport Protocol.

If in the example embodiments of FIGS. 20 and 21, ones of the extracted data packets sent over corresponding slower ones of the multiple physical interfaces 105a and 105b to 108a and 108b continue to be delayed, then the receiving endpoint 102 communicates an added expected difference in arrival time to the sending endpoint 103 for the delayed ones of the extracted data packets. In addition, if ones of the extracted data packets sent over corresponding slower ones of the multiple physical interfaces 105a and 105b to 108a and 108b are received at the receiving endpoint 102 earlier than the next available data packets sent over the fastest one of the multiple physical interfaces 105a and 105b to 108a and 108b, then the receiving endpoint 102 communicates a reduced expected difference in arrival time to the sending endpoint 101 for the early ones of the extracted data packets. The receiving endpoint 102 then may maintain a history of the multiple physical interfaces 105a and 105b to 108a and 108b on which ones of the extracted data packets continue to be delayed, and ones of the extracted data packets which arrive early, and creates a predictability model to more accurately predict future expected differences in arrival times. Because the receiving point can accurately predict future expected differences in arrival time using the predictability model, any unnecessary oscillation of communications from the receiving endpoint can be prevented. More precisely, a scenario can be prevented in which the receiving endpoint communicates an addition to the expected difference in arrival time, communicates a reduction in the expected difference in arrival time, and then again communicates an addition to the expected arrival time.

Figure 22:
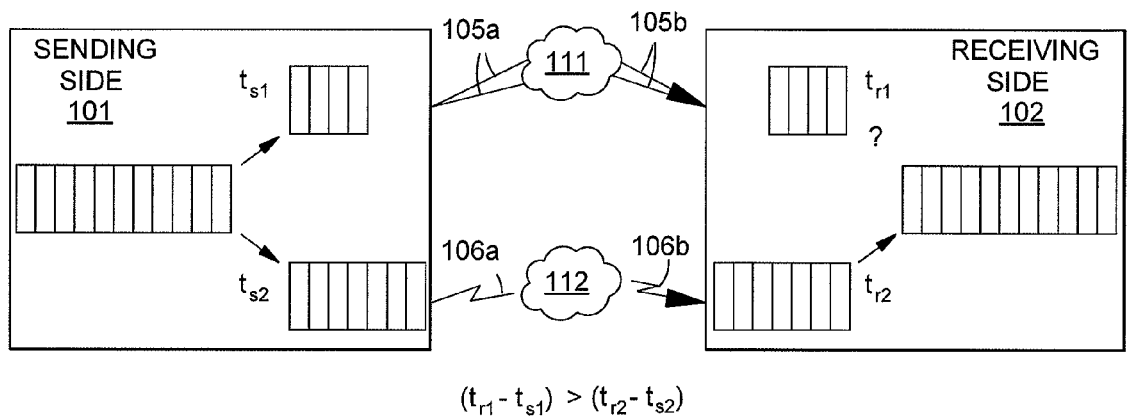
FIGS. 22 and 23 are illustrations for providing a further explanation of the example embodiments shown in FIGS. 18 to 21.
Figure 23:
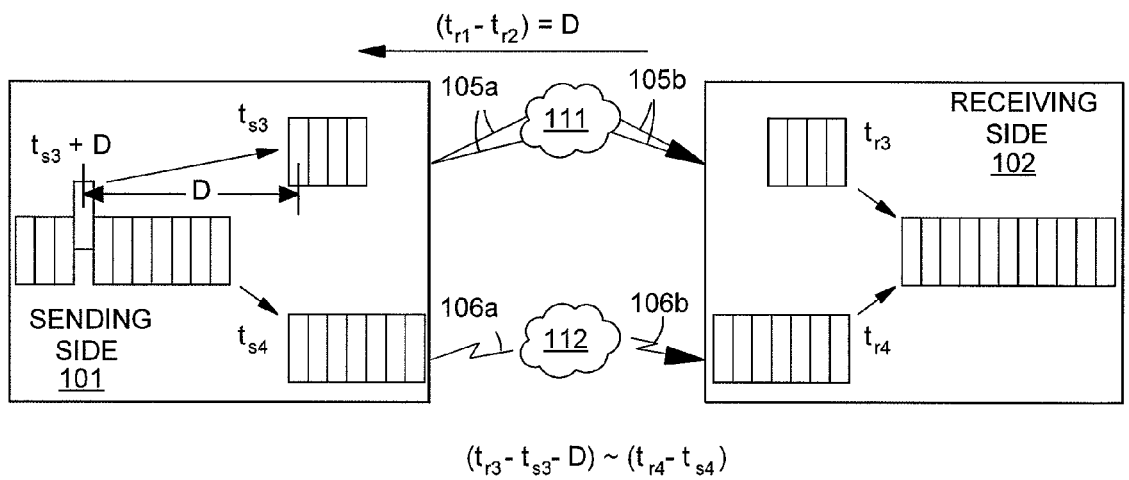

FIGS. 22 and 23 are illustrations for providing a further explanation of the example embodiments shown in FIGS. 18 to 21. As shown in FIG. 22, two packets are sent from the sending side simultaneously using diverse physical interfaces. One packet is sent via a wireless interface. At time=ts1, the sending side puts the packet into the transmit buffer of the associated wireless network interface. Meanwhile, a second packet is sent via a wired interface. At time ts2 (approximately equal to ts1), the packet is placed into the transmit buffer of the associated wired network interface on the sending side. The wireless interface is an order of magnitude slower than the wired interface. Thus, it is expected that the time tr1 when the packet is ready to be read from the receive buffer of the wireless interface on the receiving side to be later than the time tr2 when the second packet sent is ready to be read from the receive buffer of the wired interface on the receiving side. As above, it is observed that (tr1−ts1)>(tr2−ts2).

The magnitude of the difference expressed above represents the magnitude of time during which the receiving end must wait when reconstructing the single stream of data from the two connections. During this time, the faster stream will stall, while the system waits for the slower stream to produce the expected data. One way to avoid such as a stall is to accept further data from the faster stream while continuing to wait for the slow data to arrive. While this solution allows the faster interface to continue transferring data, it does not allow the reconstructed stream to continue to be consumed upon the receiving side, since the late packet is still not available. Eventually, upon the arrival of the slower data, the original data stream can be properly reconstructed and consumed.

Any such solution requires significant resources on the client, which has to temporarily store an unknown quantity of data, and then reassemble the resulting stream. Unfortunately, the client machine, as above, is the most resource constrained already and the least capable of doing exactly that. FIG. 23 shows the mechanism as described in connection with FIGS. 18 to 21 for minimizing the resources used to reassemble a single stream of data from a plurality of diverse physical interfaces.

As shown in FIG. 23, a plurality of paths are given, over which the content from a single stream of data has been spread, and which use is made of diverse physical interfaces, a method of measuring the relative delay between sending and receiving of the data packets is implemented. This may be as simple as adding a custom header with such information as a sequence number and/or timestamp. Or, in the case of a typical multimedia stream, commonly included protocol headers such as RTF can be used.

Absolute time delay is not essential, if all the substreams are sourced by one server. For this example embodiment, the relative delay in reception times (tr1−tr2) will be considered. At the start of sending, this relative delay will be assumed to be 0, or else assumed to be the same as observed in a previous sending of data, or looked up in a table which stores various constant values to be used as an initial expected delay between two dissimilar interfaces of known types. For the purposes of discussion, the expected relative delay will be assumed to be 0.

Thus, upon receiving the (second) packet transmitted over the faster interface, the receiving side starts a timer or notes the time tr2. When the (first) packet, from the slower interface is received, the timer will be stopped, or else time tr1 is observed, and the relative difference (tr1−tr2) is calculated. This difference, D, is then communicated back to the sending side. This communication may either happen via a custom feedback message of some type, or be incorporated into a modified receiver report in a message which largely complies with receiver reports (such as an RTCP receiver report).

Upon reception of such a message, the sending side will modify the way in which it sends data from the stream to be sent. Instead of sending the next available packet over all of the plurality of physical interfaces, the sending side will send the next available packet only over the fastest physical interface (in this case, the wired interface used for the 2nd packet, above). The next packet to be sent over the remaining of the plurality of interfaces used will be drawn from farther back in the stream to be sent (thus, 'future' data). It is noted that the sending side is not limited to the scheduling of data packets from the fastest interface to the slowest interface, and always drawing data from farther back in the data stream; rather, other scheduling of data packets may be implemented by the sending side. For example, the sending side may send more data over some of the physical interfaces more often than other physical interfaces. In another example, the order of physical interfaces used to send the data packets may be a different (but noted) order than fastest to slowest physical interface.

The sending side will identify a packet which represents a point of time approximately equal to 'D' units of time in the future. Such a future packet may be identified either from any existing protocol header timestamps (such as RTP or SCTP timestamps), or else may be identified using the known average bit rate of the media being sent (in the case of a multimedia datastream). In the case of a non-media stream, the future packet may be estimated using the known aggregate available bandwidth or data capacity of the interfaces being used for simultaneous streaming. Regardless of how it is identified, this 'future' packet will be extracted from the datastream (whether it is stored as a linked list of packets or some form of IO stream which must be continuously read into a temporary holding buffer on the sending side), and sent. It will not be sent again when that point of time reaches the 'head' of the sending stream.

Having sent the packet 'early' by D units of time, it is expected that the packet will arrive at about the expected time at the receiving side, allowing the reconstruction of the original stream to happen with minimal delays. If the packet is delayed, further, the receiving side can communicate additional delay D2 to the sending side at the next opportunity for feedback. If the packet arrives early, the receiving side, having identified this medium as one which is delayed with respect to others, can simply communicate a reduction in delay (−D2) to the sending side, rather than adding delay to the faster channel. By maintaining a history of observed delays, the receiving side can track which mediums require additional delay to continuously minimize variation in expected delivery of packets, essentially in order, at the receiving side. At the receiving side, simple statistics can be used to provide a dampening in communicated observed delays and to avoid oscillating between communicating a delay, and communicating a reduction in delay at the next opportunity, followed by a similar delay, and so on.

This disclosure has provided a detailed description with respect to particular illustrative embodiments. It is understood that the scope of the appended claims is not limited to the above-described embodiments and that various changes and modifications may be made by those skilled in the relevant art without departing from the scope of the claims.

What is claimed is:

1. A method for sending a data stream from a sending endpoint to a receiving endpoint, wherein the data stream is split into a series of data packets having an order and sent over multiple physical interfaces, the method comprising:

determining an expected difference in arrival time at the receiving endpoint between respective arrival times at the receiving endpoint of data packets sent concurrently by the sending endpoint to the receiving endpoint via different ones of the multiple physical interfaces, wherein each of the multiple physical interfaces connects the sending endpoint and the receiving endpoint over a respective path;

sending a next available data packet in the order of the series of data packets to the receiving endpoint over a fastest one of the multiple physical interfaces, wherein the fastest one of the multiple physical interfaces is determined based on the determined expected difference in arrival time at the receiving endpoint;

repositioning, within the sending endpoint, a data packet which is further back in the order of the series of data packets than the next available data packet, to the front of the order of the series of data packets in accordance with the determined expected difference in arrival time at the receiving endpoint; and sending the repositioned data packet on one of the multiple physical interfaces which is slower than the fastest one of the multiple physical interfaces before sending the next available data packet over the fastest one of the multiple physical interfaces, wherein the receiving endpoint maintains a history of the multiple physical interfaces on which ones of the extracted data packets continue to be delayed, and ones of the extracted data packets which arrive early, and creates a predictability model to more accurately predict future expected differences in arrival times.

2. The method according to claim 1, wherein the data packets are received at the receiving endpoint in an approximate order of appearance as in the original data stream.

3. The method according to claim 1, wherein the sending endpoint and the receiving endpoint each have a single physical interface connected to each of the multiple networks, wherein when sending the next available data packet of the series over a fastest one of the multiple physical interfaces, a send-side physical interface is selected from one of the single physical interfaces connected to one of the multiple networks, the selected send-side physical interface being the fastest single physical interface of the sending endpoint in accordance with the determined expected difference in arrival time, and a receive-side physical interface is selected, the selected receive-side physical interface being the physical interface of the receiving endpoint connected to a same network as the selected send-side physical interface.

4. The method according to claim 1, wherein the sending endpoint and the receiving endpoint each have a single physical interface connected to each of the multiple networks, and wherein when sending the extracted data packet of the series over a corresponding slower one of the multiple physical interfaces, a send-side physical interface is selected from one of the single physical interfaces connected to one of the multiple networks, the selected send-side physical interface being a slower corresponding single physical interface of the sending endpoint in accordance with the determined expected difference in arrival time, and a receive-side physical interface is selected, the selected receive-side physical interface being the physical interface of the receiving endpoint connected to a same network as the selected send-side physical interface.

5. The method according to claim 1, wherein the sending endpoint and the receiving endpoint each have multiple physical interfaces connected to each of the multiple networks, and when sending the next available data packet of the series over a fastest one of the multiple physical interfaces, a fastest send-side physical interface is selected from the multiple physical interfaces of the sending endpoint in accordance with the determined expected difference in arrival time, and a receive-side physical interface is selected from the multiple physical interfaces of the receiving endpoint connected to a same network as the selected send-side physical interface.

6. The method according to claim 5, wherein a receive-side physical interface corresponding to the fastest send-side physical interface when determining the expected difference in arrival time is the selected receive-side physical interface for the next available data packet.

7. The method according to claim 1, wherein the sending endpoint and the receiving endpoint each have multiple physical interfaces connected to each of the multiple networks, and when sending the extracted data packet of the series over a corresponding slower one of the multiple physical interfaces, a corresponding slower send-side physical interface is selected from the multiple physical interfaces of the sending endpoint in accordance with the determined expected difference in arrival time, and a receive-side physical interface is selected from the multiple physical interfaces of the receiving endpoint connected to a same network as the selected send-side physical interface.

8. The method according to claim 7, wherein a receive-side physical interface corresponding to a slower send-side physical interface when determining the expected difference in arrival time is the selected receive-side physical interface for the extracted data packet.

9. The method according to claim 1, wherein when determining the expected difference in arrival time, the expected difference is initially assumed to be zero, the receiving endpoint starts a timer when a first one of the sent data packets is received at the receiving endpoint, and the receiving endpoint stops the timer when a second one of the sent data packets is received at the receiving endpoint, wherein the receiving endpoint communicates the difference in arrival time to the sending endpoint, and wherein the determination of the expected difference in arrival time is made in accordance with the timed difference in arrival time.

10. The method according to claim 1, wherein when determining the expected difference in arrival time, the expected difference is initially assumed to be zero, the receiving endpoint notes a first time when a first one of the sent data packets is received at the receiving endpoint, and the receiving endpoint notes a second time when a second one of the sent data packets is received at the receiving endpoint, and wherein the receiving endpoint calculates a difference between the first time and the second time, wherein the receiving endpoint communicates the calculated difference in arrival time to the sending endpoint, and wherein the determination of the expected difference in arrival time is made in accordance with the calculated difference in arrival time.

11. The method according to claim 9 or 10, wherein the receiving endpoint communicates the difference in arrival time to the sending endpoint via a custom feedback message.

12. The method according to claim 9 or 10, wherein the receiving endpoint communicates the difference in arrival time to the sending endpoint by incorporating the communication into an existing receiver message.

13. The method according to claim 12, wherein the existing receiver message is a receiver message defined in Real-Time Transport Protocol.

14. The method according to claim 1, wherein when determining the expected difference in arrival time, the expected difference is assumed to be a same difference in arrival time as observed in a previous sending of data packets.

15. The method according to claim 1, wherein when determining the expected difference in arrival time, the expected difference is looked up in a table which stores various constant values to be used as an initial expected difference in arrival time for specific ones of the multiple physical interfaces.

16. The method according to claim 1, wherein when extracting a data packet from further back in the series of data packets in accordance with the determined expected difference in arrival time, the extracted data packet represents a unit of time in the future equal to the determined expected difference in arrival time.

17. The method according to claim 16, wherein the extracted data packet is identified by its protocol header timestamp.

18. The method according to claim 1, wherein the data stream is a multimedia data stream, and wherein when extracting a data packet from further back in the series of data packets in accordance with the determined expected difference in arrival time, the extracted data packet represents a unit of time in the future equal to the determined expected difference in arrival time, and the extracted data packet is identified using a known average bit rate of the multimedia.

19. The method according to claim 1, wherein the data stream is a non-media stream, and wherein when extracting a data packet further back in the series of data packets in accordance with the determined expected difference in arrival time, the extracted data packet represents a unit of time in the future equal to the determined expected difference in arrival time, and the extracted data packet is identified using a known aggregate available bandwidth of the multiple physical interfaces.

20. The method according to claim 18 or 19, wherein a format of the data stream is known based upon a transport protocol.

21. The method according to claim 1, wherein, if ones of the extracted data packets sent over corresponding slower ones of the multiple physical interfaces continue to be delayed, then the receiving endpoint communicates an added expected difference in arrival time to the sending endpoint for the delayed ones of the extracted data packets, and if ones of the extracted data packets sent over corresponding slower ones of the multiple physical interfaces are received at the receiving endpoint earlier than the next available data packets sent over the fastest one of the multiple physical interfaces, then the receiving endpoint communicates a reduced expected difference in arrival time to the sending endpoint for the early ones of the extracted data packets.

22. A method for sending a data stream from a sending endpoint to a receiving endpoint, wherein the data stream is split into a series of data packets having an order and sent over multiple physical interfaces, and wherein in said method the sending endpoint performs the steps of:

sending a next available data packet in the order of the series of data packets to the receiving endpoint over a fastest one of the multiple physical interfaces, wherein a determination is made of an expected difference in arrival time between respective arrival times at the receiving endpoint of data packets sent concurrently by the sending endpoint to the receiving endpoint via different ones of the multiple physical interfaces, wherein each of the multiple physical interfaces connects the sending endpoint and the receiving endpoint over a respective path, and wherein the fastest one of the multiple physical interfaces is determined based on the determined expected difference in arrival time at the receiving endpoint;

repositioning, within the sending endpoint, a data packet which is further back in the order of the series of data packets than the next available data packet, to the front of the order of the series of data packets in accordance with the determined expected difference in arrival time at the receiving endpoint; and sending the repositioned data packet on one of the multiple physical interfaces which is slower than the fastest one of the multiple physical interfaces before sending the next available data packet over the fastest one of the multiple physical interfaces, wherein the receiving endpoint maintains a history of the multiple physical interfaces on which ones of the extracted data packets continue to be delayed, and ones of the extracted data packets which arrive early, and creates a predictability model to more accurately predict future expected differences in arrival times.

23. The method according to claim 22, wherein the data packets are received at the receiving endpoint in an approximate order of appearance as in the original data stream.

24. A method for sending a data stream from a sending endpoint to a receiving endpoint, wherein the data stream is split into a series of data packets having an order and sent over multiple physical interfaces, and wherein in said method the receiving endpoint performs the steps of:

communicating a difference in arrival time between each of the sent data packets to the sending endpoint, wherein a determination is made, based on the communication, of an expected difference in arrival time at the receiving endpoint between respective arrival times at the receiving endpoint of data packets sent concurrently by the sending endpoint to the receiving endpoint via different ones of the multiple physical interfaces, and wherein each of the multiple physical interfaces connects the sending endpoint and the receiving endpoint over a respective path, and the sending endpoint sends a next available data packet in the order of the series of data packets to the receiving endpoint over a fastest one of the multiple physical interfaces, the fastest one of the multiple physical interfaces being determined based on the determined expected difference in arrival time at the receiving endpoint, repositions, within the sending endpoint, a data packet which is further back in the order of the series of data packets than the next available data packet, to the front of the order of the series of data packets in accordance with the determined difference in arrival time at the receiving endpoint, and sends the repositioned data packet on one of the multiple physical interfaces which is slower than the fastest one of the multiple physical interfaces before sending the next available data packet over the fastest one of the multiple physical interfaces, wherein the receiving endpoint maintains a history of the multiple physical interfaces on which ones of the extracted data packets continue to be delayed, and ones of the extracted data packets which arrive early, and creates a predictability model to more accurately predict future expected differences in arrival times.

25. A sending endpoint comprising:

a computer-readable memory constructed to store computer-executable process steps; and a processor constructed to execute the computer-executable process steps stored in the memory;

wherein the process steps stored in the memory cause the processor to send a data stream from the sending endpoint to a receiving endpoint, wherein the data stream is split into a series of data packets having an order and sent over multiple physical interfaces, and wherein the process steps stored in the memory include computer-executable process steps to:

send a next available data packet in the order of the series of data packets to the receiving endpoint over a fastest one of the multiple physical interfaces, wherein a determination is made of an expected difference in arrival time at the receiving endpoint between respective arrival times at the receiving endpoint of data packets sent concurrently by the sending endpoint to the receiving endpoint via different ones of the multiple physical interfaces, wherein each of the multiple physical interfaces connects the sending endpoint and the receiving endpoint over a respective path, and wherein the fastest one of the multiple physical interfaces is determined based on the determined expected difference in arrival time at the receiving endpoint;

reposition, within the sending endpoint, a data packet which is further back in the order of the series of data packets than the next available data packet, to the front of the order of the series of data packets in accordance with the determined expected difference in arrival time at the receiving endpoint; and send the repositioned data packet on one of the multiple physical interfaces which is slower than the fastest one of the multiple physical interfaces before sending the next available data packet over the fastest one of the multiple physical interfaces, wherein the receiving endpoint maintains a history of the multiple physical interfaces on which ones of the extracted data packets continue to be delayed, and ones of the extracted data packets which arrive early, and creates a predictability model to more accurately predict future expected differences in arrival times.

26. A receiving endpoint comprising:

a computer-readable memory constructed to store computer-executable process steps; and a processor constructed to execute the computer-executable process steps stored in the memory;

wherein the process steps stored in the memory cause the processor to receive a data stream sent from a sending endpoint to the receiving endpoint, the data stream is split into a series of data packets having an order and sent over multiple physical interfaces, and wherein the process steps stored in the memory include computer-executable process steps to:

communicate a difference in arrival time between each of the sent data packets to the sending endpoint, wherein a determination is made, based on the communication, of an expected difference in arrival time at the receiving endpoint between respective arrival times at the receiving endpoint of data packets sent concurrently by the sending endpoint to the receiving endpoint via different ones of the multiple physical interfaces, and wherein each of the multiple physical interfaces connects the sending endpoint and the receiving endpoint over a respective path, and the sending endpoint sends a next available data packet in the order of the series of data packets to the receiving endpoint over a fastest one of the multiple physical interfaces, the fastest one of the multiple physical interfaces being determined based on the determined expected difference in arrival time at the receiving endpoint, repositions, within the sending endpoint, a data packet which is further back in the order of the series of data packets than the next available data packet, to the front of the order of the series of data packets in accordance with the determined difference in arrival time at the receiving endpoint, and sends the repositioned data packet on one of the multiple physical interfaces which is slower than the fastest one of the multiple physical interfaces before sending the next available data packet over the fastest one of the multiple physical interfaces, wherein the receiving endpoint maintains a history of the multiple physical interfaces on which ones of the extracted data packets continue to be delayed, and ones of the extracted data packets which arrive early, and creates a predictability model to more accurately predict future expected differences in arrival times.

27. A non-transitory computer-readable memory medium on which is stored computer-executable process steps for causing a processor to send a data stream from a sending endpoint to a receiving endpoint, wherein the data stream is split into a series of data packets having an order and sent over multiple physical interfaces to said process steps comprising:

sending a next available data packet in the order of the series of data packets to the receiving endpoint over a fastest one of the multiple physical interfaces, wherein a determination is made of an expected difference in arrival time between respective arrival times at the receiving endpoint of data packets sent concurrently by the sending endpoint to the receiving endpoint via different ones of the multiple physical interfaces, wherein each of the multiple physical interfaces connects the sending endpoint and the receiving endpoint over a respective path, and wherein the fastest one of the multiple physical interfaces is determined based on the determined expected difference in arrival time at the receiving endpoint;

repositioning, within the sending endpoint, a data packet which is further back in the order of the series of data packets than the next available data packet, to the front of the order of the series of data packets in accordance with the determined expected difference in arrival time at the receiving endpoint; and sending the repositioned data packet on one of the multiple physical interfaces which is slower than the fastest one of the multiple physical interfaces before sending the next available data packet over the fastest one of the multiple physical interfaces, wherein the receiving endpoint maintains a history of the multiple physical interfaces on which ones of the extracted data packets continue to be delayed, and ones of the extracted data packets which arrive early, and creates a predictability model to more accurately predict future expected differences in arrival times.

28. A non-transitory computer-readable memory medium on which is stored computer-executable process steps for causing a processor to receive a data stream sent from a sending endpoint to the receiving endpoint, wherein the data stream is split into a series of data packets having an order and sent over multiple physical interfaces, said process steps comprising:

communicating a difference in arrival time between each of the sent data packets to the sending endpoint, wherein a determination is made, based on the communication, of an expected difference in arrival time at the receiving endpoint between respective arrival times at the receiving endpoint of data packets sent concurrently by the sending endpoint to the receiving endpoint via different ones of the multiple physical interfaces, and wherein each of the multiple physical interfaces connects the sending endpoint and the receiving endpoint over a respective path, and the sending endpoint sends a next available data packet in the order of the series of data packets to the receiving endpoint over a fastest one of the multiple physical interfaces, the fastest one of the multiple physical interfaces being determined based on the determined expected difference in arrival time at the receiving endpoint, repositions, within the sending endpoint, a data packet which is further back in the order of the series of data packets than the next available data packet, to the front of the order of the series of data packets in accordance with the determined difference in arrival time at the receiving endpoint, and sends the repositioned data packet on one of the multiple physical interfaces which is slower than the fastest one of the multiple physical interfaces before sending the next available data packet over the fastest one of the multiple physical interfaces, wherein the receiving endpoint maintains a history of the multiple physical interfaces on which ones of the extracted data packets continue to be delayed, and ones of the extracted data packets which arrive early, and creates a predictability model to more accurately predict future expected differences in arrival times.

* * * * *